United States Patent
Xu et al.

(10) Patent No.: US 11,089,148 B2
(45) Date of Patent: Aug. 10, 2021

(54) NOTIFICATION PROCESSING METHOD AND ELECTRONIC DEVICE

(71) Applicant: Huawei Technologies Co., Ltd., Shenzhen (CN)

(72) Inventors: Jie Xu, Shanghai (CN); Chunliang Liu, Shanghai (CN); Bongwon Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/610,333

(22) PCT Filed: May 2, 2017

(86) PCT No.: PCT/CN2017/082773
§ 371 (c)(1),
(2) Date: Nov. 1, 2019

(87) PCT Pub. No.: WO2018/201300
PCT Pub. Date: Nov. 8, 2018

(65) Prior Publication Data
US 2020/0092411 A1 Mar. 19, 2020

(51) Int. Cl.
*H04M 1/72436* (2021.01)
*G06F 3/0486* (2013.01)
(Continued)

(52) U.S. Cl.
CPC ...... *H04M 1/72436* (2021.01); *G06F 3/0486* (2013.01); *G06F 3/04883* (2013.01);
(Continued)

(58) Field of Classification Search
CPC .......... H04M 1/72436; H04M 1/72469; G06F 3/0486; G06F 3/04883; G06K 9/00087; G06K 9/00912; H04W 4/14
See application file for complete search history.

(56) References Cited

U.S. PATENT DOCUMENTS

2013/0102281 A1 4/2013 Kanda et al.
2014/0359757 A1 12/2014 Sezan et al.
(Continued)

FOREIGN PATENT DOCUMENTS

CN 101930341 A 12/2010
CN 103365600 A 10/2013
(Continued)

OTHER PUBLICATIONS

Machine Translation and Abstract of Chinese Publication No. CN101930341, Dec. 29, 2010, 11 pages.
(Continued)

*Primary Examiner* — Charles N Appiah
*Assistant Examiner* — Frank E Donado
(74) *Attorney, Agent, or Firm* — Conley Rose, P.C.

(57) ABSTRACT

Embodiments of this application provide a notification processing method and an electronic device. The method includes: displaying a lock screen on a touchscreen, receiving a new notification; determining whether the notification is a specified notification, where the specified notification is a notification bound to a second area on the lock screen; and if the notification is a specified notification, displaying the notification in the second area on the lock screen; or if the notification is not a specified notification, displaying the notification in a first area on the lock screen, where the first area and the second area are two different display areas on the lock screen. According to the technical solutions provided in the embodiments of this application, efficiency of an electronic device is improved, user operations are reduced, and user experience is improved.

18 Claims, 51 Drawing Sheets

(51) Int. Cl.
*G06K 9/00* (2006.01)
*H04W 4/14* (2009.01)
*H04M 1/72469* (2021.01)
*G06F 3/0488* (2013.01)

(52) U.S. Cl.
CPC ..... *G06K 9/00087* (2013.01); *G06K 9/00912* (2013.01); *H04M 1/72469* (2021.01); *H04W 4/14* (2013.01)

(56) References Cited

U.S. PATENT DOCUMENTS

| | | |
|---|---|---|
| 2015/0089666 A1 | 3/2015 | Lee et al. |
| 2015/0207922 A1 | 7/2015 | Kobayashi et al. |
| 2015/0371073 A1 | 12/2015 | Cho et al. |
| 2016/0371528 A1 | 12/2016 | Slaby et al. |
| 2017/0038915 A1* | 2/2017 | Choi ................. G06F 21/36 |
| 2017/0286660 A1 | 10/2017 | Li |
| 2019/0369799 A1* | 12/2019 | Jeon ................. G06F 3/0445 |

FOREIGN PATENT DOCUMENTS

| | | |
|---|---|---|
| CN | 105912203 A | 8/2016 |
| CN | 106096346 A | 11/2016 |
| CN | 106502489 A | 3/2017 |
| CN | 106527946 A | 3/2017 |
| CN | 106557257 A | 4/2017 |
| CN | 106570372 A | 4/2017 |
| JP | 2013093699 A | 5/2013 |
| JP | 2014021936 A | 2/2014 |
| JP | 2017504853 A | 2/2017 |
| KR | 20150086220 A | 7/2015 |
| KR | 20160083032 A | 7/2016 |
| WO | 2017000251 A1 | 1/2017 |

OTHER PUBLICATIONS

Machine Translation and Abstract of Chinese Publication No. CN103365600, Oct. 23, 2013, 35 pages.
Machine Translation and Abstract of Chinese Publication No. CN105912203, Aug. 31, 2016, 19 pages.
Machine Translation and Abstract of Chinese Publication No. CN106096346, Nov. 9, 2016, 18 pages.
Machine Translation and Abstract of Chinese Publication No. CN106502489, Mar. 15, 2017, 9 pages.
Machine Translation and Abstract of Chinese Publication No. CN106527946, Mar. 22, 2017, 23 pages.
Machine Translation and Abstract of Chinese Publication No. CN106557257, Apr. 5, 2017, 25 pages.
Machine Translation and Abstract of Chinese Publication No. CN106570372, Apr. 19, 2017, 17 pages.
Foreign Communication From A Counterpart Application, Chinese Application No. 201780010622.4, Chinese Office Action dated Dec. 3, 2019, 10 pages.
Foreign Communication From A Counterpart Application, PCT Application No. PCT/CN2017/082773, English Translation of International Search Report dated Jan. 10, 2018, 2 pages.
Foreign Communication From A Counterpart Application, PCT Application No. PCT/CN2017/082773, English Translation of Written Opinion dated Jan. 10, 2018, 4 pages.

* cited by examiner

NOTIFICATION PROCESSING METHOD AND ELECTRONIC DEVICE

CROSS-REFERENCE TO RELATED APPLICATIONS

This application is a National Stage of International Patent Application No. PCT/CN2017/082773 filed on May 2, 2017, the disclosure of which is hereby incorporated by reference in its entirety.

TECHNICAL FIELD

Embodiments of this application relate to the field of human-machine interaction, and in particular, to a notification processing method and an electronic device.

BACKGROUND

In recent years, a fingerprint recognition technology, as an identity authentication technology based on a biometric feature, has been widely applied to various electronic devices (for example, a mobile phone and a tablet computer). A specific implementation process of fingerprint recognition is: A fingerprint sensor on an electronic device gathers a user fingerprint after detecting a touch operation of a user, and a corresponding operation is performed when it is determined that the gathered fingerprint matches a pre-stored fingerprint. For example, if a user needs to unlock a mobile phone, the mobile phone can be successfully unlocked by directly performing a simple touch operation, without a need to enter a complicated unlock password.

In the prior art, when an electronic device receives a new notification (for example, a new SMS-related notification) in a lock screen mode, a user needs to perform fingerprint unlocking to enter a main screen of the electronic device, then find a related application icon, tap the icon to start the application, and finally find a related graphical user interface of the application, to view specific content of the notification. It can be learned that the foregoing interaction solution between the electronic device and the user is so complex that the solution greatly reduces use efficiency of the electronic device.

SUMMARY

To resolve the foregoing technical problems, embodiments of this application provide a plurality of notification processing methods and an electronic device. This greatly improves a human-machine interaction capability of an electronic device, improves processing efficiency of the electronic device, simplifies user operation steps, and further improves user experience.

According to a first aspect, an embodiment of this application provides a notification processing method, where the method may be implemented on an electronic device with a touchscreen and a fingerprint recognizer, and the method may specifically include:

displaying a lock screen on the touchscreen, where the lock screen may include a notification and a fingerprint unlock icon, the notification is displayed in a first area on the lock screen, and the fingerprint unlock icon is displayed in a second area on the lock screen:

detecting, by the electronic device, a touch event on the touchscreen, where the touch event includes a first touch position on the touchscreen and a second touch position on the touchscreen, the first touch position is corresponding to the first area, and the second touch position is corresponding to the second area:

in response to the touch event, gathering and verifying, by the electronic device, a fingerprint in the second touch position; and unlocking, by the electronic device, a screen after fingerprint verification succeeds, and displaying a graphical user interface of an application corresponding to the notification.

In the foregoing embodiment, the application corresponding to the notification displayed on the lock screen can be quickly started, not requiring the user to perform troublesome operations. This greatly improves processing efficiency of an electronic device, simplifies user operation steps, and further improves user experience.

In some possible implementations, that the notification is displayed in a first area on the lock screen may specifically include: determining, by the electronic device, whether the received notification is a specified notification, where the specified notification is a notification bound to the second area; and if determining that the notification is not a specified notification, displaying, by the electronic device, the notification in the first area. The specified notification in which the user is interested is displayed in a specified area (for example, the second area). This can ensure that the user can quickly obtain a latest message in real time. If the notification is not a specified notification in which the user is interested, the notification is not displayed in the specified area.

In some possible implementations, the specified notification may be a notification with a highest priority, may be a notification corresponding to a specified application, or may be a notification corresponding to a specified contact in an application. The user may set a specific manner used to determine the specified notification.

In some possible implementations, the second area is a fixed display area on the lock screen. A position, corresponding to the second area, on the touchscreen may be a position of the fingerprint recognizer. The second area on the lock screen actually overlaps with the position of the fingerprint recognizer on the touchscreen, so that the user quickly performs fingerprint unlock after selecting a notification.

In some possible implementations, the fingerprint recognizer is disposed in the second touch position, and the fingerprint recognizer is integrated into the touchscreen.

In some possible implementations, in response to the touch event, the electronic device displays the notification prominently, or displays the fingerprint unlock icon prominently. In this way, a user can intuitively learn of which notification to be opened.

In some possible implementations, that the notification is displayed prominently is specifically; displaying, by the electronic device, the notification prominently in a different degree according to a priority of the notification. Notifications of different priorities are displayed prominently in different degrees. In this way, a user can intuitively learn which notifications are important and which notifications are unimportant.

In some possible implementations, the lock screen further includes a prompt box, the prompt box is used to display unlocking-related prompt information on the lock screen, and the prompt box is displayed in the second display area. In combination with the fingerprint unlock icon, the prompt box may further prompt and guide the user how to perform a next operation, thereby improving user experience.

In some possible implementations, the notification may be an SMS-related notification, a WeChat-related notification, or an email-related notification; or the lock screen may alternatively include lock screen wallpaper, a quick-start camera icon, and a time and date; or the second area may be a fixed-size display area and is a partial display area on the lock screen; or the touch event may be slightly touching or pressing the touchscreen by using a finger of a user, keeping stationary for a predetermined time, and then moving from the first touch position to the second touch position while maintaining contact with the touchscreen; or the fingerprint recognizer is disposed on a lower part of the touchscreen; or the specified notification is an SMS-related notification or a notification specific to a specified contact in an SMS application; or a size of the first display area is the same as that of the displayed second display area, or a size of the first display area is less than that of the second display area; or the prominent displaying is displaying in a zoom-in mode.

According to a second aspect, an embodiment of this application provides a notification processing method, where the method may be implemented on an electronic device with a touchscreen and a fingerprint recognizer, and the method may include:

displaying a lock screen on the touchscreen;

receiving a new notification;

determining whether the notification is a specified notification, where the specified notification is a notification bound to a second area on the lock screen; and if the notification is a specified notification, displaying the notification in the second area on the lock screen; or if the notification is not a specified notification, displaying the notification in a first area on the lock screen, where the first area and the second area are two different display areas on the lock screen.

According to the technical solution in this embodiment of this application, a notification in which a user is interested can be displayed in a conspicuous display area (for example, the second area), and a notification in which the user is not interested is displayed in another inconspicuous display area (for example, the first area). This improves a human-machine interaction capability of the electronic device and improves user experience.

In some possible implementations, when the notification is displayed in the first area (that is, when the notification is not a specified notification), the method may further include: detecting a first touch event on the touchscreen; and in response to the first touch event, displaying a fingerprint unlock icon or a prompt box in the second area, so as to further instruct the user how to unlock a screen.

In some possible implementations, the method may further include: detecting a second touch event on the touchscreen, where the second touch event may include a first touch position and a second touch position on the touchscreen, the first touch position may be corresponding to the first area, and the second touch position may be corresponding to the second area; in response to the second touch event, gathering and verifying, by the electronic device, a fingerprint in the second touch position; and unlocking, by the electronic device, a screen after fingerprint verification succeeds, and displaying a graphical user interface of an application corresponding to the notification. According to the technical solution in this embodiment, when unlocking a screen, a user can start an application corresponding to a notification. This simplifies user operations and improves efficiency of an electronic device.

In some possible implementations, before the receiving a new notification, the method may further include: setting a binding relationship between the specified notification and the second area, where the specified notification may be a notification specific to a specified application or a notification specific to a specified contact in an application. Specifically, the specified notification may alternatively be an SMS-related notification or a notification specific to a specified contact in an SMS application. The electronic device may set by default, or receive a user input to set which type of notification can be displayed in the second area. In this way, a notification displayed in the second area is more flexible.

According to a third aspect, an embodiment of this application further provides an electronic device for processing a notification, where the electronic device includes one or more processors, a touchscreen, a fingerprint recognizer, a memory, a plurality of applications, and one or more programs; the one or more programs are stored in the memory and configured to be executed by the one or more processors; and the one or more programs include an instruction, where the instruction is used to:

display a lock screen on the touchscreen, where the lock screen may include a notification and a fingerprint unlock icon, the notification is displayed in a first area on the lock screen, and the fingerprint unlock icon is displayed in a second area on the lock screen:

detect, by the electronic device, a touch event on the touchscreen, where the touch event includes a first touch position on the touchscreen and a second touch position on the touchscreen, the first touch position is corresponding to the first area, and the second touch position is corresponding to the second area:

in response to the touch event, gather and verify, by the electronic device, a fingerprint in the second touch position; and unlock, by the electronic device, a screen after fingerprint verification succeeds, and display a graphical user interface of an application corresponding to the notification.

According to a fourth aspect, an embodiment of this application further provides an electronic device for processing a notification, where the electronic device includes one or more processors, a touchscreen, a fingerprint recognizer, a memory, a plurality of applications, and one or more programs; the one or more programs are stored in the memory and configured to be executed by the one or more processors; and the one or more programs include an instruction, where the instruction may be used to:

display a lock screen on the touchscreen;

receive a new notification;

determine whether the notification is a specified notification, where the specified notification is a notification bound to a second area on the lock screen; and if the notification is a specified notification, display the notification in the second area on the lock screen; or if the notification is not a specified notification, display the notification in a first area on the lock screen, where the first area and the second area are two different display areas on the lock screen.

According to the technical solution in this embodiment of this application, a notification in which a user is interested can be displayed in a conspicuous display area (for example, the second area), and a notification in which the user is not interested is displayed in another inconspicuous display area (for example, the first area). This improves a human-machine interaction capability of the electronic device and improves user experience.

In some possible implementations, when the notification is displayed in the first area (that is, when the notification is not a specified notification), the instruction may be further used to: detect a first touch event on the touchscreen; and in response to the first touch event, display a fingerprint unlock icon or a prompt box in the second area, so as to further instruct the user how to unlock a screen.

In some possible implementations, the instruction may be further used to: detect a second touch event on the touchscreen, where the second touch event may include a first touch position and a second touch position on the touchscreen, the first touch position may be corresponding to the first area, and the second touch position may be corresponding to the second area; in response to the second touch event, gather and verify, by the electronic device, a fingerprint in the second touch position; and unlock, by the electronic device, a screen after fingerprint verification succeeds, and display a graphical user interface of an application corresponding to the notification. According to the technical solution in this embodiment, when unlocking a screen, a user can start an application corresponding to a notification. This simplifies user operations and improves efficiency of an electronic device.

In some possible implementations, the instruction may be further used to: before the new notification is received, set a binding relationship between the specified notification and the second area, where the specified notification may be a notification specific to a specified application or a notification specific to a specified contact in an application. Specifically, the specified notification may alternatively be an SMS-related notification or a notification specific to a specified contact in an SMS application. The electronic device may set by default, or receive a user input to set which type of notification can be displayed in the second area. In this way, a notification displayed in the second area is more flexible.

According to a fifth aspect, an embodiment of this application provides a notification processing method, where the method may be implemented on an electronic device with a touchscreen, the touchscreen may include a display screen and a touch-sensitive surface, and a fingerprint recognizer is disposed on the touch-sensitive surface; and the method may specifically include:

displaying a lock screen on the display screen, where the lock screen includes a notification and a prompt box, and the prompt box is used to display prompt information related to screen unlocking, to guide a user to perform unlocking;

displaying the notification in a first area on the display screen, and displaying the prompt box in a second area on the display screen;

detecting, by the electronic device, a touch event on the touch-sensitive surface, where the touch event includes a first touch position and an end position, the start position is in the first area, and the end position is a position on the touch-sensitive surface on which the fingerprint recognizer is disposed; and specifically, the end position is in a bezel of the electronic device, but not in the display screen:

in response to the touch event, gathering and verifying, by the electronic device, a fingerprint in the end position; and unlocking, by the electronic device, a screen after fingerprint verification succeeds, and displaying a graphical user interface of an application corresponding to the notification.

In some possible implementations, the second area may be a display area, closer to the fingerprint recognizer, on the touchscreen, so that a user can perform an unlocking operation by using one hand.

According to a sixth aspect, an embodiment of this application provides a notification processing method, where the method may be implemented on an electronic device with a touchscreen, and a fingerprint recognizer is disposed on the touchscreen; and the method may specifically include:

displaying a lock screen on the touchscreen, where the lock screen includes a notification and a fingerprint unlock icon;

displaying the notification in a first area of the touchscreen, and displaying the fingerprint unlock icon in a second area of the touchscreen, where the fingerprint recognizer is disposed in the second area;

detecting, by the electronic device, a touch event on the touchscreen, where the touch event is performed in the second area, and the touch event may be specifically slightly touching or pressing the touchscreen by the user, and keeping stationary for a predetermined time;

in response to the touch event, gathering and verifying, by the electronic device, a fingerprint in the second area; and unlocking, by the electronic device, a screen after fingerprint verification succeeds, and displaying a graphical user interface of an application corresponding to the notification.

According to the technical solution of the second aspect, a user can perform a simple gesture to unlock a screen and open a GUI of an application corresponding to the notification. This simplifies operations, improves efficiency of an electronic device, and further improves user experience.

In some possible implementations, a prompt box may be further displayed in the second display area. The prompt box is used to display prompt information related to screen unlocking, so as to guide a user to perform unlocking, thereby improving user experience.

In some possible implementations, in response to the touch event, the notification may be moved from the first area to the second display area in a form of animation, so that a user can perceive more intuitively that the notification is to be opened.

In other possible implementations, there may be a plurality of notifications, namely, at least two notifications.

When there are at least two notifications, the step of "unlocking, by the electronic device, a screen after fingerprint verification succeeds, and displaying a graphical user interface of an application corresponding to the notification" may specifically include: determining, by the electronic device, priorities of the plurality of notifications; and unlocking, by the electronic device, a screen after fingerprint verification succeeds, and displaying, on the touchscreen, a graphical user interface of an application corresponding to a notification with a highest priority. According to this solution, the electronic device can quickly display specific information of an important notification in real time, so as to facilitate viewing by a user.

According to a seventh aspect, an embodiment of this application further provides a computer readable storage medium, where the computer readable storage medium stores an instruction, and when the instruction is executed on a computer, the computer is enabled to perform the method in the foregoing aspects.

According to an eighth aspect, an embodiment of this application further provides a computer program product including an instruction, and when the computer program product runs on a computer, the computer is enabled to perform the method in the foregoing aspects.

It should be understood that technical features, technical solutions, beneficial effects, or similar descriptions in this application do not imply that all features and advantages can be implemented in any individual embodiment. Conversely, it can be understood that descriptions of the features or beneficial effects mean that at least one embodiment includes a specified technical feature, technical solution, or technical effect. Therefore, the technical features, technical solutions, or beneficial effects in this specification are not necessarily specific to a same embodiment. The technical features, technical solutions, or beneficial effects described in the embodiments may be further combined in any proper manner. A person skilled in the art understands that a specified embodiment can be implemented without requiring one or more specified technical features, technical solutions, or beneficial effects of the embodiments. In other embodiments, an additional technical feature and beneficial effect can be further identified in a specified embodiment that does not reflect all embodiments.

DESCRIPTION OF EMBODIMENTS

Terms used in the embodiments of this application are merely for the purpose of describing specified embodiments, but are not intended to limit this application. Terms "one", "a", "the", "the foregoing", "this", and "the one" of singular forms used in this specification and the appended claims of this application are also intended to include a plural form, unless otherwise specified in the context clearly. It should also be understood that, term "and/or" used in this application indicates and includes any or all possible combinations of one or more bound listed items.

The following describes embodiments of an electronic device, a graphical user interface (GUI for short below) applied to such an electronic device, and a related process of using such an electronic device. In some embodiments of this application, the electronic device may be a portable electronic device that further includes other functions such as functions of a personal digital assistant and/or a music player, for example, a mobile phone, a tablet computer, or a wearable electronic device having a wireless communication function (for example, a smartwatch). An example of an embodiment of the portable electronic device includes but is not limited to a portable electronic device running iOS®, Android®, or Microsoft®. The portable electronic device may alternatively be another portable electronic device, for example, a laptop computer (Laptop) with a touch-sensitive surface (for example, a touch panel). It should be further understood that in other embodiments of this application, the electronic device may alternatively be a desktop computer with a touch-sensitive surface (for example, a touch panel), but not a portable electronic device.

Figure 1:
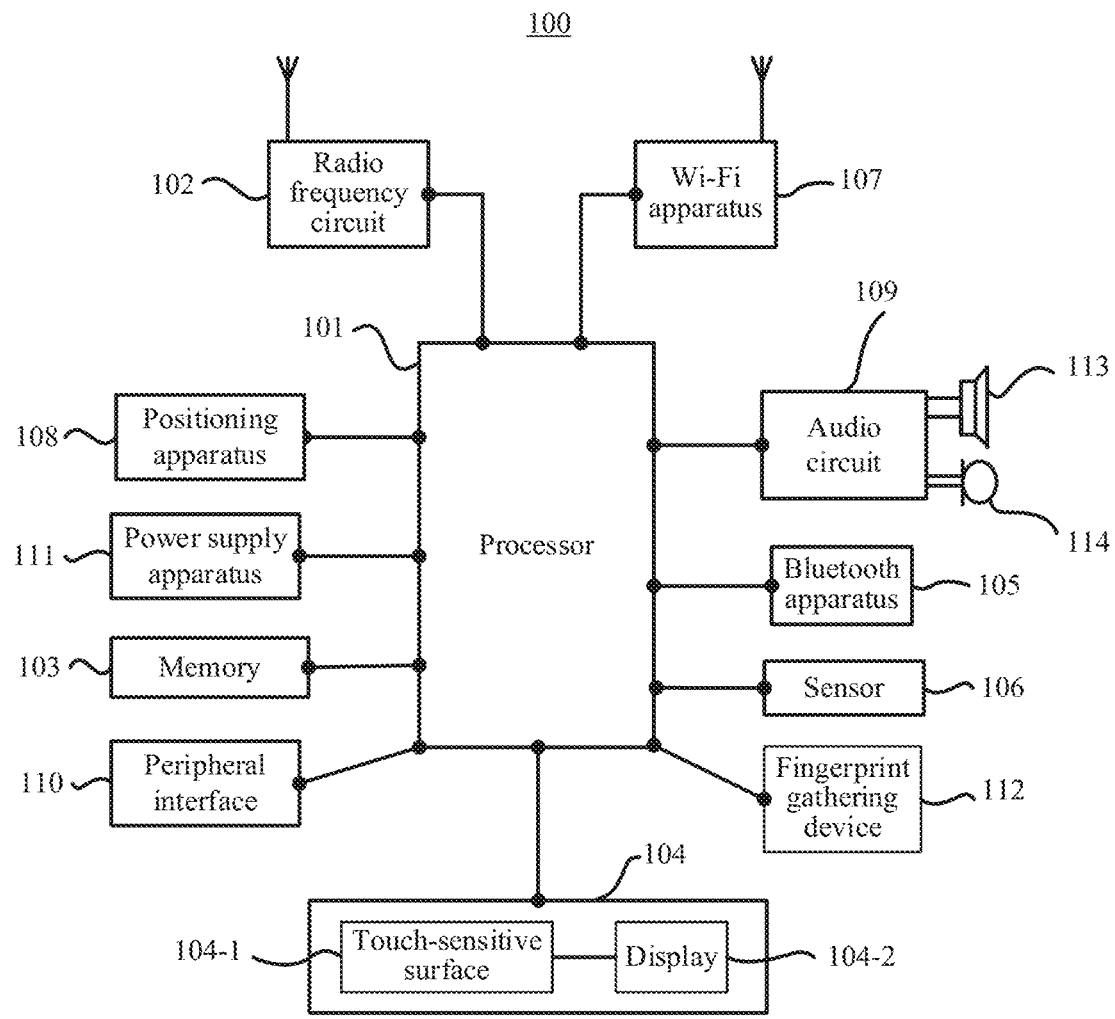
FIG. 1 is a schematic structural diagram of hardware of a mobile phone 100 in some embodiments.

As shown in FIG. 1, an electronic device in an embodiment of this application may be a mobile phone 100. The following describes this embodiment in detail by using the mobile phone 100 as an example. It should be understood that the mobile phone 100 in the figure is merely an example of the electronic device, and the mobile phone 100 may include more or fewer components than those shown in the figure, a combination of two or more components, or components disposed differently. Various components shown in the figure may be implemented by using hardware including one or more signal processing and/or application-specific integrated circuits, software, or a combination of hardware and software.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power system 111. These components may perform communication by using one or more communications buses or signal buses (not shown in FIG. 1). A person skilled in the art can understand that the hardware structure shown in FIG. 1 constitutes no limitation on the mobile phone 100, and the mobile phone 100 may include more or fewer components than those shown in the figure, a combination of some components, or components disposed differently.

The following describes each component of the mobile phone 100 in detail with reference to FIG. 1.

The processor 101 is a control center of the mobile phone 100, and connects to various components of the mobile phone 100 by using various interfaces and lines. The processor 101 executes various functions of the mobile phone 100 and processes data, by running or executing an application (App for short below) stored in the memory 103 and invoking data and an instruction that are stored in the memory 103. In some embodiments, the processor 101 may include one or more processing units. An application processor and a modem processor may alternatively be integrated into the processor 101. The application processor mainly processes an operating system, a user interface, an application, and the like, and the modem processor mainly processes wireless communication. It can be understood that the modem processor may alternatively not be integrated into the processor 101. For example, the processor 101 may be a Kirin 960 chip made by Huawei Technologies Co., Ltd. In some embodiments of this application, the processor 101 may further include a fingerprint verification chip configured to verify a gathered fingerprint.

The radio frequency circuit 102 may be configured to receive or send a radio signal during receiving or sending of information or during a call. Specifically, the radio frequency circuit 102 may receive downlink data of a base station and then send the downlink data to the processor 101 for processing, and in addition, send related uplink data to the base station. The radio frequency circuit usually includes but is not limited to an antenna, at least one amplifier, a transceiver, a coupler, a low noise amplifier, or a duplexer. In addition, the radio frequency circuit 102 may further communicate with another device through radio communication. Any communications standard or protocol may be used during radio communication, including but not limited to Global System for Mobile Communications, General Packet Radio Service, code division multiple access, wideband code division multiple access, Long Term Evolution, an email, or a short messaging service.

The memory 103 is configured to store an application and data. The processor 101 executes various functions of the mobile phone 100 and processes data, by running the application and data that are stored in the memory 103. The memory 103 mainly includes a program storage area and a data storage area. The program storage area may store an operating system and an application required by at least one function (for example, an audio play function or an image play function). The data storage area may store data (for example, audio data or a phone book) created during use of the mobile phone 100. In addition, the memory 103 may include a high-speed random access memory, and may further include a non-volatile memory such as a magnetic disk storage device, a flash memory device, or another volatile solid-state storage device. The memory 103 may store various operating systems, for example, an iOS® operating system developed by Apple or an Android® operating system developed by Google.

The touchscreen 104 may include a touch-sensitive surface 104-1 and a display 104-2. The touch-sensitive surface 104-1 (for example, a touch panel) may gather a touch event (such as an operation performed by a user of the mobile phone 100 on or near the touch-sensitive surface 104-1 by using a finger or any proper object such as a stylus) performed by the user on or near the touch-sensitive surface 104-1, and send gathered touch information to another component, for example, the processor 101. The touch event performed by the user near the touch-sensitive surface 104-1 may be referred to as a floating touch. The floating touch may mean that the user merely needs to approach an electronic device to execute a desired function, not requiring direct contact with a touch panel to select, move, or drag a target (for example, an icon). In an application scenario of the floating touch, terms such as "touch" and "contact" do not imply direct contact with the touchscreen, but contact near or close to the touchscreen. The touch-sensitive surface 104-1 that can support the floating touch may be implemented in a capacitive, infrared light sensing, or ultrasonic wave manner, or the like. The touch-sensitive surface 104-1 may include two components: a touch detection apparatus and a touch controller. The touch detection apparatus detects a touch orientation of a user, detects a signal caused by a touch operation, and transfers the signal to the touch controller. The touch controller receives the touch information from the touch detection apparatus, converts the touch information to contact coordinates, and sends the contact coordinates to the processor 101. The touch controller may further receive and execute an instruction sent by the processor 101. In addition, the touch-sensitive surface 104-1 may be implemented in a plurality of types such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be disposed in a form such as a liquid crystal display or an organic light-emitting diode. The touch-sensitive surface 104-1 may cover the display 104-2. After detecting the touch event on or near the touch-sensitive surface 104-1, the touch-sensitive surface 104-1 transfers the touch event to the processor 101 to determine a type of the touch event, and then the processor 101 may provide corresponding visual output on the display 104-2 based on the type of the touch event. In FIG. 1, the touch-sensitive surface 104-1 and the display screen 104-2 are used as two independent components to implement input and output functions of the mobile phone 100. However, in some embodiments, the touch-sensitive surface 104-1 and the display screen 104-2 may be integrated to implement the input and output functions of the mobile phone 100. It can be understood that the touchscreen 104 is formed by stacking a plurality of layers of materials. Only the touch-sensitive surface (layer) and the display screen (layer) are displayed in this embodiment of this application, and other layers are not recorded in this embodiment of this application. In addition, in other embodiments of this application, the touch-sensitive surface 104-1 may cover the display 104-2, and a size of the touch-sensitive surface 104-1 is greater than that of the display screen 104-2, so that the display screen 104-2 is completely covered by the touch-sensitive surface 104-1, or the touch-sensitive surface 104-1 may be configured on the front surface of the mobile phone 100 in a full-panel form, that is, all touches of the user on the front surface of the mobile phone 100 can be sensed by the mobile phone. In this way, all-touch experience on the front surface of the mobile phone can be achieved. In other embodiments, the touch-sensitive surface 104-1 is disposed on the front surface of the mobile phone 100 in a full-panel form, and the display screen 104-2 may also be disposed on the front surface of the mobile phone 100 in a full-panel form. In this way, a bezel-less structure can be implemented on the front surface of the mobile phone.

Figure 2A:
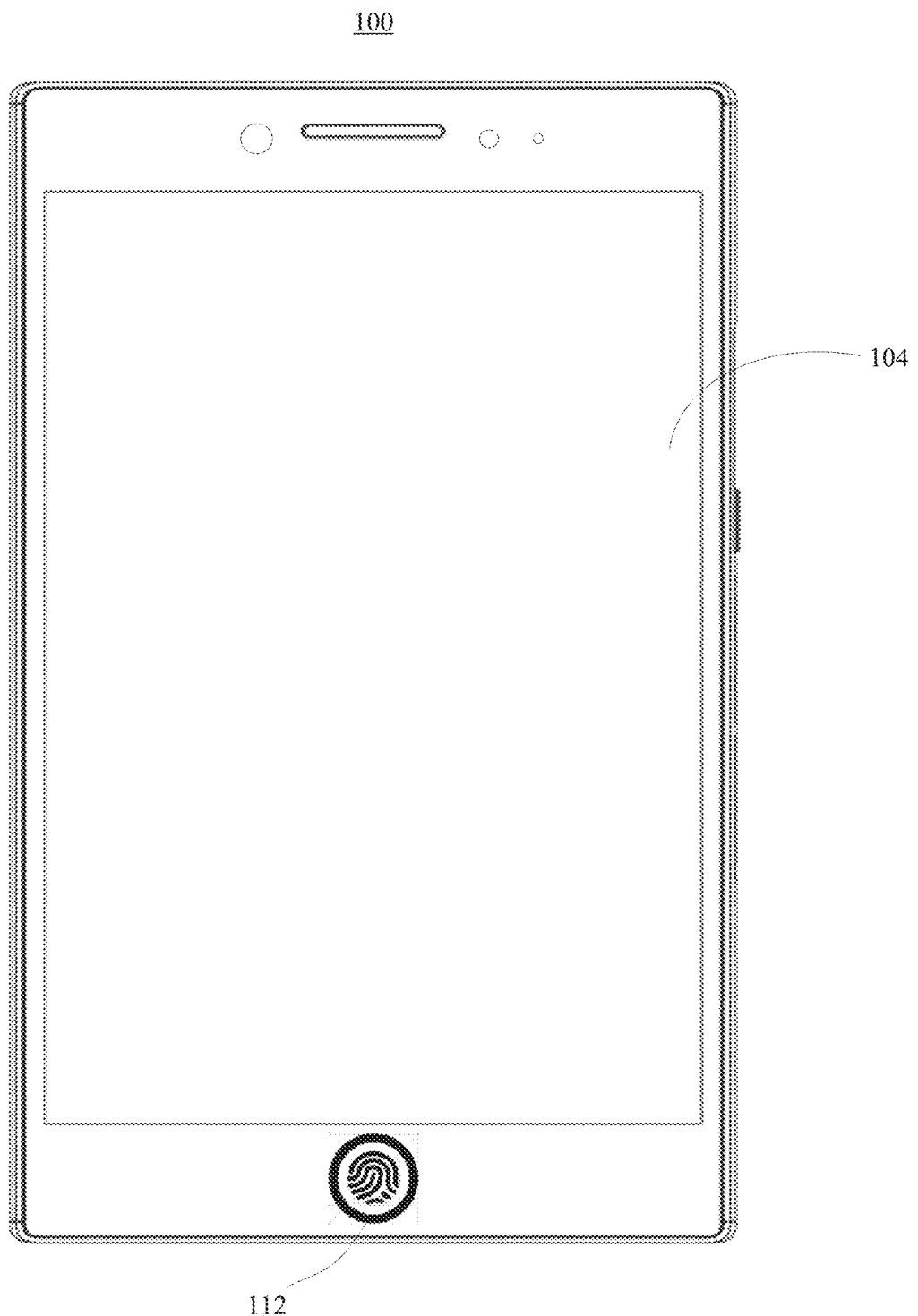
FIG. 2A to FIG. 2C are schematic diagrams of different appearances of a mobile phone in some embodiments.
Figure 2B:
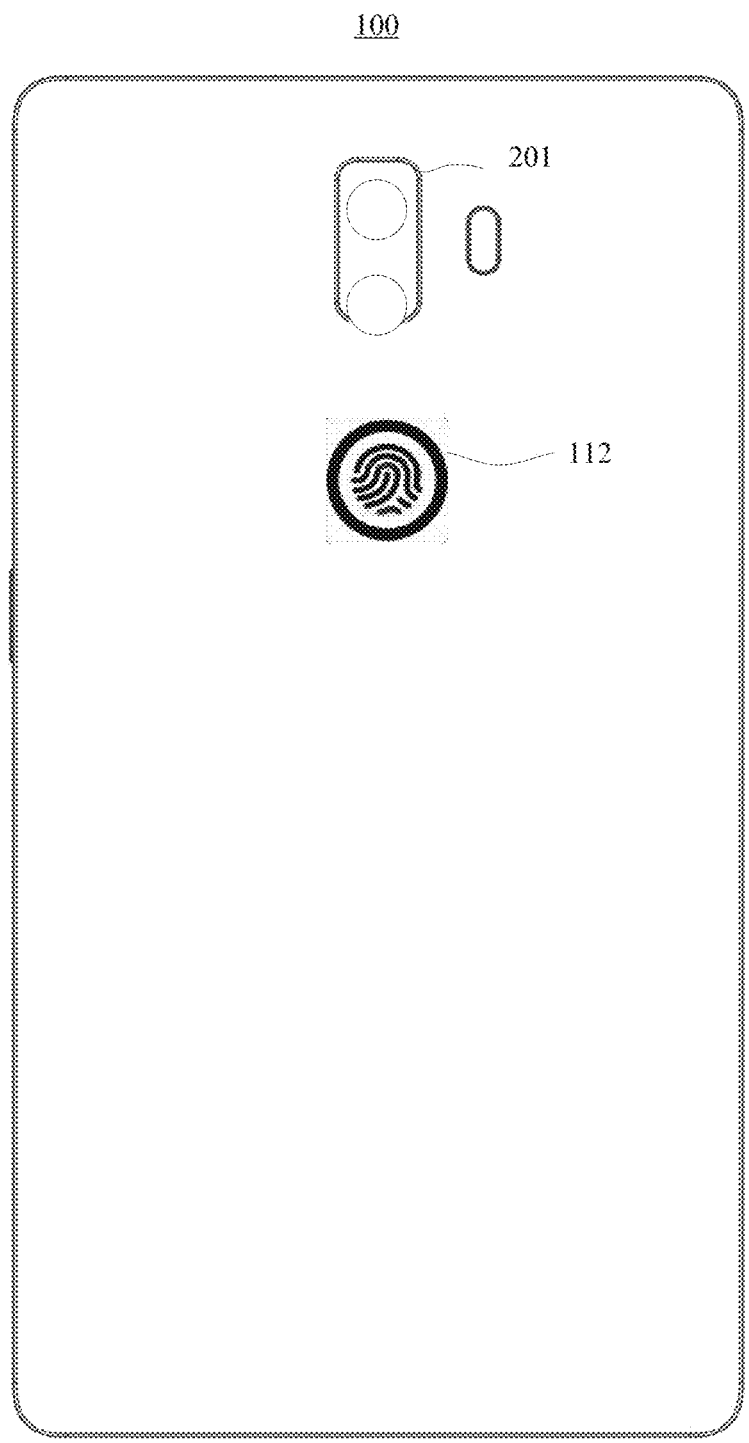

In the embodiments of this application, the mobile phone 100 may further have a fingerprint recognition function. For example, a fingerprint recognizer 112 is disposed on the back of the mobile phone 100 (for example, below a rear-facing camera), or a fingerprint recognizer 112 is disposed on the front surface of the mobile phone 100 (for example, below the touchscreen 104). As shown in FIG. 2A, the fingerprint recognizer 112 is disposed below the touchscreen 104 of the mobile phone 100. The fingerprint recognizer 112 may gather a fingerprint once during one touch event. As shown in FIG. 2B, an area 201 for disposing a camera is present on the back of the mobile phone 100. Two cameras are disposed in the area 201 to enhance quality of a gathered image. The fingerprint recognizer 112 is disposed below the area 201, and the fingerprint recognizer 112 may gather a fingerprint once during one touch event.

Figure 2C:
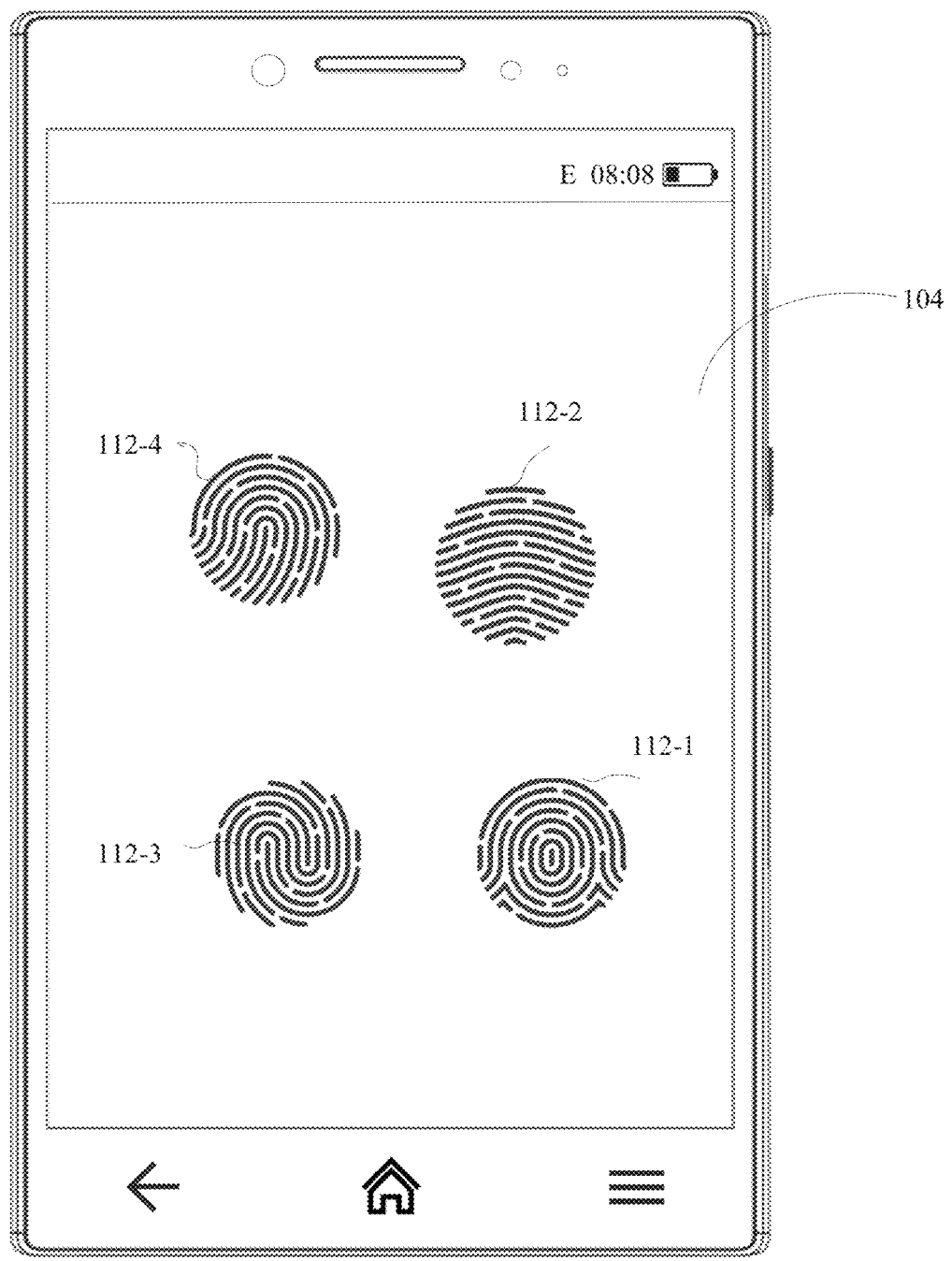

In addition, a fingerprint recognition function may alternatively be implemented by disposing a fingerprint recognizer 112 on the touchscreen 104. That is, the fingerprint recognizer 112 may be integrated into the touchscreen 104 to implement the fingerprint recognition function of the mobile phone 100. In this case, the fingerprint recognizer 112 may be disposed on the touchscreen 104, may be a part of the touchscreen 104, or may be disposed on the touchscreen 104 in another manner. As shown in FIG. 2C, four fingerprint recognizers: 112-1, 112-2, 112-3, and 112-4 are disposed in four different positions of the touchscreen 104. The touchscreen 104 may obtain a plurality of touch events simultaneously, but gather one fingerprint of only one of the touch events or gather all fingerprints of all touch events simultaneously. In other embodiments, the positions of the four fingerprint recognizers may be in a lower part of the touchscreen 104, and in particular, the fingerprint recognizers 112 may be disposed in areas of the touchscreen 104 that are reachable by a thumb when a user holds the mobile phone 100. This can facilitate one-hand operation on the mobile phone by the user.

In addition, the fingerprint recognizer 112 may alternatively be implemented as a full-panel fingerprint recognizer. Therefore, the touchscreen 104 may be considered as a panel supporting fingerprint gathering in any position. The fingerprint recognizer 112 may send the gathered fingerprint to the processor 101, so that the processor 101 processes the fingerprint (for example, fingerprint verification). A main component of the fingerprint recognizer 112 in this embodiment of this application is a fingerprint sensor. The fingerprint sensor may use any type of sensing technology, including but not limited to an optical technology, a capacitive technology, a piezoelectric technology, or an acoustic wave sensing technology.

In this embodiment of this application, the fingerprint may be gathered in a fixed position on the touchscreen 104; the fingerprint may be gathered in any position on the touchscreen 104; or a plurality of touch events may be obtained simultaneously on the touchscreen 104, and the fingerprint recognizer 112 may gather one fingerprint of only one of the touch events or may gather all fingerprints of all touch events simultaneously. For a specific technology of integrating the fingerprint recognizer into the touchscreen in this embodiment of this application, refer to some specific technical solutions in the prior art, and details are not described herein.

In some embodiments of this application, to reduce power consumed during fingerprint gathering on the touchscreen, the mobile phone 100 may power on or off the fingerprint recognizer 112 in a specified situation. For example, when detecting a touch event performed by a user in a specified position on the touchscreen 104, the mobile phone 100 may power on the fingerprint recognizer, so that the mobile phone 100 recognizes a fingerprint. However, when a touch event performed by a user in a specified position on the touchscreen 104 is not detected, the mobile phone 100 does not power on the fingerprint recognizer, that is, the mobile phone 100 disables a fingerprint recognition function. The touch event may be pressing the touchscreen by the user until pressure reaches a predetermined threshold, and then powering on the fingerprint recognizer, or the like. In other embodiments of this application, the mobile phone 100 may display a fingerprint recognition-related switch control element in a settings menu, so that the user manually enables or disables the fingerprint recognition function. In still other embodiments of this application, the mobile phone 100 may alternatively enable or disable the fingerprint recognition function based on a specified condition. For example, the mobile phone may enable or disable the fingerprint recognition function based on different geographic locations. When the mobile phone is located at home, the fingerprint recognition function is disabled because a home is a quite private and safe place and fingerprint verification can be omitted; and when the mobile phone is located in a public place such as a coffee shop the mobile phone enables the fingerprint recognition function because the public place is less private and not safer than the home and the mobile phone needs to perform fingerprint verification such as screen unlock.

The mobile phone 100 may further include a Bluetooth apparatus 105 configured to exchange data between the mobile phone 100 and another short-distance electronic device (for example, a mobile phone or a smartwatch). The Bluetooth apparatus in this embodiment of this application may be an integrated circuit, a Bluetooth chip, or the like.

The mobile phone 100 may further include at least one sensor 106 such as a light sensor or a motion sensor. Specifically, the light sensor may include an ambient light sensor and a proximity sensor. The ambient light sensor can adjust luminance of the display of the touchscreen 104 according to brightness of ambient light, and the proximity sensor can power off the display when the mobile phone 100 is moved close to an ear. As one type of motion sensors, an accelerometer sensor can detect a magnitude of acceleration in all directions (which are usually three axes), and can detect a magnitude and a direction of gravity when being at rest. The accelerometer sensor can be configured to: identify posture application (such as screen switching between landscape and portrait, related games, and magnetometer posture calibration) of the mobile phone, identify vibration-related functions (such as a pedometer and knocking), and the like. For other sensors such as a gyroscope, a barometer, a hygrometer, a thermometer, and an infrared sensor that may be configured for the mobile phone 100, details are not described herein.

The Wi-Fi apparatus 107 is configured to provide, for the mobile phone 100, network access that complies with Wi-Fi related standard protocols. The mobile phone 100 may access a Wi-Fi access point by using the Wi-Fi apparatus 107, to help the user receive or send an email, browse a webpage, access streaming media, and the like. The Wi-Fi apparatus provides wireless broadband Internet access for the user. In other embodiments, the Wi-Fi apparatus 107 may alternatively be used as a Wi-Fi wireless access point and may provide Wi-Fi network access for another electronic device.

The positioning apparatus 108 is configured to provide a geographic location for the mobile phone 100. It can be understood that the positioning apparatus 108 may be specifically a receiver of a positioning system, for example, a global positioning system (GPS), a Beidou satellite navigation system, or Russia GLONASS. After receiving a geographic location sent by the foregoing positioning system, the positioning apparatus 108 sends the information to the processor 101 for processing, or sends the information to the memory 103 for saving the information. In still other embodiments, the positioning apparatus 108 may be a receiver of an assisted global positioning system (AGPS). An AGPS supports a running mode in which GPS positioning is performed with specified assistance. The AGPS may use a signal of a base station along with a GPS satellite signal, so as to position the mobile phone 100 at a higher speed. In the AGPS system, the positioning apparatus 108 can communicate with an assistance positioning server (for example, a mobile phone positioning server) to obtain positioning assistance. The AGPS system acts as an assistance server to assist the positioning apparatus 108 in completing ranging and positioning services. In this case, the assistance positioning server communicates with the positioning apparatus 108 (to be specific, a GPS receiver) of the electronic device such as the mobile phone 100 by using a wireless communications network, to provide positioning assistance. In still other embodiments, the positioning apparatus 108 may alternatively be a positioning technology based on a Wi-Fi access point. Each Wi-Fi access point has a globally unique MAC address and an electronic device can scan for and gather a broadcast signal of a surrounding Wi-Fi access point when Wi-Fi is enabled; therefore, a MAC address broadcast by the Wi-Fi access point can be obtained. The electronic device sends data (for example, the MAC address) that can identify the Wi-Fi access point to a position server by using a wireless communications network, and the position server detects a geographic location of each Wi-Fi access point, calculates a geographic location of the electronic device with reference to strength of the broadcast signal of Wi-Fi, and sends the geographic location of the electronic device to the positioning apparatus 108 of the electronic device.

The audio circuit 109, a loudspeaker 113, and a microphone 114 can provide audio interfaces between the user and the mobile phone 100. The audio circuit 109 may transmit, to the loudspeaker 113, an electrical signal obtained by converting received audio data, and the loudspeaker 113 converts the electrical signal into a sound signal for outputting. In addition, the microphone 114 converts a collected sound signal into an electrical signal, and the audio circuit 109 receives the electrical signal and converts the electrical signal into audio data, and then outputs the audio data to the RF circuit 102, so that the audio data is sent to, for example, another mobile phone, or the audio data is output to the memory 103 for further processing.

The peripheral interface 110 is configured to provide various interfaces for an external input/output device (for example, a keyboard, a mouse, an externally connected display, an external memory, or a subscriber identity module card). For example, a universal serial bus (USB) interface is used to connect to a mouse, or a metal contact on a slot of a subscriber identity module card is used to connect to a subscriber identity module (SIM) card provided by a telecommunications operator. The peripheral interface 110 may be used to couple the external input/output peripheral device to the processor 101 and the memory 103.

The mobile phone 100 may further include a power supply apparatus 111 (for example, a battery and a power management chip) that supplies power to various components. The battery may be logically connected to the processor 101 by using the power management chip, so as to implement functions such as charge management, discharge management, and power consumption management by using the power supply apparatus 111.

Although not shown in FIG. 1, the mobile phone 100 may further include a camera (a front-facing camera and/or a rear-facing camera), a flashlight, a micro projection apparatus, a near field communication (NFC) apparatus, or the like, and details are not described herein.

All of the following embodiments can be implemented by a mobile phone 100 with the foregoing structure.

Figure 3A:
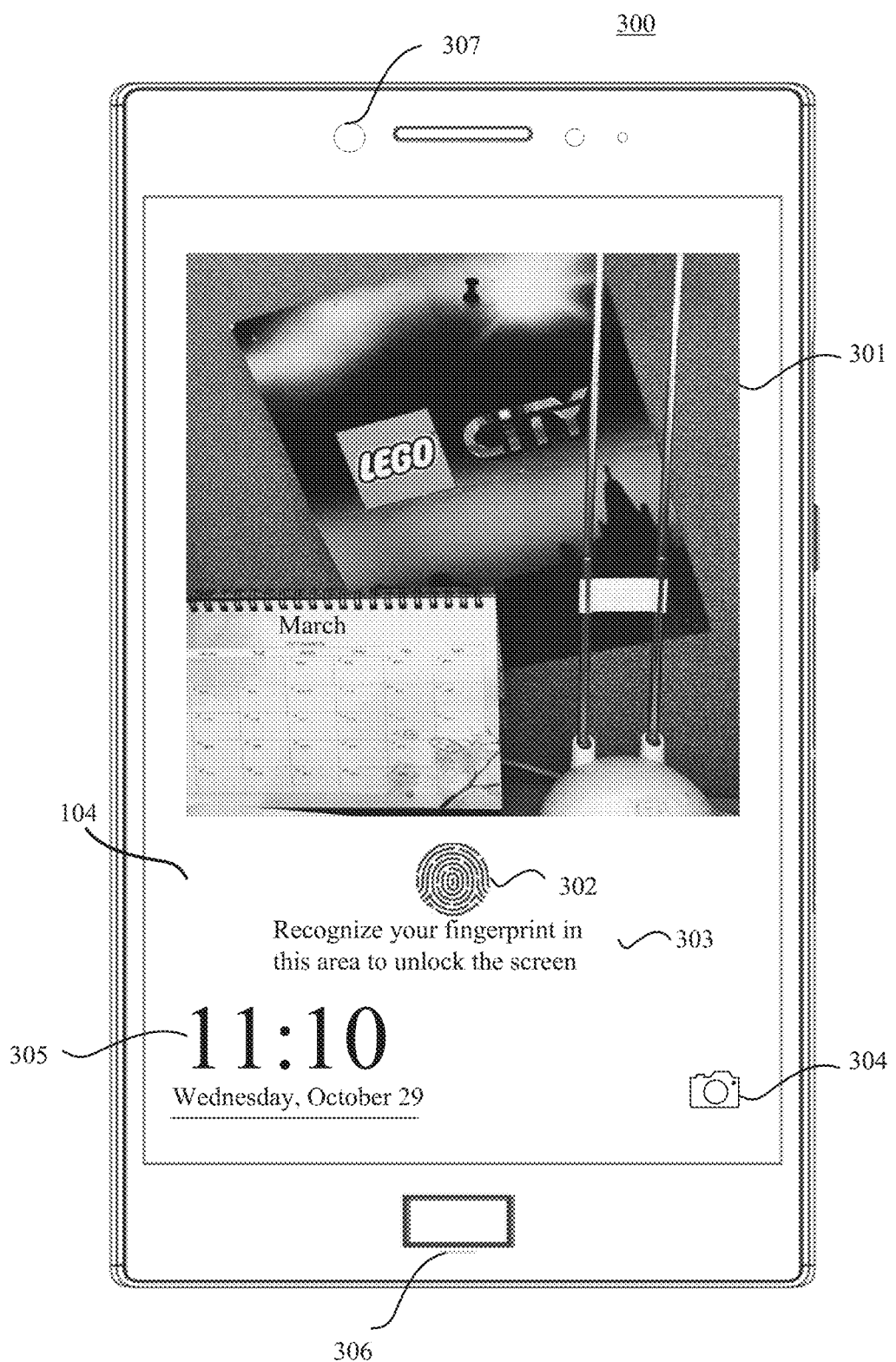
FIG. 3A and FIG. 3B are schematic diagrams of graphical user interfaces displayed on an electronic device 300 in some embodiments.

In an embodiment of this application, as shown in FIG. 3A, an example of a screen-locked graphical user interface (lock screen for short below) is displayed on a touchscreen 104 of an electronic device 300 (for example, a mobile phone 100). The lock screen may be a graphical user interface (GUI) displayed on the touchscreen 104 of the electronic device 300. A main screen of an operating system of the electronic device 300 can be displayed only after a user performs a specified operation on the GUI. This effectively protects data security of the operating system. The specified operation may be at least one of the following operations: after the user performs a slide gesture on the touchscreen, the user needs to enter a password, the user needs to perform fingerprint recognition, the user needs to perform face recognition, the user needs to perform iris recognition, or the like.

The lock screen may include a plurality of interface elements, for example, lock screen wallpaper 301, a fingerprint unlock icon 302, a prompt box 303, a quick-start camera icon 304, and a time and date 305. The lock screen wallpaper 301 may be automatically updated regularly for displaying. The fingerprint unlock icon 302 is configured to prompt a user with the following information: Fingerprint verification may be performed in a display area of the icon 302, to unlock a screen, and the fingerprint unlock icon 302 may use some interface elements to visually prompt the user how to unlock the screen. As shown in FIG. 3A, the fingerprint unlock icon 302 may be displayed as a fingerprint-shaped icon, another control element, or the like. The fingerprint unlock icon 302 may guide and instruct the user to unlock the screen with reference to prompt information in the prompt box 303. The display area of the fingerprint unlock icon 302 on the touchscreen may alternatively be a position in which the fingerprint recognizer is disposed. That is, the area of the fingerprint unlock icon 302 may be considered as a fingerprint unlock area. Therefore, the fingerprint unlock icon 302 is actually also a fingerprint gathering area. A finger (which is alternatively a stylus or the like) of the user can touch the fingerprint unlock icon 302, so that the electronic device 300 gathers and verifies a fingerprint and quickly unlocks the screen. In other embodiments of this application, the fingerprint unlock icon 302 and/or the prompt box 303 may alternatively not be displayed on the touchscreen first. However, after receiving input of the user, the electronic device 300 displays, in response to the input, the fingerprint unlock icon 302 and/or the prompt box 303 on the lock screen. The input of the user may be an operation of pressing a home button 306 by using a finger of the user, may be a touch event performed by using the finger of the user on the touchscreen 104, or the like. In addition, the user may also gradually learn, through continuous trial and error learning, that a specific position on the touchscreen is a fingerprint unlock area.

The display area of the fingerprint unlock icon 302 may be in an arc-shaped area (not shown in the figure) of the touchscreen 104 that is reachable for a thumb of the user. This can facilitate one-hand operation by the user, thereby improving user experience. The prompt box 303 is configured to display, on the touchscreen 104, some prompt information related to screen unlocking, to provide a prompt for the user. For example, the prompt information may be "Recognize your fingerprint in this area to unlock the screen". The prompt information in the prompt box 303 may be different information displayed based on different operations performed by the user on the touchscreen 104, and detailed descriptions are provided in the following embodiment. In addition to the components in FIG. 1, the electronic device 300 may further include the home button 306, a front-facing camera 307, and the like. The home button 306 may be configured to perform an operation of quickly returning to a main screen, performing screen capture, or the like. The front-facing camera 307 may be configured to perform iris recognition, so that the user quickly unlocks the touchscreen, or the like. In other embodiments of this application, the lock screen may alternatively not include some of the foregoing interface elements, such as the time and date 305 and the quick-start camera icon 304.

Figure 3B:

The electronic device 300 detects a touch event performed by using the finger of the user on the fingerprint unlock icon 302. The touch event may be specifically slightly touching the touchscreen by using the finger of the user, or the like. In response to the touch event, the electronic device 300 can gather a fingerprint in the touch event by using a fingerprint recognizer 112 on the touchscreen corresponding to the display area of the fingerprint unlock icon 302, and verify the fingerprint (for example, comparing the fingerprint with a prestored valid fingerprint). If fingerprint verification succeeds, the electronic device 300 unlocks the screen, and displays a GUI shown in FIG. 3B. The GUI may be a main screen of the electronic device 300. The GUI may include a status bar 308 that displays a telecommunications operator name, a name of a currently registered network, time, a battery level, or the like. The GUI further includes a time and weather widget 309 configured to display time, a date, weather of a region, or the like. The GUI further includes a collapsible navigation bar 310, and may further include a desktop indicator 311. The desktop indicator 311 indicates that there are three screens on the electronic device 300 that are configured to display various application icons, shortcuts, and widgets. A currently displayed screen is a main screen, and other main screens may be displayed in response to a touch operation performed on the touchscreen 104 by using a finger of the user.

In other embodiments of this application, the electronic device 300 detects a touch event performed on the fingerprint unlock icon 302 by the user. In response to the touch event, the electronic device 300 may power on the fingerprint recognizer or wake up the fingerprint recognizer from a sleep mode. In this case, a fingerprint recognition function of the electronic device 300 is enabled. The electronic device 300 further gathers a fingerprint in the touch event by using the fingerprint recognizer, and verifies the fingerprint (for example, comparing the fingerprint with a prestored valid fingerprint). The touch event may be pressing the touchscreen by using the finger of the user until pressure reaches a predetermined threshold, may be slightly touching the touchscreen by using the finger of the user and keeping stationary for a predetermined time, or the like. In this case, the fingerprint recognizer can be powered on and work at a proper time, thereby saving power of the electronic device 300.

Figure 4A:
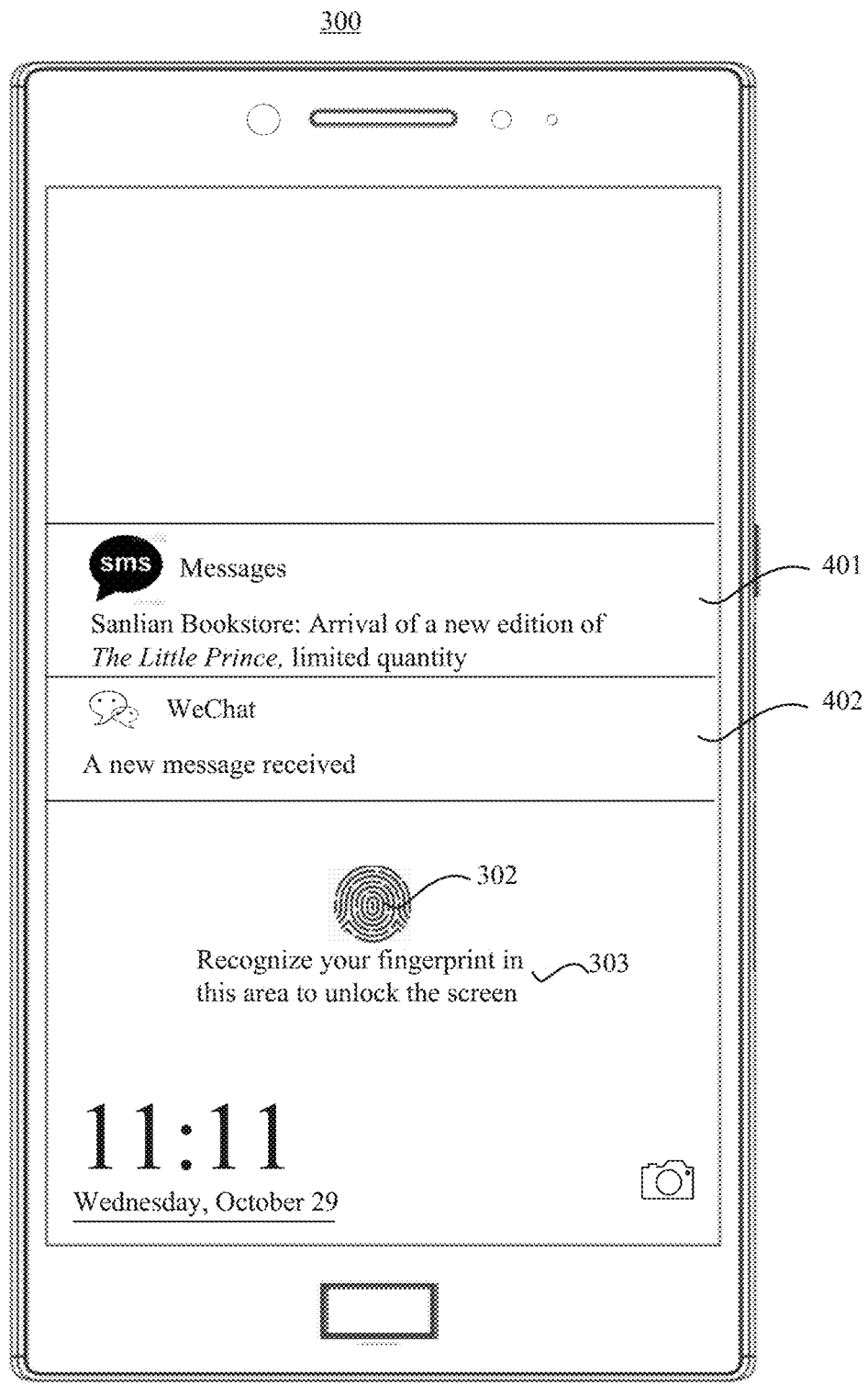
FIG. 4A to FIG. 4K are schematic diagrams of some graphical user interfaces displayed on an electronic device 300 in some embodiments.

When the electronic device 300 receives a new notification (Notification), the notification may be displayed on the lock screen, as shown in FIG. 4A. In this figure, in addition to the interface elements displayed in FIG. 3A, examples of two notifications are further displayed: A notification 401 indicates that this message is an unread SMS message sent by contact "Sanlian Bookstore" and content of the notification is "Arrival of a new edition of The Little Prince, limited quantity"; and a notification 402 indicates presence of an unread WeChat message. Certainly, in other embodiments, there may alternatively be only one notification on the lock screen. It can be understood that a person skilled in the art can learn that the notification (Notification) in all the embodiments of this application may be a term in an Android® open-source operating system. Technical person can create a notification based on a notification-specific development guide of the system, so as to display different types of notifications on the touchscreen, for example, a status bar notification, a floating notification, or a lock screen notification. The notification may alternatively be a notification of an iOS operating system, or the like. Each notification is corresponding to a corresponding application or widget (Widget), or the like. That is, when the user operates the notification (for example, slightly touching or pressing the notification), the notification jumps to a corresponding application or another user interface. For example, when the user taps a notification, a user interface of an application may be opened and specific information related to the notification is displayed on the user interface. For another example, when the user taps a notification, the electronic device may stop an alarm or immediately reply an SMS message. In the following embodiments, unless otherwise specified, the notification may be a lock screen notification. Certainly, in other embodiments, the notification may be any one or more of a status bar notification, a floating notification, or a lock screen notification. In some embodiments of this application, the electronic device may enable a fingerprint recognition function (that is, the fingerprint recognizer is powered on and starts to work or is woken up from a sleep mode) only after receiving a new notification.

In FIG. 4A, the notifications, the fingerprint unlock icon 302, and the prompt box 303 are located in different display areas on the lock screen. If the user is not interested in the newly received notifications 401 and 402, the user may touch the fingerprint unlock icon 302 of the lock screen by using a finger. The electronic device 300 gathers a fingerprint by using the fingerprint recognizer 112 on the touchscreen corresponding to the display area of the fingerprint unlock icon 302, and performs verification by comparing the fingerprint with a prestored valid fingerprint. If verification succeeds, the electronic device 300 unlocks the screen and displays the GUI shown in FIG. 3B.

Figure 4B:
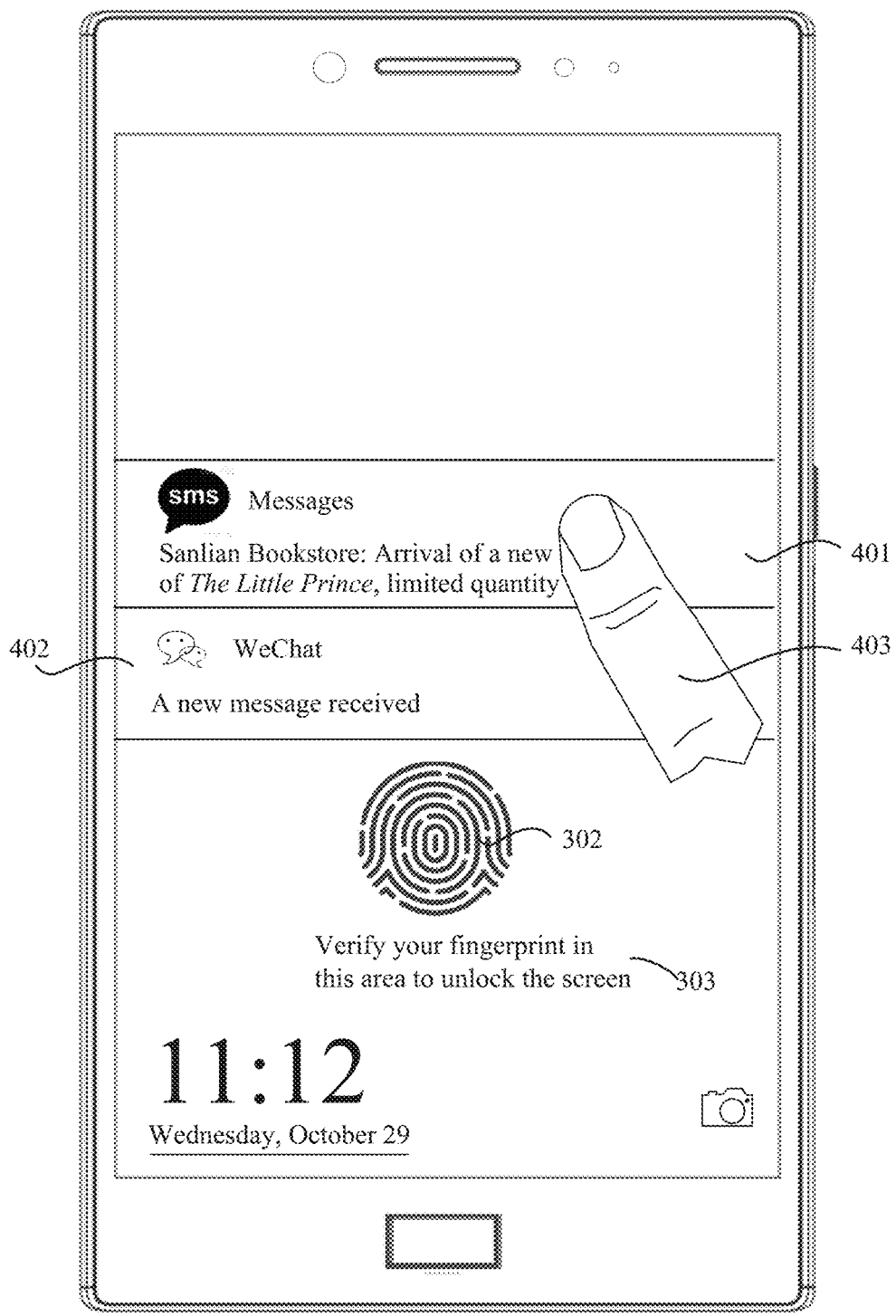
Figure 4C:
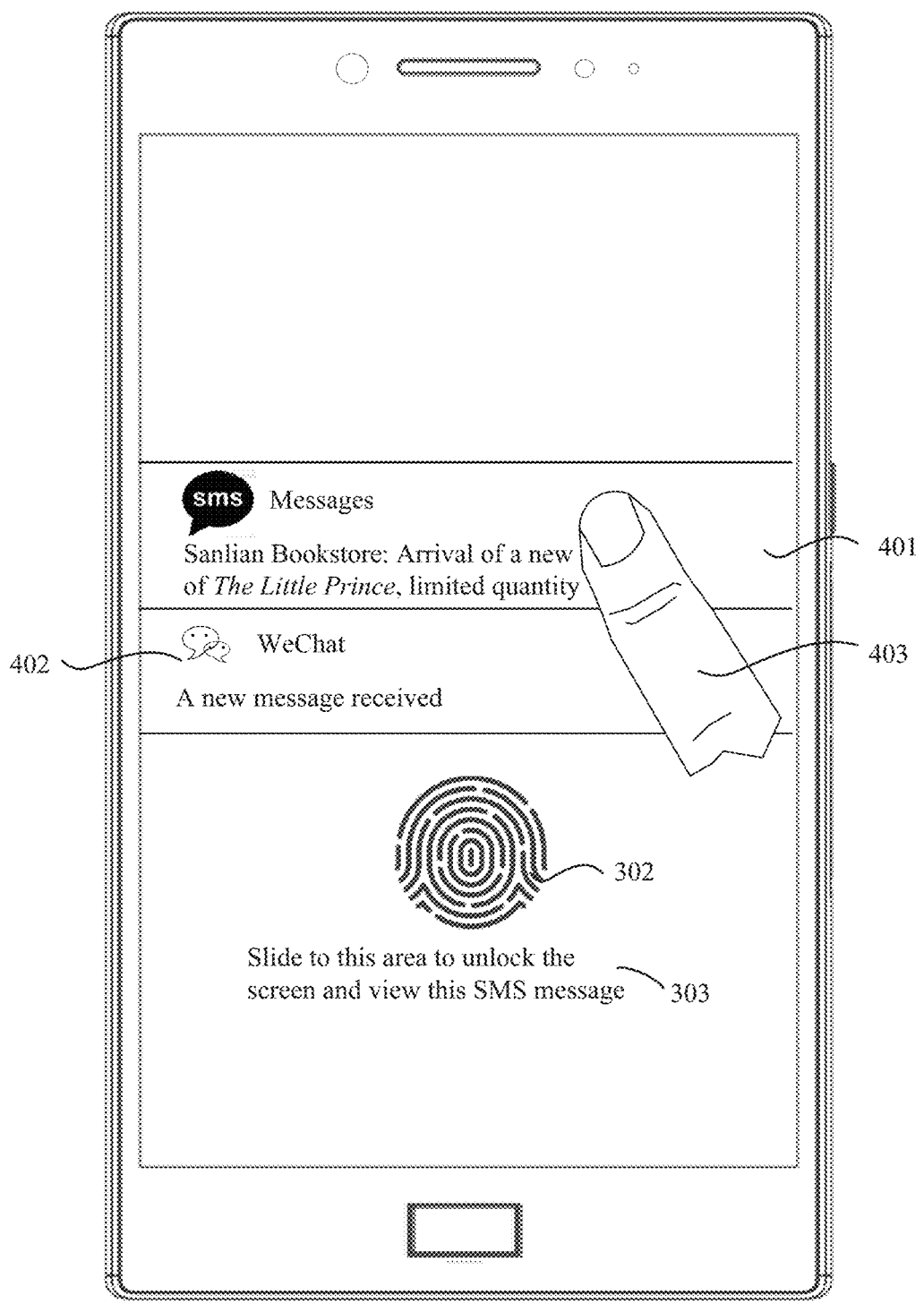

In some embodiments of this application, the electronic device 300 detects a first touch event performed by using a finger 403 (which is alternatively a stylus or the like) of a user on the notification 401, and in response to the first touch event, the electronic device 300 may display the prompt box 303 or the fingerprint unlock icon 302 prominently, to remind the user that a further operation (for example, starting an app corresponding to the notification) can be performed on the selected notification 401. A specific prominently-displaying manner may be any displaying or prompting manner used to prompt the user to pay special attention. As shown in FIG. 4B, compared with that in FIG. 4A, the fingerprint unlock icon 302 with a bigger size is displayed, that is, the fingerprint unlock icon 302 is displayed in a zoom-in mode. In other embodiments, the prompt box 303 may also be displayed in a zoom-in mode. In addition, prominently displaying may also be displaying the fingerprint unlock icon 302 or the prompt box 303 in a blinking manner at a specified frequency. In this way, the user can be reminded in a more proper manner. In other embodiments of this application, in response to the first touch event, when the prompt box 303 is displayed prominently (for example, being displayed in a zoom-in mode), prompt information displayed in the prompt box 303 may also be changed. As shown in FIG. 4C, the prompt information may be changed to "Slide to this area to unlock the screen and view this SMS message". It can be understood that if the first touch event is specific to the notification 402, the prompt information displayed in FIG. 4C may be changed to "Slide to this area to unlock the screen and view this WeChat message". That is, the electronic device 300 may display different prompt information in the prompt box 303 depending on different types of notifications to which the finger 403 of the user points. In this way, the user is prompted more accurately with a user-interested notification, and the user is guided intelligently to perform a correct operation. In other embodiments of this application, the electronic device may enable the fingerprint recognition function (that is, the fingerprint recognizer is powered on and starts to work, or is woken from the sleep mode) only after detecting the first touch event performed by the user on the notification 401. In this way, power of the electronic device can be further saved.

In other embodiments, to make a user focus on a current operation, other interface elements that are unrelated to the operation and displayed in FIG. 4A can be hidden (that is, not displayed on the lock screen), or displayed as a background after Gaussian blur processing is performed. As shown in FIG. 4C, the time and date 305 and the quick-start camera icon 304 that are originally displayed in FIG. 4B can be hidden, or displayed as a background. In addition, compared with that in FIG. 4A, the unselected notification 402 can be displayed in a zoom-out mode, or the notification 402 is no longer displayed on the lock screen or is displayed as a background after Gaussian blur processing is performed.

In other embodiments of this application, in response to the first touch event, the electronic device 300 may display the prompt box 303 or the fingerprint unlock icon 302 prominently (for example, being displayed in a zoom-in mode) in a different degree according to a priority of the selected notification 401. For example, in response to the first touch event, the electronic device 300 determines that the notification 401 corresponding to the first touch event has a lowest priority; the prompt box 303 or the fingerprint unlock icon 302 may be displayed in a zoom-in mode based on a smallest zoom-in coefficient, or the prompt box 303 or the fingerprint unlock icon 302 is not displayed in a zoom-in mode (that is, at a size the same as a previous displaying size). For another example, in response to the first touch event, the electronic device 300 determines that the notification 401 corresponding to the first touch event has a highest priority; the prompt box 303 or the fingerprint unlock icon 302 is displayed in a zoom-in mode based on a largest zoom-in coefficient. In this embodiment, the priority may be used to distinguish between an important notification, a common notification, an unimportant notification, and the like. The priority may be a default value in the electronic device or may be user-defined. For example, the user may set a priority of an SMS-related notification to common, or set a priority of a WeChat-related notification to important. In addition, a notification priority may be set with reference to a related function in an Android operating system.

Figure 4D:
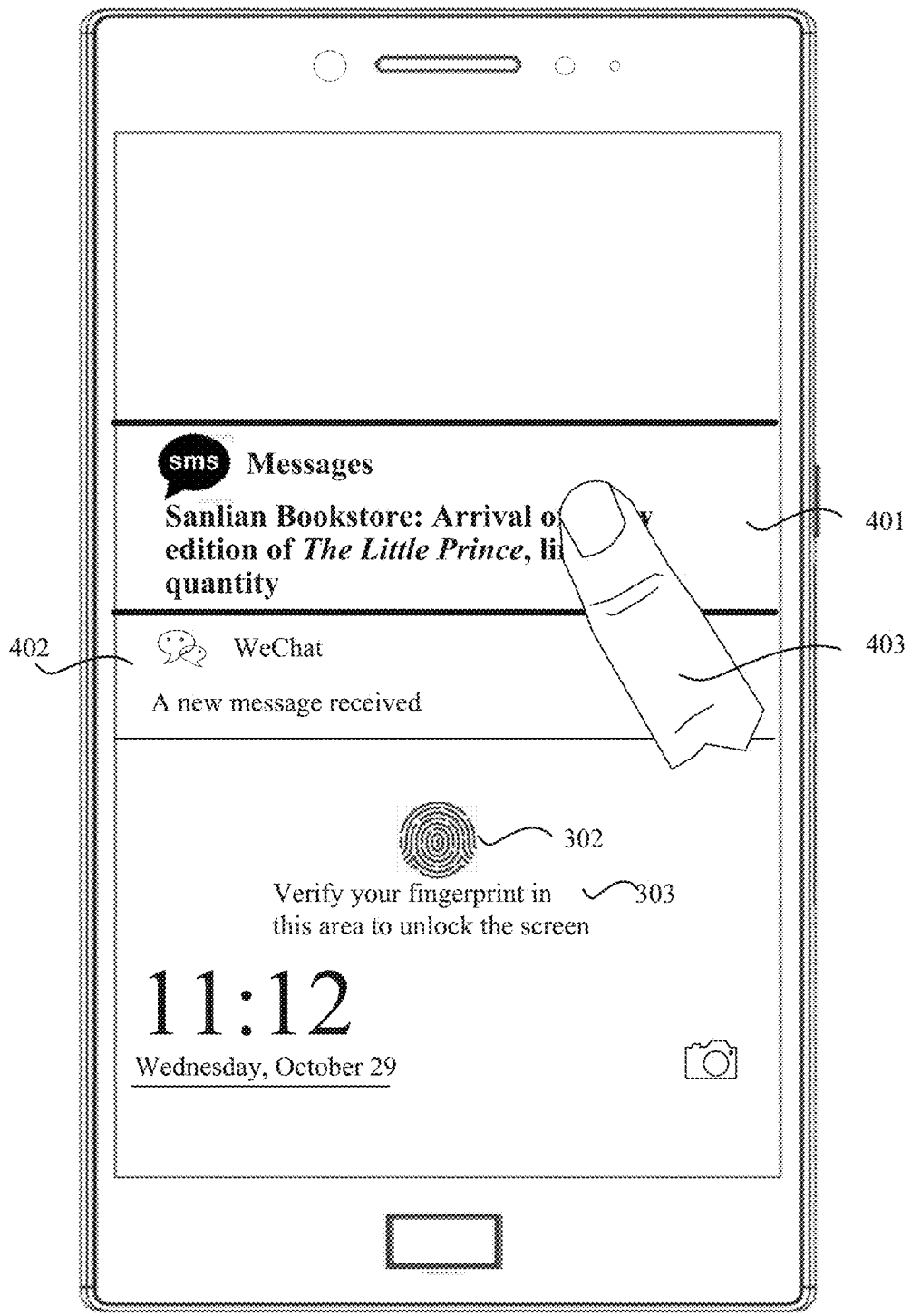

In other embodiments of this application, in response to the first touch event, the electronic device 300 may further display the selected notification 401 prominently, so as to remind the user of a specific selected notification. A prominently-displaying manner may be the same as or similar to the manner in the foregoing embodiment. As shown in FIG. 4D, after the finger 403 of the user touches the notification 401, the notification 401 is displayed in a zoom-in mode. However, because the notification 402 is not touched, the notification 402 is still displayed as before.

Figure 4E:
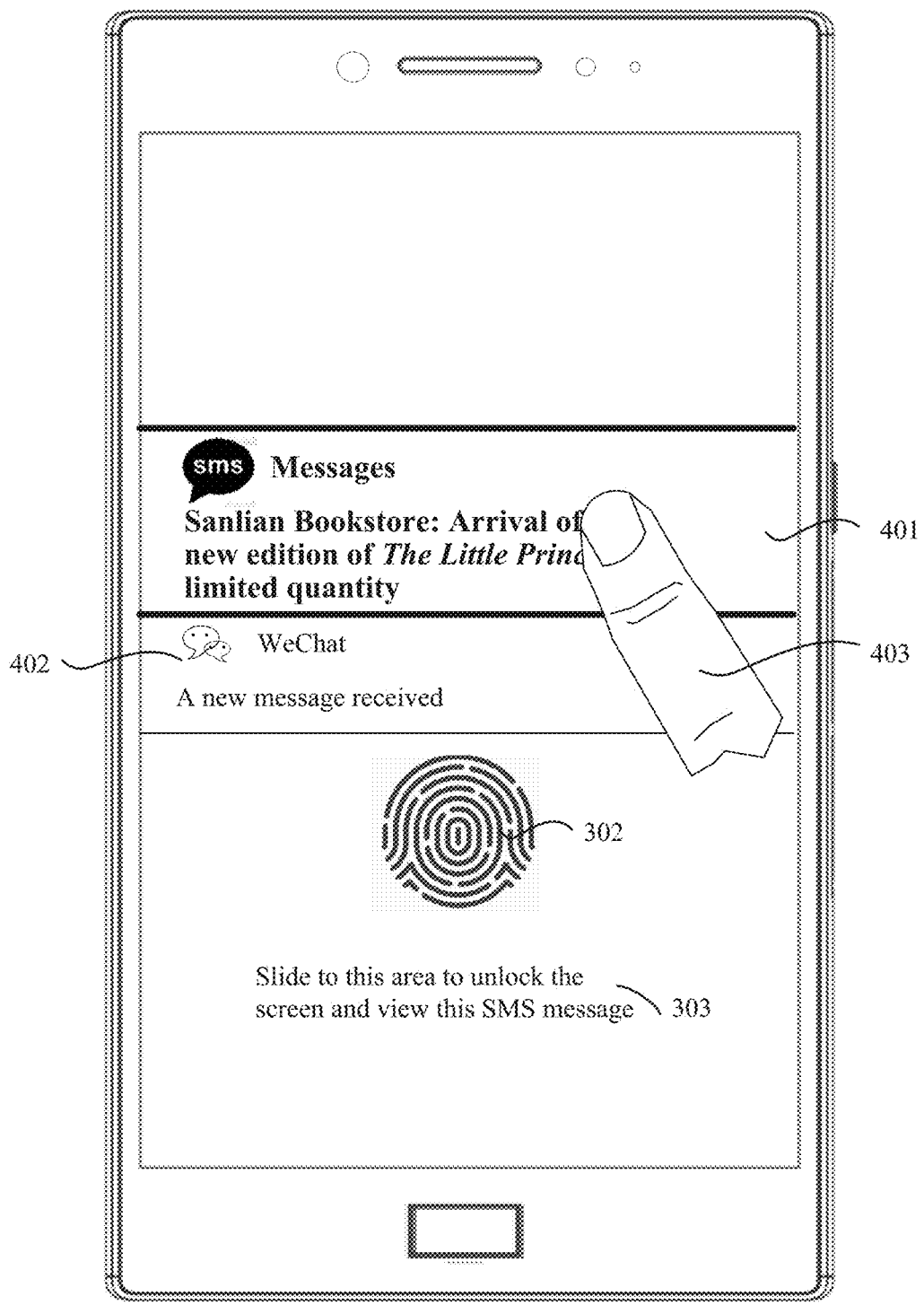

In other embodiments, in response to the first touch event, when the electronic device displays the notification 401 in a zoom-in mode, the fingerprint unlock icon 302 may also be displayed in a zoom-in mode, and the prompt information in the prompt box 303 may also be changed to "Slide to this area to unlock the screen and view this SMS message". In addition, to make a user focus on a current operation, other interface elements that are unrelated to the operation and displayed in FIG. 4A can be hidden (that is, not displayed on the lock screen), or displayed as a background after Gaussian blur processing is performed. As shown in FIG. 4E, the time and date 305 and the quick-start camera icon 304 can be hidden or displayed as a background, and the unselected notification 402 is displayed in a zoom-out mode.

The first touch event in this embodiment may be slightly touching the touchscreen 104 by using the finger 403 of the user and keeping stationary for a predetermined time, or may be pressing the touchscreen 104 by using the finger 403 of the user and keeping stationary for a predetermined time, or may be slightly touching the touchscreen 104 by using the finger 403 of the user and then pressing the touchscreen 104. It can be understood that, in addition to the foregoing listed gestures, the first touch event may alternatively be another type of gesture. No limitation is imposed on the first touch event in this embodiment. In addition, the first touch event may be understood as a selection operation for the notification 401. To be specific, the electronic device 300 selects the notification 401 through the first touch event, so as to further process the notification 401.

In other embodiments of this application, the first touch event may alternatively be pressing the touchscreen by using the finger of the user. In response to the first touch event, the electronic device 300 may display the fingerprint unlock icon 302, the prompt box 303, or the selected notification prominently (for example, being displayed in a zoom-in mode) in a different degree based on different pressure in the first touch event. For example, higher pressure in the first touch event indicates a larger display area for the fingerprint unlock icon 302, the prompt box 303, or the selected notification. In other embodiments, when the pressure in the first touch event is greater than a predetermined threshold, the selected notification may be displayed as another GUI. In the GUI, a user may perform a shortcut operation (for example, reply or delete) on the notification.

Figure 4F:
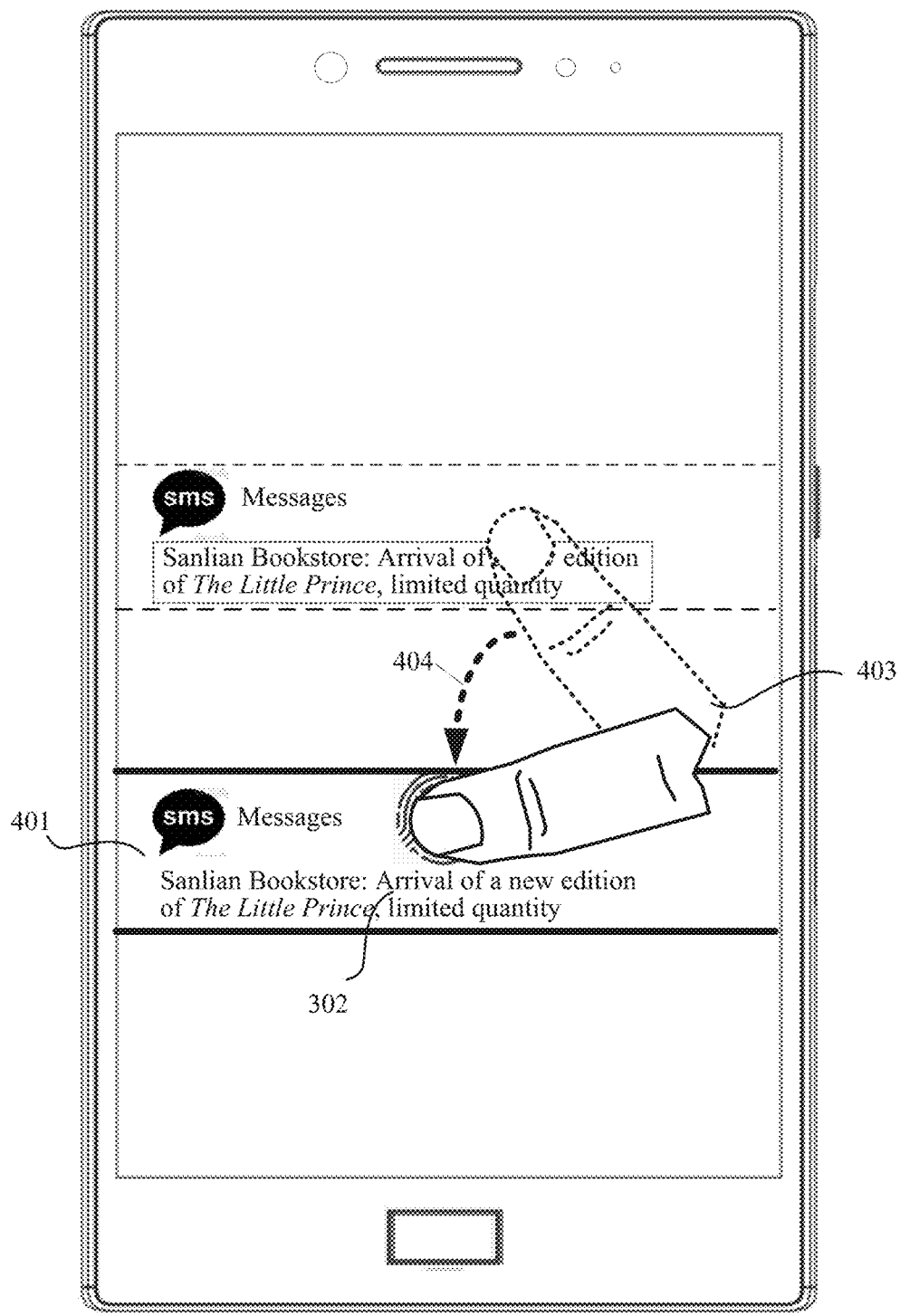
Figure 4G:
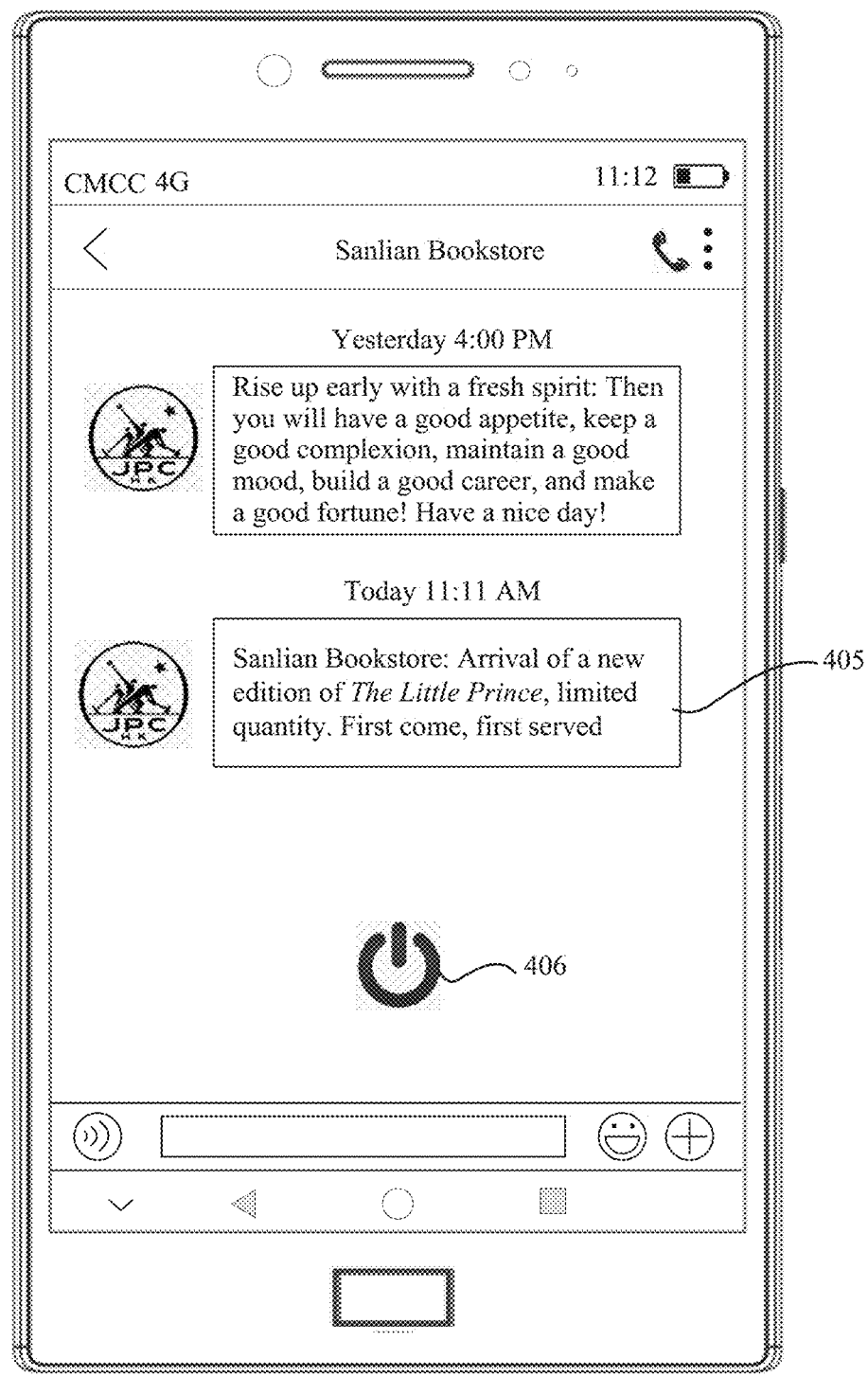

As shown in FIG. 4F, after selecting the notification 401, the electronic device 300 detects a second touch event 404 performed on the touchscreen 104 by using the finger 403 of the user. In response to the second touch event 404, the electronic device 300 may drag the selected notification 401 from an original display area (for example, a position of the notification 401 in FIG. 4C) to a display area in FIG. 4F for display. In FIG. 4F, from a perspective of a display effect, the display area of the notification 401 may partially overlap with a display area of the fingerprint unlock icon 302. The dragged notification 401 is displayed and the user can intuitively view a specific opened notification, so that the user performs a further operation. The second touch event 404 may stop in the display area of the fingerprint unlock icon 302. At that time, the finger 403 of the user touches the fingerprint recognizer 112, corresponding to the display area of the fingerprint unlock icon 302, on the touchscreen, and then the fingerprint recognizer 112 gathers a fingerprint of the user and sends the gathered fingerprint to the processor 101. The processor 101 verifies the gathered fingerprint and determines whether the gathered fingerprint matches a pre-stored valid fingerprint. If the processor 101 determines that the gathered fingerprint matches the valid fingerprint, the processor 101 unlocks the screen, and a GUI of an application (which is alternatively a system setting, widget, or the like) corresponding to the selected notification 401 is displayed on the touchscreen 104. Specific information of the notification 401 is displayed in the GUI, as shown in FIG. 4G In FIG. 4G all specific information 405 of the notification 401 is displayed, and a power icon 406 indicates that after the finger 403 of the user taps the icon 406, the touchscreen is turned off or returns to the lock screen (as shown in FIG. 3A). In other embodiments of this application, to increase a security level, when fingerprint verification is performed in the foregoing embodiments, a front-facing camera 307 may also be used to gather face feature information or iris information. The electronic device 300 may compare the gathered face feature information with prestored valid face feature information, or may compare the gathered iris information with prestored valid iris information. The electronic device 300 unlocks the screen only when both fingerprint verification and face feature information verification succeed, or both fingerprint verification and iris information verification succeed, and displays a GUI of an application corresponding to the selected notification 401.

In still other embodiments of this application, in response to the first touch event, the electronic device 300 may further gather a fingerprint of a user. For example, as shown in FIG. 4E, the first touch event may be slightly touching a position, corresponding to a display area of a notification 401, on the touchscreen. A fingerprint recognizer 112 is disposed in the position. Therefore, the electronic device can gather a user fingerprint in the position. In response to the second touch event 404, the electronic device 300 can verify the gathered fingerprint. After fingerprint verification succeeds, the electronic device 300 unlocks the screen, and displays, on the touchscreen 104, a GUI of an application (which is alternatively a system setting, a widget, or the like) corresponding to the selected notification 401. In this embodiment of this application, the fingerprint recognizer 112 is disposed in a position, corresponding to the display area of the notification 401, on the touchscreen, the electronic device can gather a user fingerprint in the position, and the second touch event 404 is a condition for triggering the electronic device 300 to verify the gathered user fingerprint.

Figure 10A:
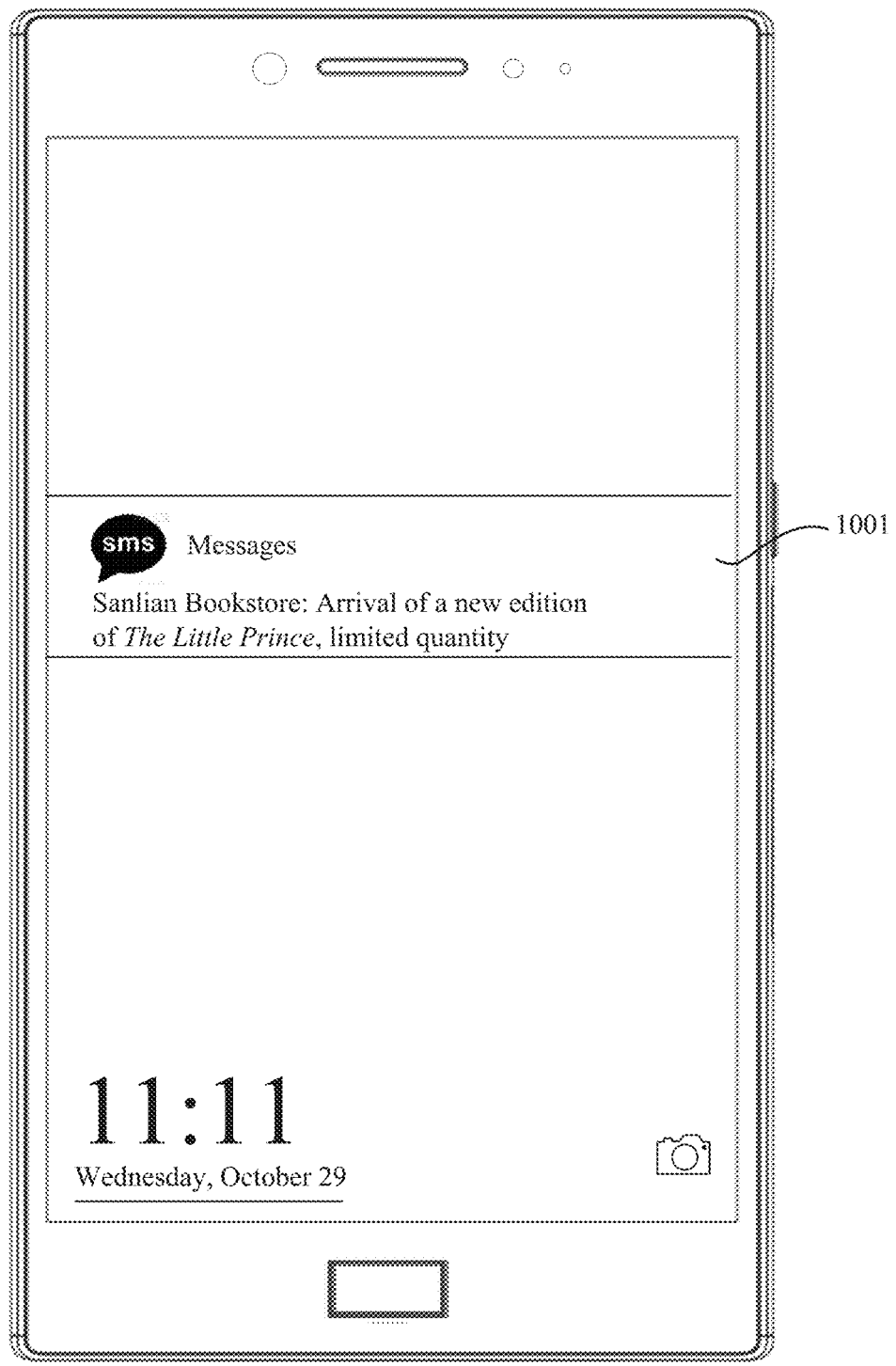
FIG. 10A to FIG. 10D are schematic diagrams of some graphical user interfaces displayed on an electronic device in still other embodiments.
Figure 10B:
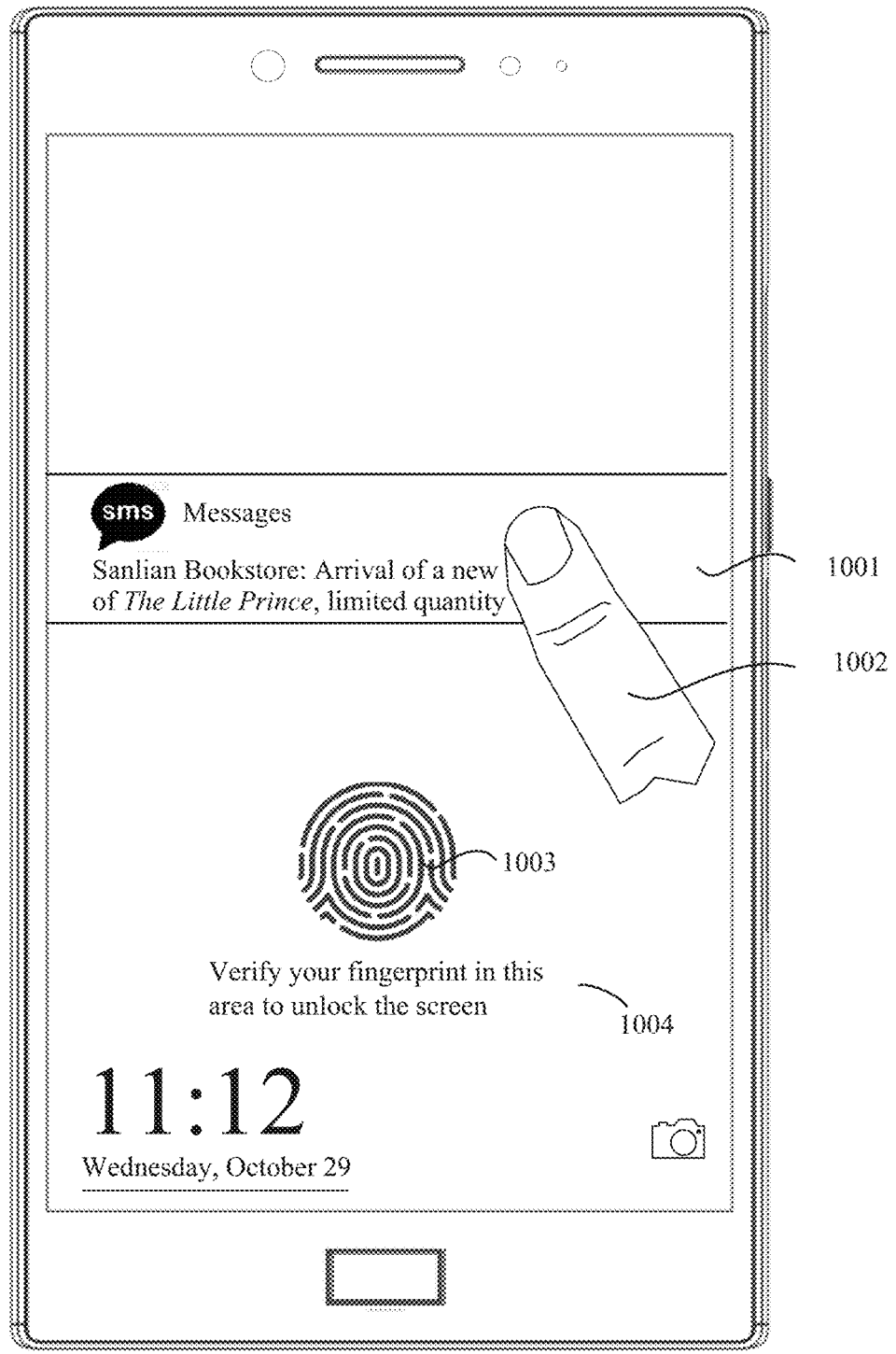
Figure 10C:
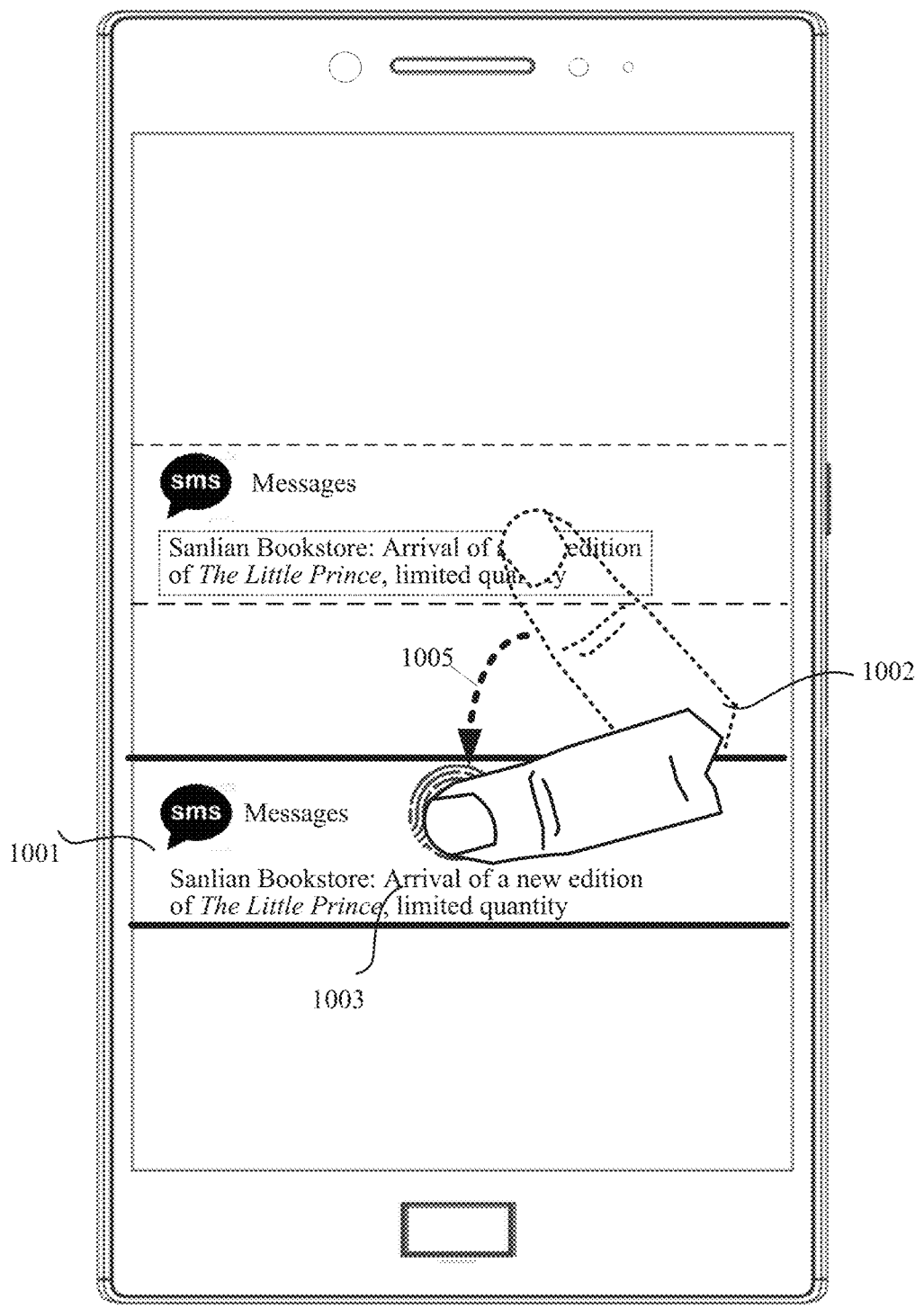
Figure 10D:
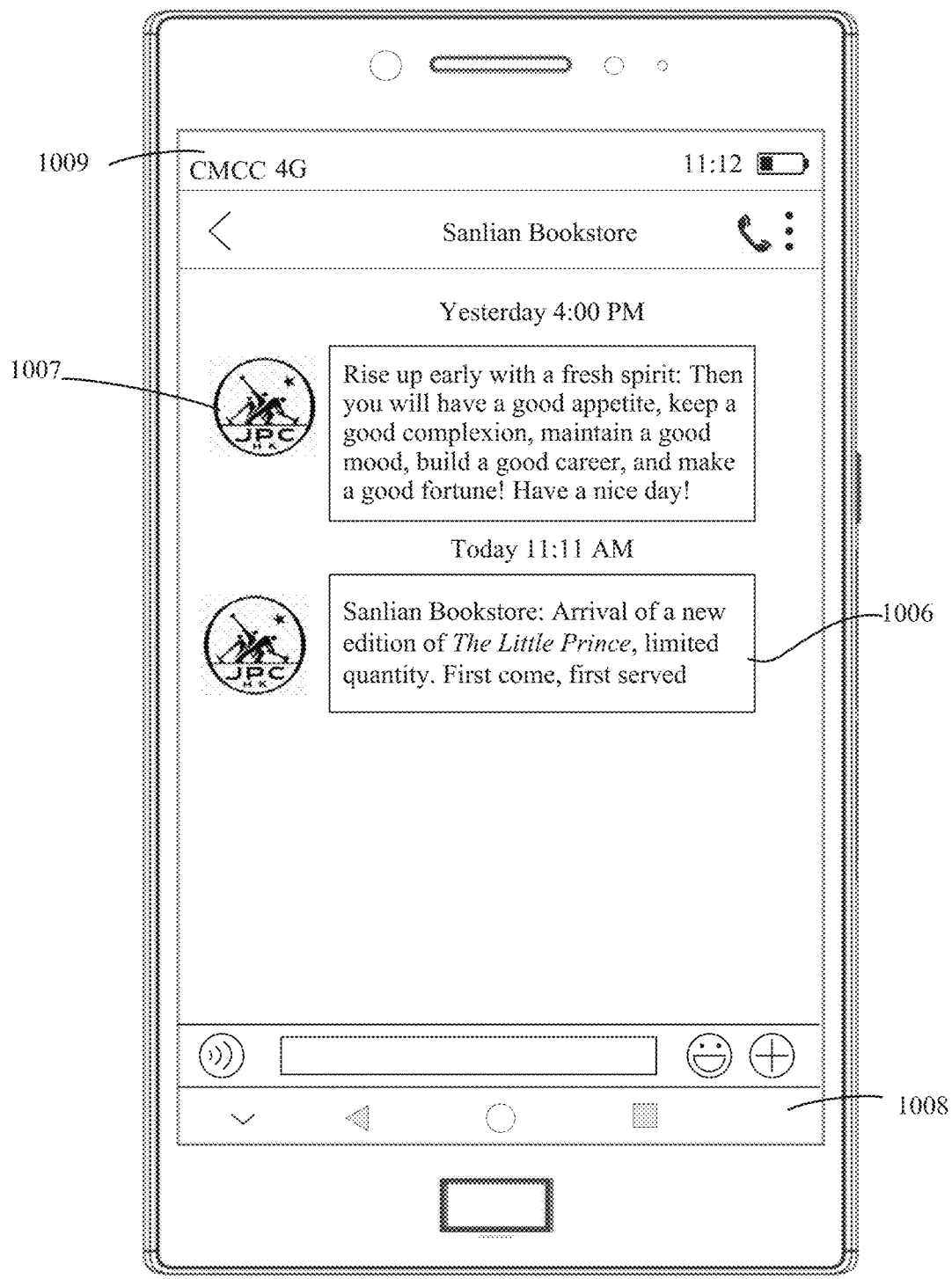

In other embodiments of this application, at first, no fingerprint unlock icon may be displayed on the lock screen, as shown in FIG. 10A. In the lock screen in FIG. 10A, a notification 1001 is displayed. To display a concise and good-taste lock screen, no fingerprint unlock icon or the like is displayed on the touchscreen. As shown in FIG. 10B, the electronic device detects a first touch event performed on the touchscreen by using a finger 1002 of a user. In response to the first touch event, a fingerprint unlock icon 1003 is displayed on the lock screen of the touchscreen, and a prompt box 1004 may be further displayed on the lock screen; or the fingerprint unlock icon 1003 or the prompt box 1004 may be further displayed prominently. As shown in FIG. 10C, the electronic device detects a second touch event 1005 performed on the touchscreen by using a finger 1002 of a user. The second touch event 1005 may be a slide gesture. The slide gesture may be moving the finger 1002 of the finger from a first touch position on the touchscreen to a second touch position on the touchscreen while maintaining contact with the touchscreen. In response to the second touch event 1005, as shown in FIG. 10C, the electronic device may drag a selected notification 1001 to another display area on the lock screen and gather a fingerprint in the second touch position corresponding to the another display area. The electronic device verifies the fingerprint, unlocks a screen after fingerprint verification succeeds, and displays a GUI of an application corresponding to the notification 1001. The GUI includes specific content 1006 of the notification 1001, as shown in FIG. 10D. FIG. 10D shows a dialog GUI for a contact of an SMS message. The GUI may further include a profile photo 1007 of the contact, a navigation bar 1008, a status bar 1009, and the like.

Figure 4H:
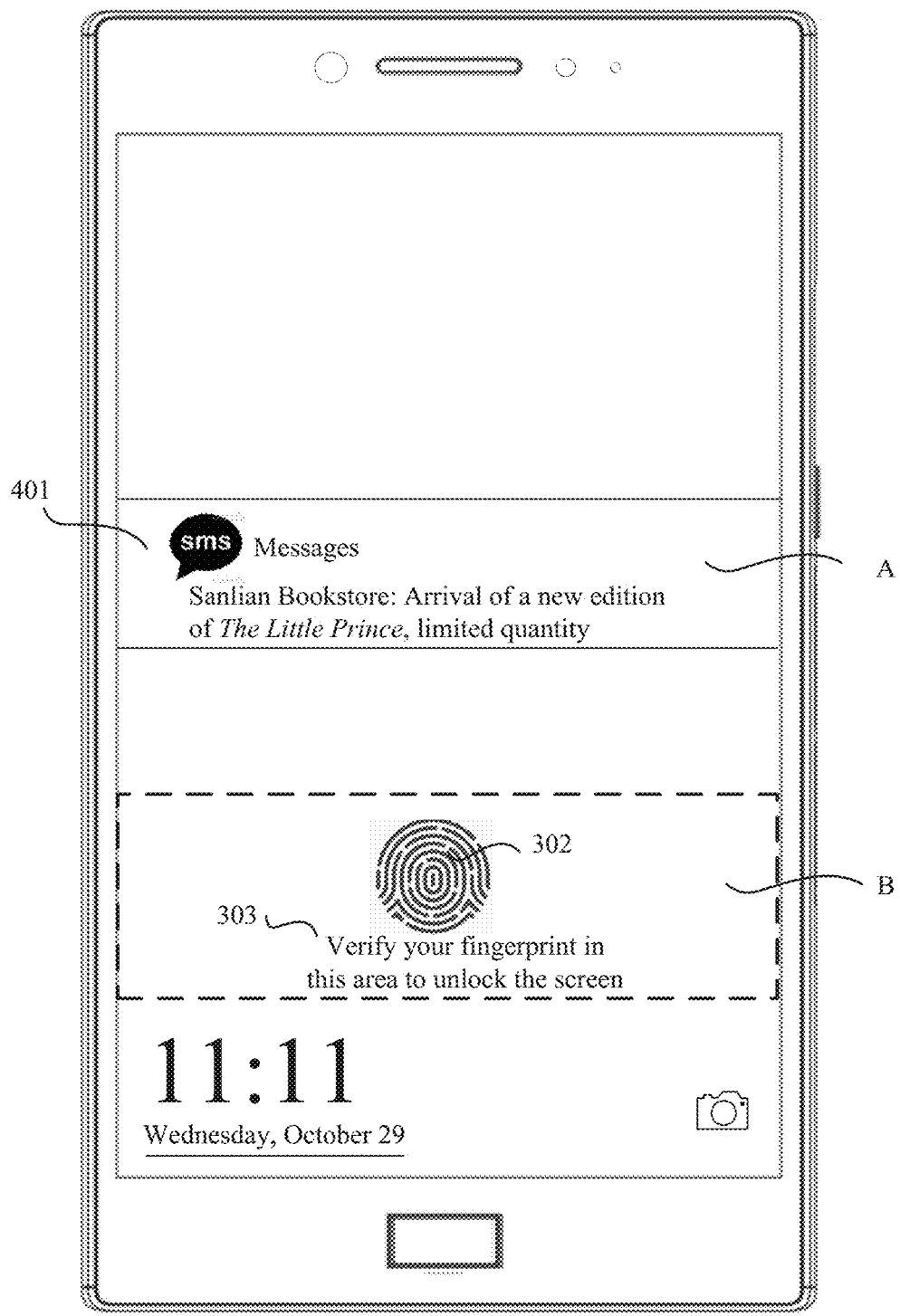
Figure 4I:
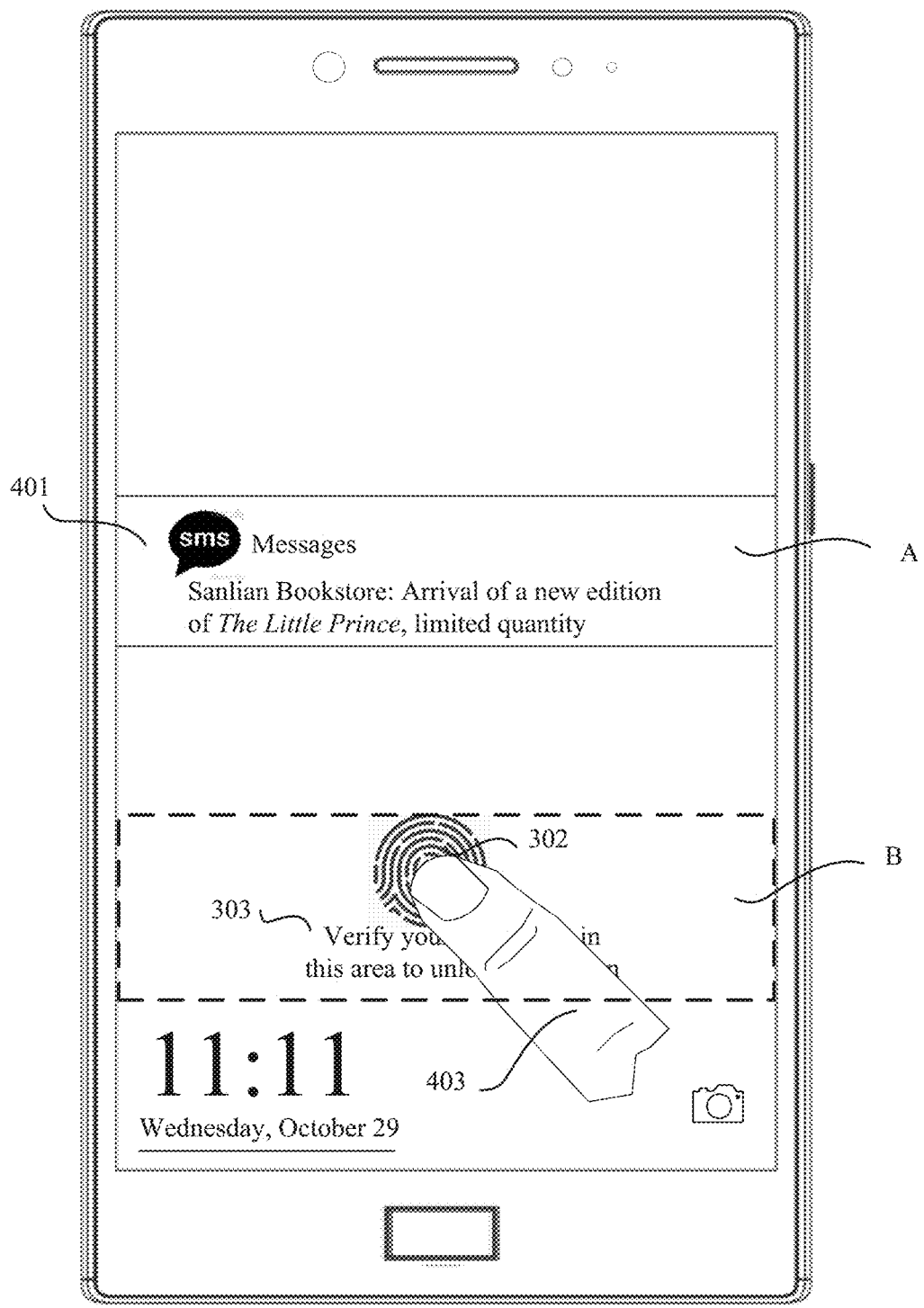
Figure 4J:
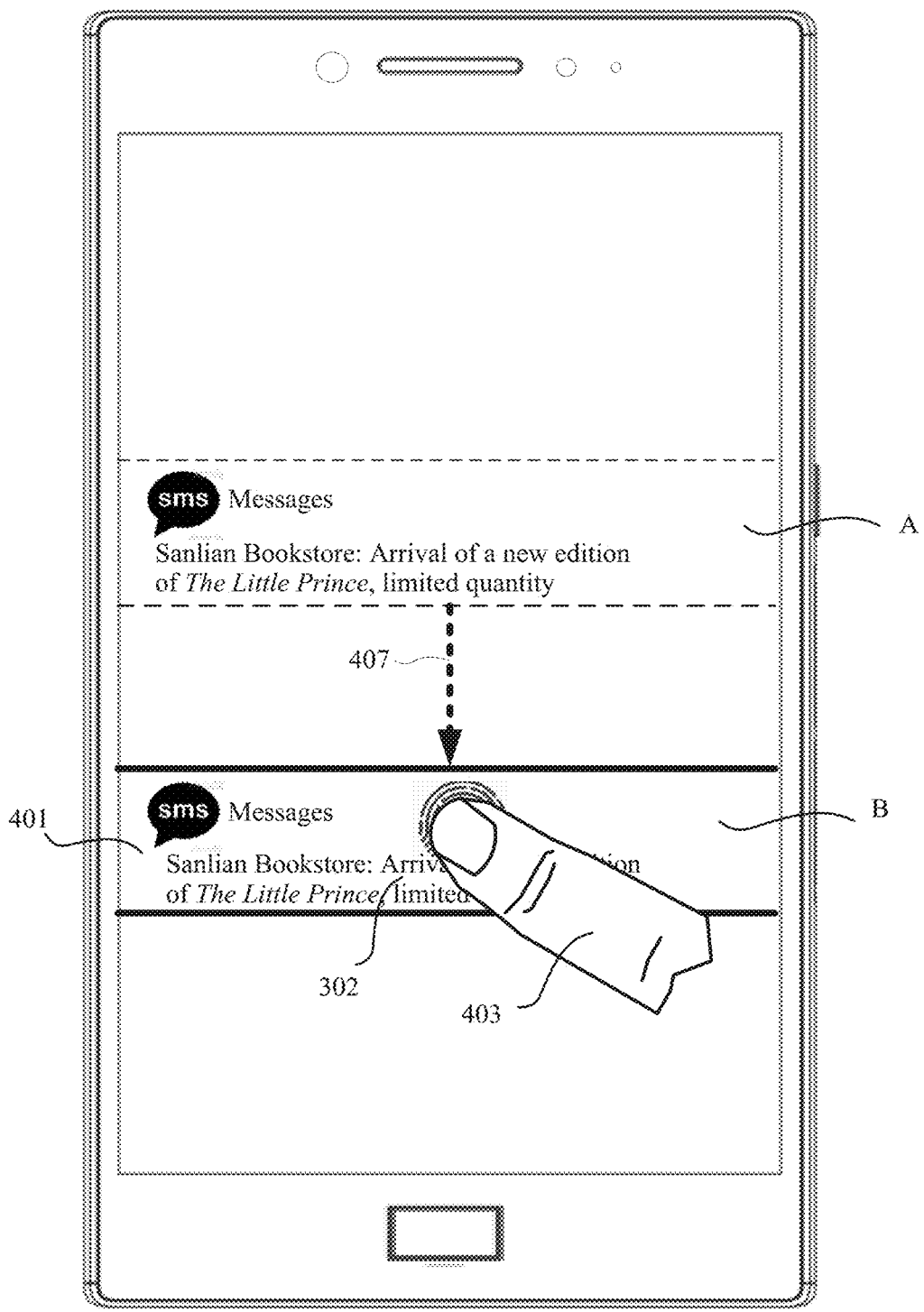

In the embodiments described in FIG. 4A to FIG. 4G the second touch event 404 is performed on the touchscreen 104 by using the finger 403 of the user, to perform fingerprint unlock and open the GUI of the application corresponding to the notification 401. In other embodiments of this application, another manner may alternatively be used to achieve a same effect as the foregoing embodiment. As shown in FIG. 4H, there are a notification 401, a fingerprint unlock icon 302, and a prompt box 303 on the lock screen. A display area A of the notification 401 on the lock screen may not overlap with a display area B of the fingerprint unlock icon 302. In FIG. 4, the electronic device 300 detects a third touch event performed on the fingerprint unlock icon 302 by using a finger 403 of a user. In response to the third touch event, as shown in FIG. 4J, the electronic device 300 may move, along a predetermined track 407, the notification 401 from the display area A to the display area B for display. The fingerprint unlock icon 302 is displayed in the display area B. In FIG. 4J, the notification 401 is moved to the display area B. In the display area B the displayed notification 401 may partially overlap with the fingerprint unlock icon 302. From a perspective of a display effect, the fingerprint unlock icon 302 is displayed in the notification 401. In other embodiments, after being moved to the display area B, the notification 401 may be no longer displayed. When the notification 401 is moved along the predetermined track 407, in response to the third touch event, the electronic device 300 may gather a fingerprint of the finger 403 by using a fingerprint recognizer 112, corresponding to the display area of the fingerprint unlock icon 302, on the touchscreen, and verify the fingerprint (for example, comparing the gathered fingerprint with a prestored valid fingerprint). If determining that the gathered fingerprint matches the valid fingerprint, the electronic device 300 unlocks the screen. After moving the notification 401 to the display area B, the electronic device 300 displays, on the touchscreen 104, a GUI of an application corresponding to the notification 401, and displays specific content of the notification 401. According to this embodiment, the screen can be unlocked and the specific content of the notification can be viewed, provided that the finger of the user touches the fingerprint unlock icon 302. This simplifies user operations, improves transaction processing efficiency of an electronic device, and also improves user experience. In other embodiments of this application, to increase a security level, when fingerprint verification is performed in the foregoing embodiments, a front-facing camera 307 may also be used to gather face feature information or iris information. The electronic device 300 may compare the gathered face feature information with prestored valid face feature information, or may compare the gathered iris information with prestored valid iris information. The electronic device 300 unlocks the screen only when both fingerprint verification and face feature information verification succeed, or both fingerprint verification and iris information verification succeed, and displays a GUI of an application corresponding to a notification 703.

Figure 4K:
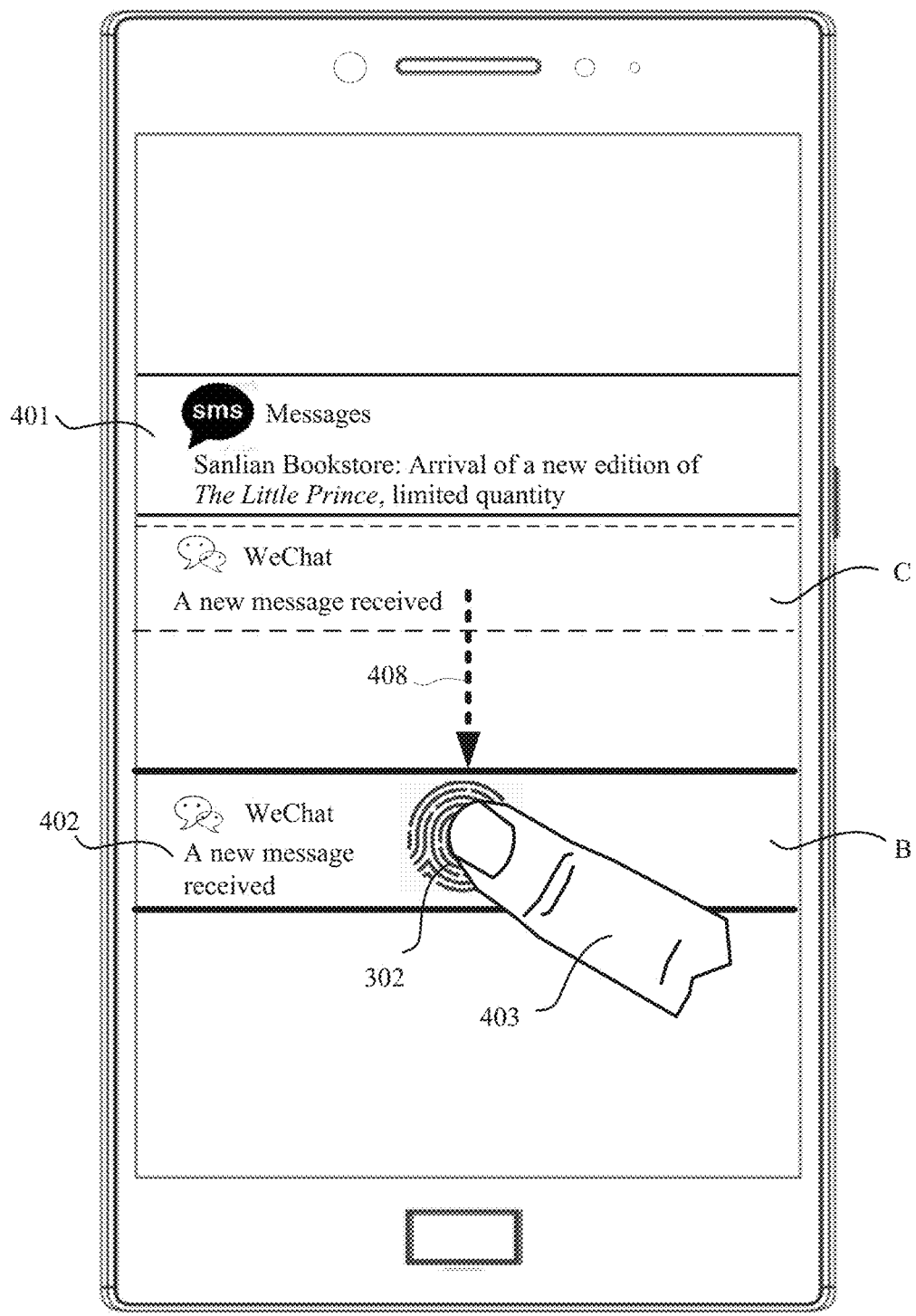

In other embodiments of this application, when at least two notifications are displayed on the lock screen (as shown in FIG. 4A), to simplify user operations, the electronic device 300 may alternatively move automatically one of the notifications, for example, a notification 402, to a display area B (that is, a position of the fingerprint unlock icon 302 is displayed in FIG. 4J). As shown in FIG. 4K, the electronic device 300 detects a third touch event performed on the fingerprint unlock icon 302 by using a finger 403 of a user. In response to the third touch event, the electronic device determines a specific notification (a notification 401 or a notification 402) closest to the fingerprint unlock icon 302;

and after determining that the notification 402 is closest to the fingerprint unlock icon 302, moves the notification 402 from a display area C to a display area B along a predetermined track 408. The fingerprint unlock icon 302 is displayed in the display area B. In FIG. 4K, the notification 402 displayed in the display area B may partially overlap with the fingerprint unlock icon 302. From a perspective of a display effect, the fingerprint unlock icon 302 is displayed in the notification 402. In other embodiments, after the selected notification 402 is moved to the display area B, the notification 402 may be no longer displayed. When the notification 402 is moved along the predetermined track 407, in response to the third touch event, the electronic device 300 may gather a fingerprint of the finger 403 by using a fingerprint recognizer 112, corresponding to the display area of the fingerprint unlock icon 302, on the touchscreen, and verify the fingerprint (for example, comparing the gathered fingerprint with a prestored valid fingerprint). If fingerprint verification succeeds, the electronic device 300 unlocks the screen, and after the notification 402 is moved to a position B, displays, on the touchscreen 104, a GUI of an application corresponding to the notification 402, and displays specific information of the notification 402. According to this embodiment, the screen can be unlocked and the specific content of the notification can be viewed, provided that the finger of the user touches the fingerprint unlock icon. This simplifies user operations, improves transaction processing efficiency of an electronic device, and also improves user experience. It can be understood that the predetermined tracks 407 and 408 may be automatically set by the electronic device 300, or may be user-defined.

In still other embodiments, when at least two notifications are displayed on the lock screen (as shown in FIG. 4A), to simplify user operations, the electronic device 300 may alternatively move automatically a plurality of (two, more than two, or all) notifications to the display area B (that is, a position of the fingerprint unlock icon 302 is displayed in FIG. 4J). In addition, the electronic device 300 gathers a fingerprint of the user based on the third touch event performed by using the finger 403 of the user on the fingerprint recognizer in the display area of the fingerprint unlock icon 302, and verifies the fingerprint. When fingerprint verification succeeds, the electronic device 300 unlocks the screen and opens related GUIs of applications corresponding to the plurality of notifications, so that the user views specific information of the plurality of notifications. Because the plurality of notifications may be corresponding to a plurality of applications, a plurality of GUIs may alternatively be displayed on the electronic device 300. The plurality of GUIs may be displayed in chronological order of receiving the notifications by the electronic device 300; or the plurality of GUIs may be displayed in different sizes on the touchscreen based on priorities of the notifications, for example, a size for displaying, on the touchscreen, a GUI of an application corresponding to an important notification is greater than a size for displaying, on the touchscreen, a GUI of an application corresponding to a common notification.

In still other embodiments, when at least two notifications are displayed on the lock screen, the electronic device 300 gathers a fingerprint of the user based on the touch event performed on the touchscreen 104 by using the finger 403 of the user, and compares the user fingerprint with a prestored valid fingerprint. In addition, the front-facing camera 307 may be further used to obtain eye movement information of the user. The electronic device 300 may determine, based on the obtained eye movement information, a specific notification (for example, the notification 401) on the touchscreen on which the user currently focuses. In this case, the electronic device 300 automatically moves the notification to the display area B (that is, a position of the fingerprint unlock icon 302 is displayed in FIG. 4J). The electronic device 300 unlocks the screen after fingerprint verification succeeds, and opens a GUI of an application corresponding to the notification. In this embodiment, in addition to simplified user operations, a notification on which the user currently focuses is determined more intelligently and more accurately, so as to unlock the screen and start an application corresponding to the notification. This greatly improves user experience. In other embodiments of this application, to increase a security level, when fingerprint verification is performed in the foregoing embodiments, the front-facing camera 307 may also be used to gather face feature information or iris information. The electronic device 300 may compare the gathered face feature information with prestored valid face feature information, or may compare the gathered iris information with prestored valid iris information. The electronic device 300 unlocks the screen only when both fingerprint verification and face feature information verification succeed, or both fingerprint verification and iris information verification succeed, and displays a GUI of an application corresponding to the notification 703.

In other embodiments of this application, after the electronic device 300 automatically moves a notification to the display area B, a position of another notification displayed on the lock screen also changes, to fill in blank caused by moving of the notification. In this case, notifications displayed on the lock screen feature continuity and are more aesthetic, thereby improving user experience.

Figure 5A:
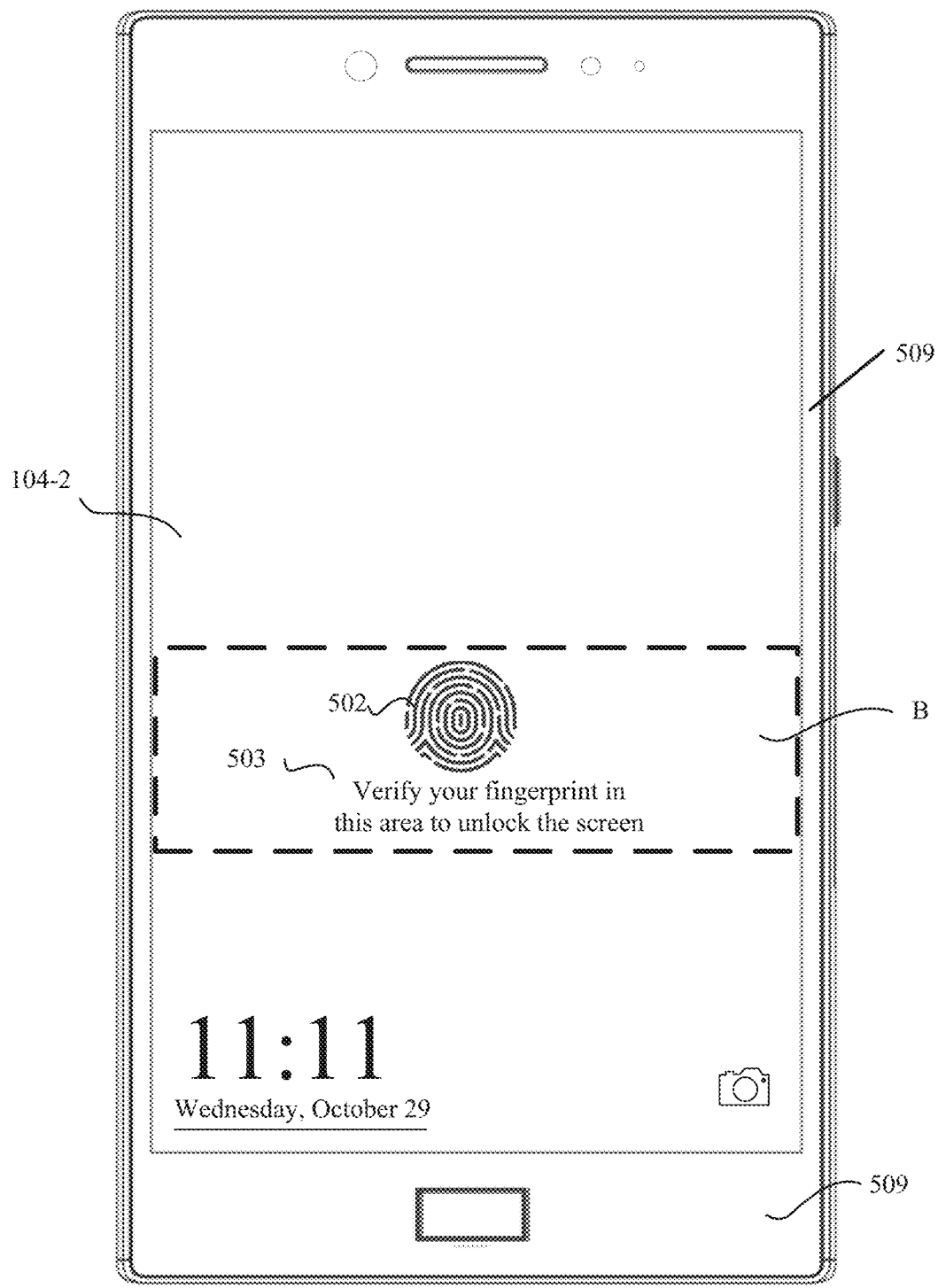
FIG. 5A to FIG. 5G are schematic diagrams of other graphical user interfaces displayed on an electronic device 300 in other embodiments.

In some embodiments of this application, the electronic device 300 may set that only a specified notification can be displayed in the display area B of the fingerprint unlock icon 302/prompt box 303. As shown in FIG. 5A, a fingerprint recognizer 112 is disposed in a specified position on the touchscreen 104. For example, the fingerprint recognizer 112 is disposed in a position, corresponding to a specified area B on the lock screen, on a touchscreen, as shown in FIG. 5A. To achieve a uniform and concise display effect, the fingerprint recognizer 112 may be integrated into the touchscreen and exists in a user-invisible form. On the lock screen, a fingerprint unlock icon 502 and a prompt box 503 may be displayed in the specified area B. In addition, if unlock succeeds and a main screen is opened, the fingerprint unlock icon 502 and the prompt box 503 may alternatively be displayed in the specified area. When performing mobile payment (for example, NFC payment or barcode scanning payment), a user may gather and verify a fingerprint as indicated by the prompt box 503, to complete mobile payment.

Figure 5B:
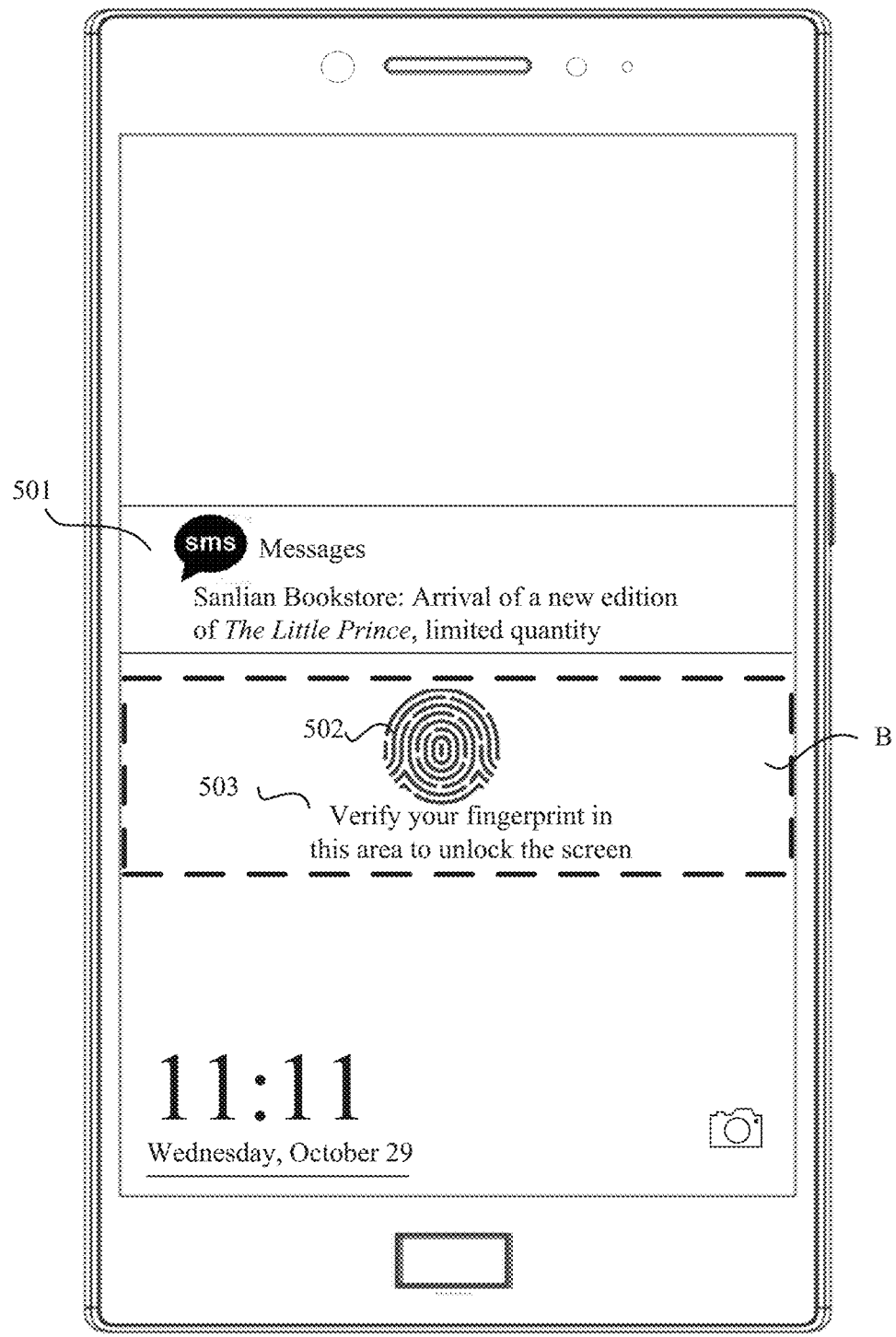
Figure 5C:
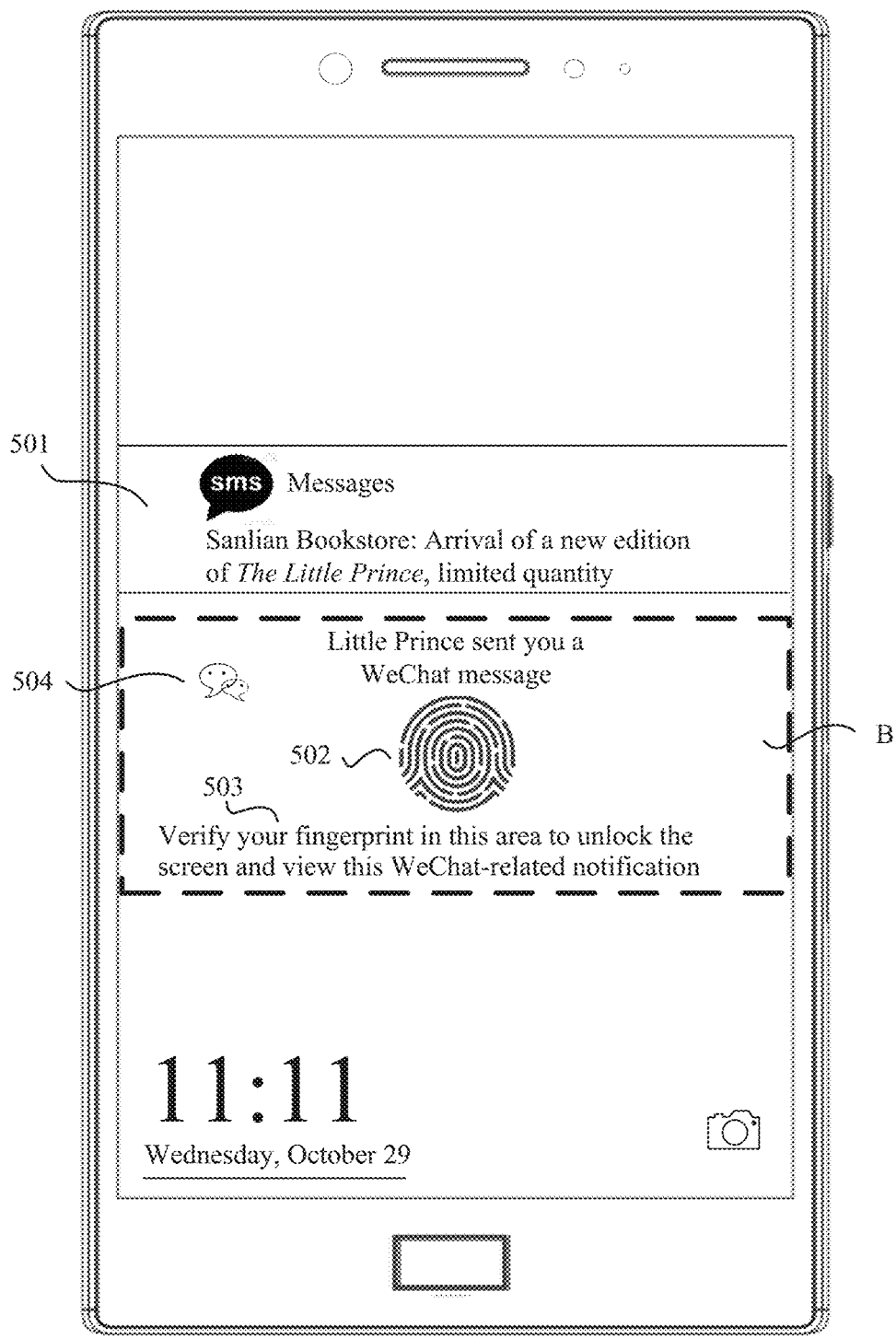

In some embodiments of this application, the electronic device 300 may be set that only a specified type of notification can be displayed in a specified area B. For example, a notification such as a floating notification or a lock screen notification can be displayed in the specified area. Specifically, on the lock screen, the electronic device 300 can set that only a specified lock screen notification can be displayed in the specified area B and other lock screen notifications cannot be displayed in the specified area B. For example, a WeChat-related notification can be displayed in the specified area. As shown in FIG. 5B, the electronic device 300 receives an SMS-related notification 501. Because the electronic device 300 does not set that an SMS-related notification can be displayed in the specified area (that is, the SMS-related notification is not a specified notification), the SMS-related notification cannot be displayed in the specified area. As shown in FIG. 5C, the electronic device 300 receives a WeChat-related notification 504. Because the electronic device 300 sets that a WeChat-related notification can be displayed in the specified area (that is, the WeChat-related notification is a specified notification), the notification 504 can be displayed in a specified area B. In this case, on the lock screen, prompt information in the prompt box 503 can be changed to "Verify your fingerprint in this area to unlock the screen and view this WeChat-related notification".

In other embodiments of this application, the electronic device 300 may alternatively set that only a notification related to a specified contact can be displayed in the specified area. For example, the specified contact may be a contact in a specified app. Specifically, the specified contact may be a WeChat contact. That is, only a notification related to a WeChat contact can be displayed in the specified area. The specified contact may alternatively be a contact in a phone book. That is, only a notification related to a contact in a phone book can be displayed in the specified area. In still other embodiments of this application, the specified contact may alternatively be a specific contact in any app. Specifically, the specified contact may be a WeChat contact Little Prince, and in this case, after receiving a WeChat-related notification from Little Prince, the electronic device displays the notification in the specified area. The specified contact may alternatively be contact Ronan (Ronan) in a phone book. The specified contact may alternatively be a plurality of contacts.

In other embodiments of this application, there may be a plurality of contact methods for a contact in a phone book, for example, a mobile number, an email, and instant messaging. The electronic device may receive input from the user and bind a selected contact to the specified area. Only when a notification sent by the contact is received, the notification can be displayed in the specified area. For example, when an SMS message sent by the contact by using a phone number is received, the SMS message is displayed in the specified area; when an email sent by the contact by using an email address is received, the email is displayed in the specified area. Only a part of content in the displayed SMS message, the displayed email, or the like may be displayed in the specified area.

In still other embodiments of this application, the electronic device 300 may set that only a notification related to specified content can be displayed in the specified area. For example, if a received notification is related to automobile, the notification can be displayed in the specified area. For example, in an Android operating system, the electronic device may determine specific content of the notification according to a function setContentText( ), and further determine, based on a preset keyword, whether the specific content is specified content in which the user is interested. For example, a preset keyword is "automobile"; in this case, after receiving a new notification, the electronic device determines, according to the function setContentText( ), whether specific content of the notification includes "automobile", and if the keyword is included, the electronic device displays the received notification in the specified area; otherwise, the received notification is displayed in another display area different from the specified area.

In this embodiment of this application, the specified area B in FIG. 5A may be presented in a user-perceivable manner. For example, the user may be prompted in a visual manner on the touchscreen that the display area is a specified area. For example, a rectangular box is displayed on the display screen to indicate that the rectangular box is a specified area; or when the user touches the specified area B, the user is prompted in a touch feedback manner (for example, vibration) that the display area is a specified area; or the user may be prompted in both of the foregoing two manners. Certainly, the specified area B may alternatively be presented in a user-perceivable manner.

In some embodiments of this application, the specified area may be a fixed display area on the lock screen. The display area may be a part of rather than an entire display area on the lock screen. The term "fixed" may indicate that the specified area may be in a fixed position on the touchscreen. The term "fixed" may alternatively indicate that the specified area is a fixed-size display area displayed on the lock screen. The specified area may be displayed in a position on the touchscreen at a time point, and may also be displayed in another position on the touchscreen at another time point. It can be understood that the term "fixed" may further indicate that the specified area is a fixed position on the lock screen and a fixed-size display area displayed on the lock screen.

In other embodiments of this application, display areas of different sizes may be displayed in a specified area B depending on different display content of specified notifications. For example, when display content of a received specified notification is relatively long, the specified area B is large; when display content of a received specified notification is relatively short, the specified area B is relatively small.

In other embodiments of this application, the specified notification may include a shortcut control element of a corresponding application. Therefore, the specified notification and the fingerprint unlock icon may be displayed in an overlapping manner. Specifically, a shortcut control element of a specified application and the fingerprint unlock icon may be displayed in an overlapping manner. For example, the shortcut control element may be a WeChat red packet read button, an Alipay transfer read button, or the like. In this case, what is displayed together with the fingerprint unlock icon in an overlapping manner may be the WeChat red packet read button, the Alipay transfer read button, or the like. In this embodiment of this application, a WeChat red packet is WeChat information that includes a specified amount of electronic currency, and is developed by Tencent. The shortcut control element may alternatively be a link. In this case, a finger of the user taps the link, to quickly unlock the screen through a fingerprint, and a website corresponding to the link is opened by using a browser, to display various information in the website. The shortcut control element may alternatively be a menu. In this case, the finger of the user taps the menu, to quickly unlock the screen through the fingerprint, and a submenu or an item of the menu is displayed on the touchscreen. It can be understood that in this embodiment of this application, the shortcut control element includes but is not limited to the mentioned interface elements. The following describes in detail the foregoing technical solutions of this application with reference to accompanying drawings by using specific embodiments.

Figure 5D:
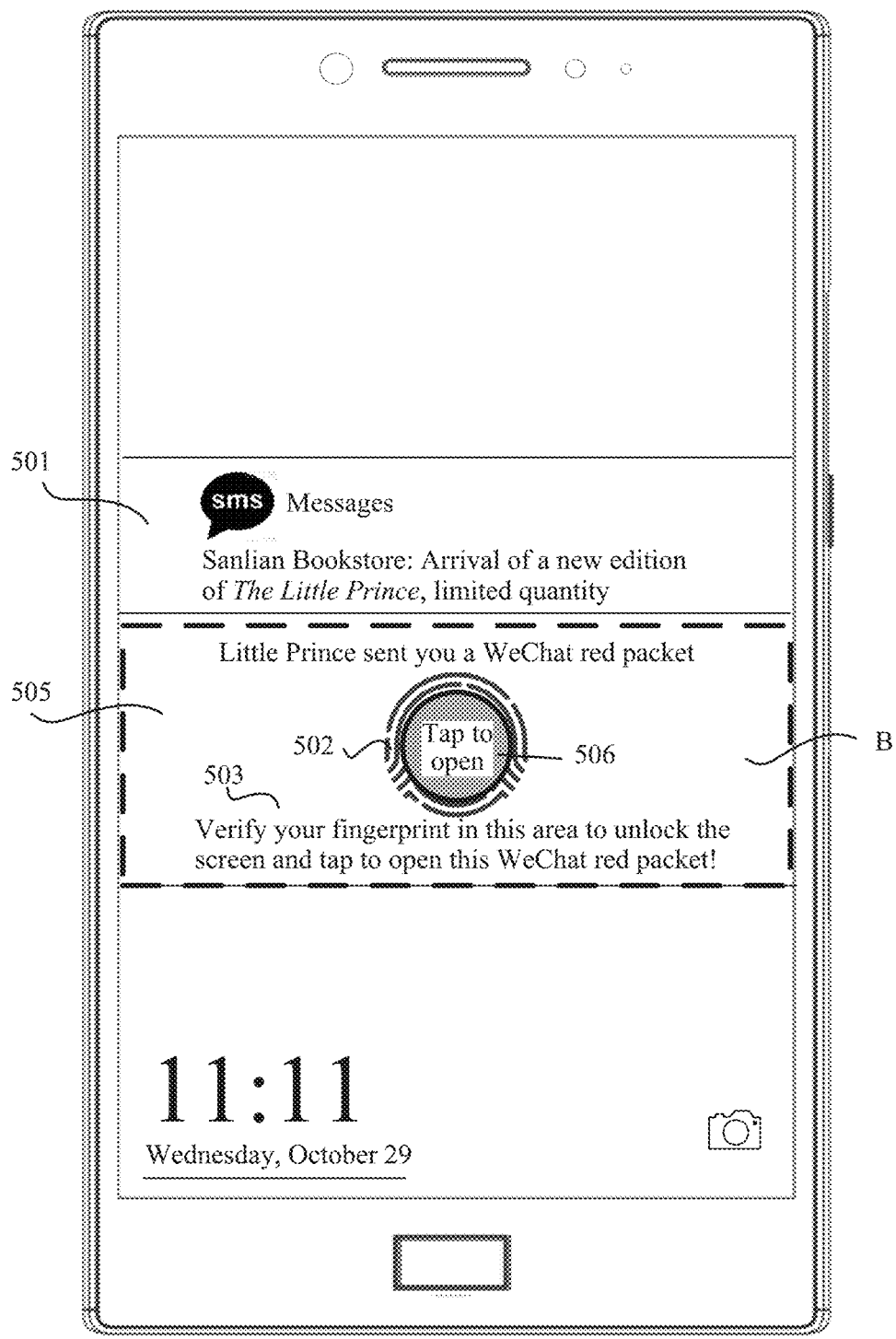

For example, as shown in FIG. 5D, a notification 501 and a notification 505 are displayed on the lock screen. The notification 505 is a notification specific to a WeChat red packet sent by a WeChat contact Little Prince. Because the notification 505 is a specified notification, the notification 505 is displayed in a specified area B. In FIG. 5D, the WeChat-related notification 505 is displayed in the specified area B, and the notification 505 and the fingerprint unlock icon 303 may be displayed in an overlapping manner. In the notification 505, a red-packet read button 506 is displayed, the red-packet read button 506 may partially overlap with a fingerprint unlock icon 502, and the red-packet read button 506 may be displayed in the fingerprint unlock icon 502, as shown in FIG. 5D. Alternatively, the fingerprint unlock icon 502 may be displayed in the red-packet read button 506. In addition, prompt information in the prompt box 503 is changed. The prompt information is changed to display information related to the notification 505, for example "Verify your fingerprint in this area to unlock the screen and tap to open this WeChat red packet!".

In still other embodiments of this application, when a specified notification is displayed in the specified area B, the fingerprint unlock icon 302 may alternatively not be displayed on the touchscreen. However, a position in which the fingerprint unlock icon 302 is previously displayed on the touchscreen is a position in which the fingerprint recognizer is disposed. In this case, without being perceived by the user, fingerprint unlock can be performed quickly and an application corresponding to the notification message can be started, thereby improving user experience.

Figure 5E:
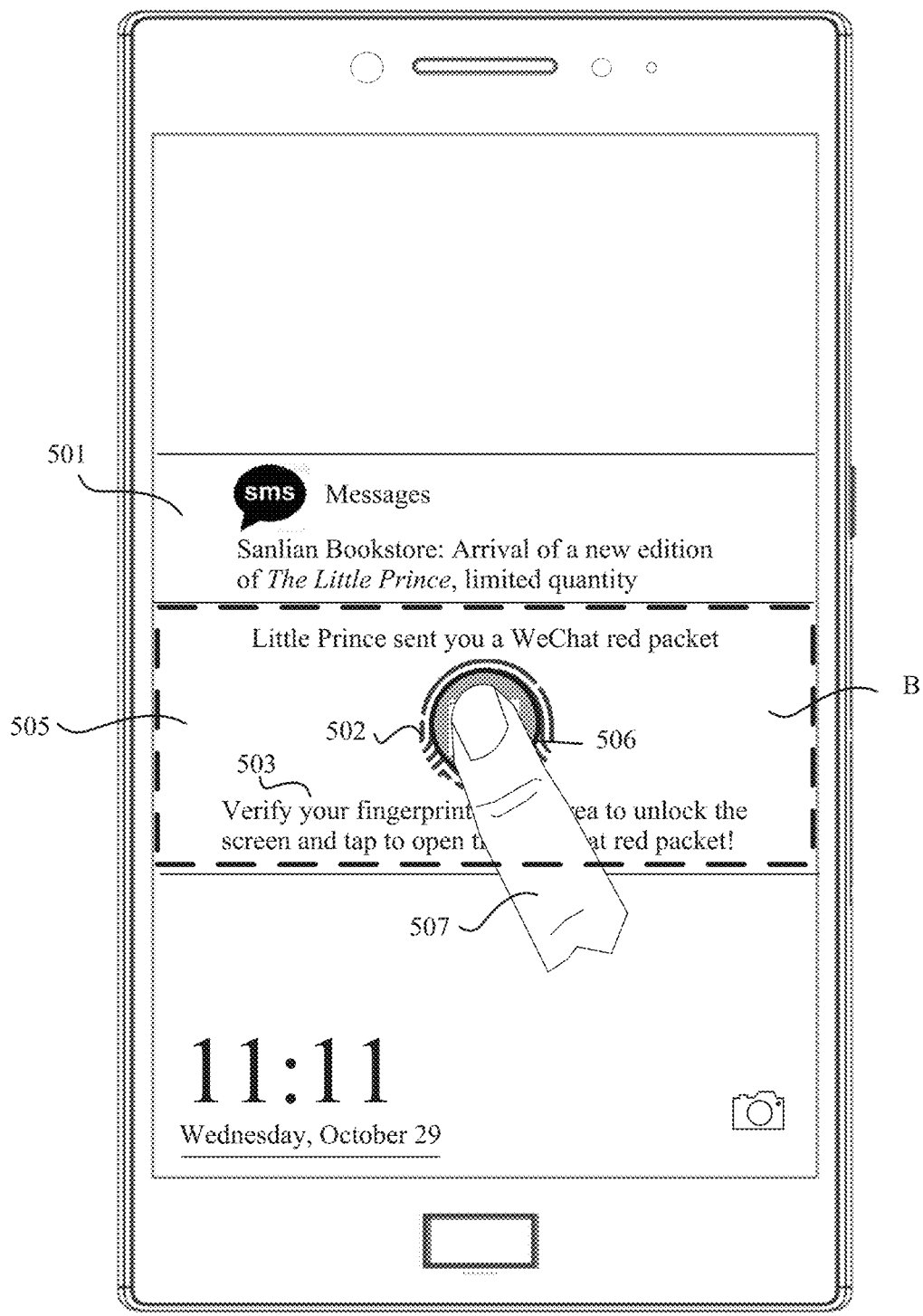
Figure 5F:
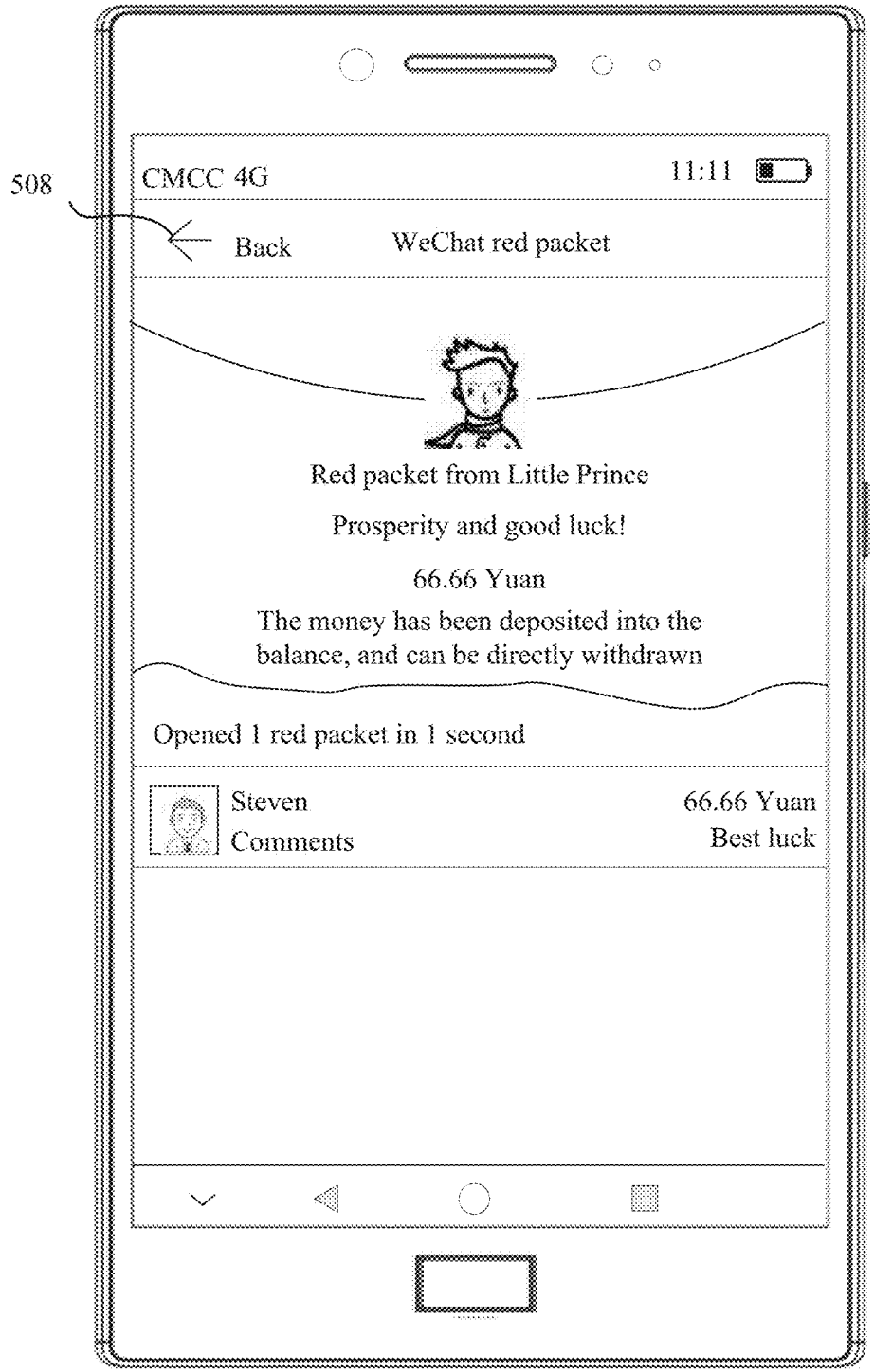

As shown in FIG. 5E, the electronic device 30 detects a touch event performed on a red-packet read button 506 by using a finger 507 of a user; and in response to the touch event, the electronic device 300 gathers a fingerprint by using a fingerprint recognizer, corresponding to the specified area B, on the touchscreen and verifies the fingerprint (for example, determining whether the gathered fingerprint matches a prestored valid fingerprint). If the electronic device 300 determines that the gathered fingerprint matches the prestored valid fingerprint, the electronic device 300 unlocks the screen, and sends, to an application server corresponding to WeChat, a request for obtaining a specific amount of money from the WeChat red packet. As shown in FIG. 5F, after receiving a response message of the application server, the electronic device 300 displays, on the touchscreen 104, a GUI displayed after the WeChat red packet is opened. If the electronic device 300 determines that the gathered fingerprint does not match the prestored valid fingerprint, the electronic device 300 may provide a prompt to the user, so that the user perceives fingerprint mismatch. For example, the user may be prompted with the following information in the prompt box 503: "Fingerprint verification failed, please verify again", the user may be prompted through vibration that user fingerprint verification fails, or the like. In still other embodiments, in response to the touch event, prompt information in the prompt box 502 may alternatively be displayed in a zoom-in mode, so that the user pays attention to the prompt information. FIG. 5F shows an example of a screen on which a WeChat red packet is opened. An amount of money in the red packet won by user Steven and other related information are displayed on the screen. When the finger of the user taps a back icon 508, a main screen of WeChat may be displayed on the touchscreen 104. In other embodiments of this application, to increase a security level, when fingerprint verification is performed in the foregoing embodiments, a front-facing camera 307 may also be used to gather face feature information or iris information. The electronic device 300 may compare the gathered face feature information with prestored valid face feature information, or may compare the gathered iris information with prestored valid iris information. The electronic device 300 unlocks the screen only when both fingerprint verification and face feature information verification succeed, or both fingerprint verification and iris information verification succeed, and displays a GUI of an application corresponding to the notification 703.

Figure 5G:
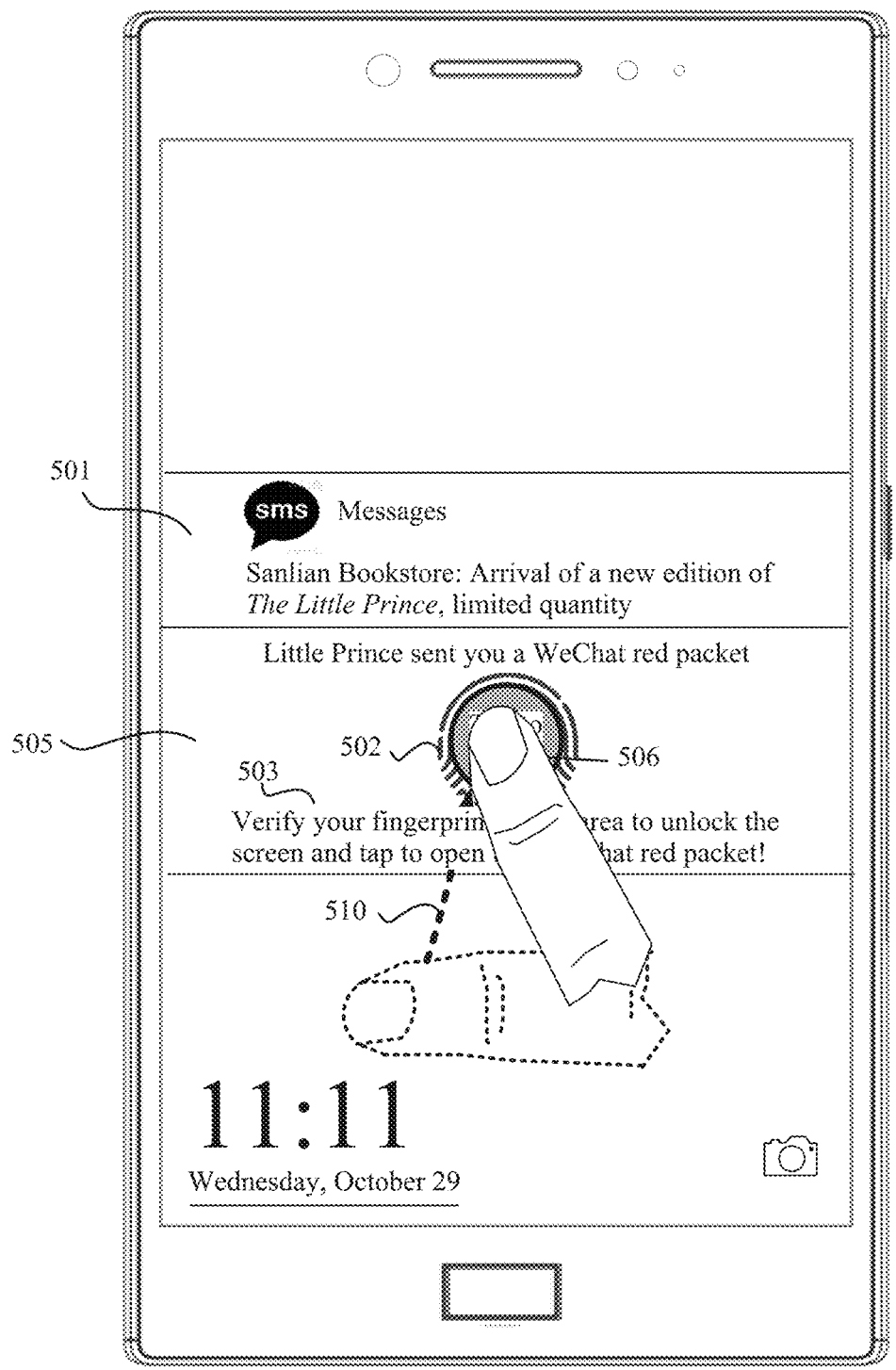

In some scenarios, a user may not be interested in the WeChat red packet displayed in FIG. 5D. Then in other embodiments of this application, as shown in FIG. 5G, the user may perform a slide gesture 510 on the touchscreen 104. In this case, the electronic device 300 may unlock the screen based on the slide gesture and display the main screen shown in FIG. 3B, but does not process the WeChat red packet or other notifications. For the slide gesture 510, a start position may be outside the display area of the notifications (for example, the notification 501 and the notification 505) on the lock screen, and an end position may be the fingerprint unlock icon 502 in the specified area B, so that the fingerprint recognizer 112 gathers and verifies a fingerprint.

Figure 11A:
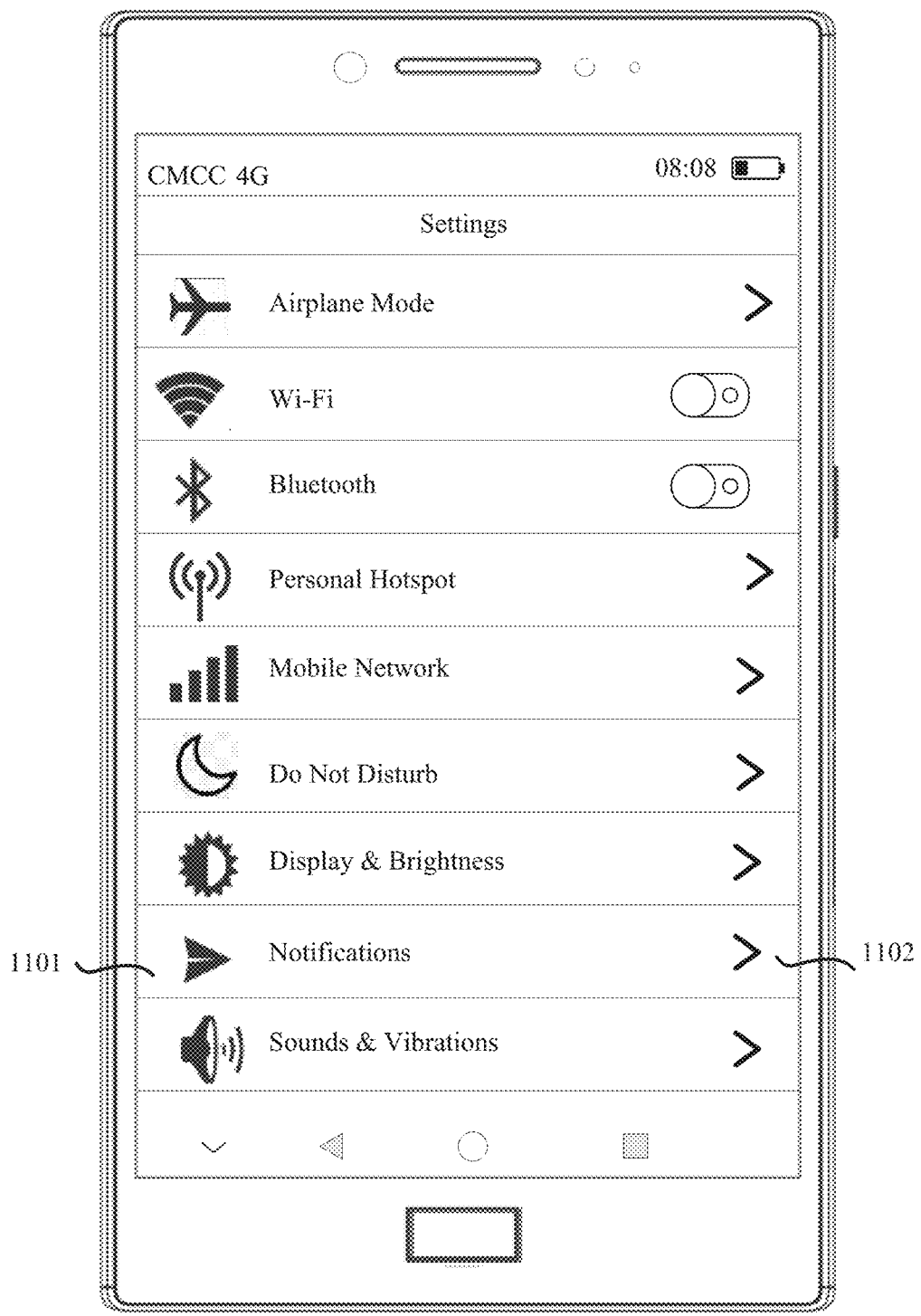
FIG. 11A to FIG. 11F are schematic diagrams of still other graphical user interfaces displayed on an electronic device in still other embodiments.
Figure 11B:
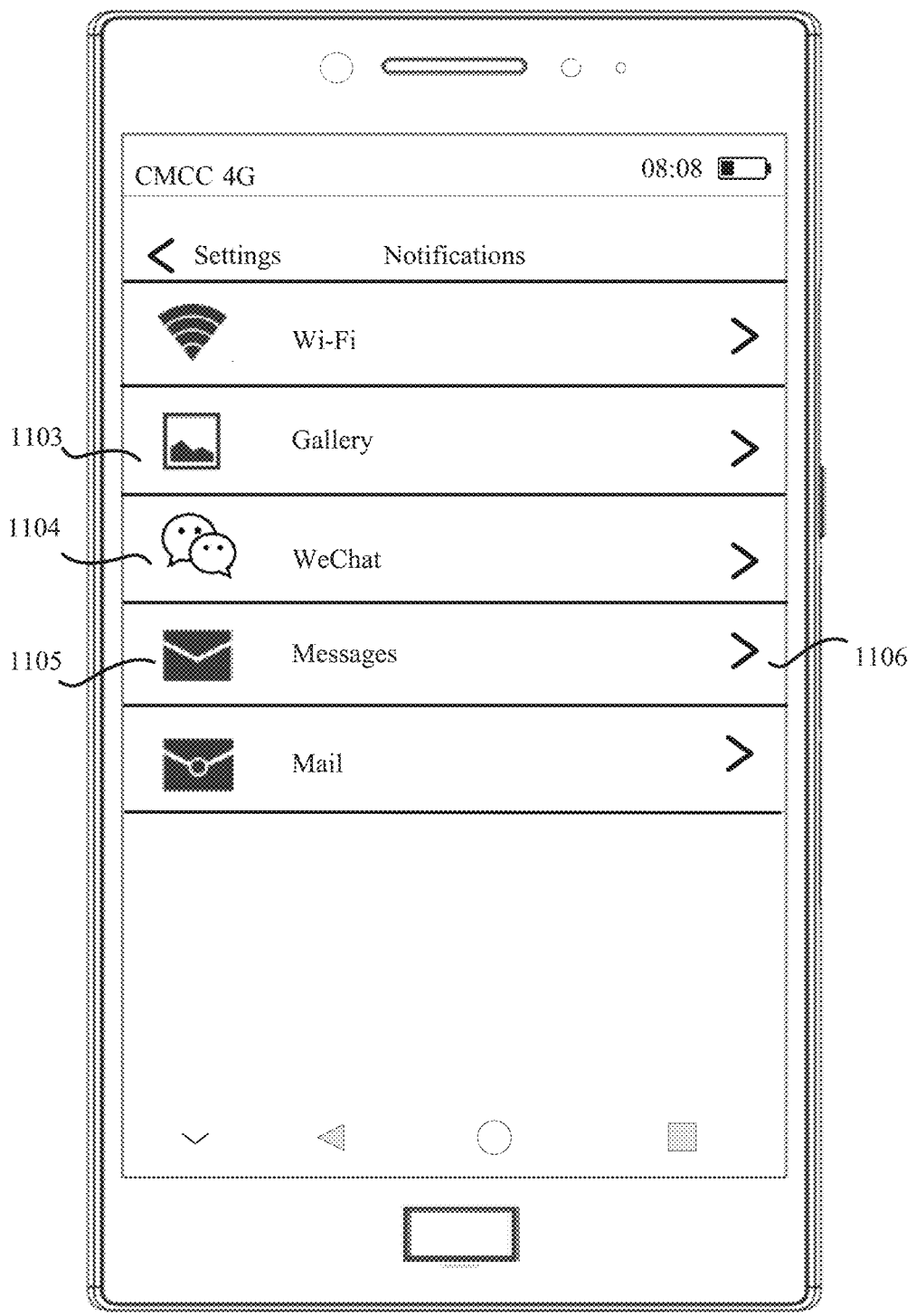
Figure 11C:
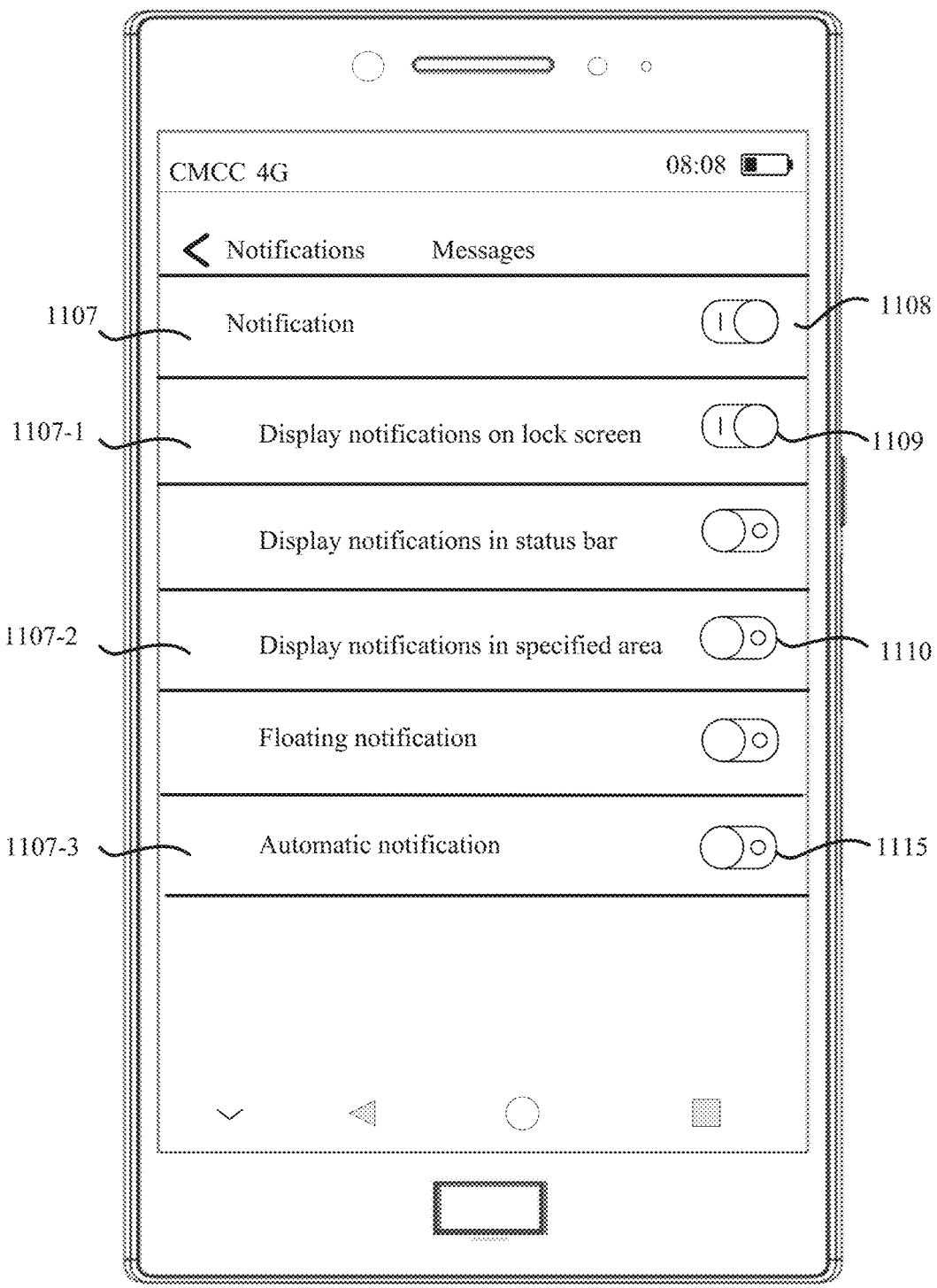

In some embodiments of this application, the user may manually set which notification can be displayed in the specified area. For example, FIG. 11A to FIG. 11F are GUIs in which different notifications are set by the user to display differently. After detecting that a finger of the user touches a settings icon 312 in FIG. 3A, in response to the touch event, the electronic device 300 displays a GUI related to the settings icon 312 on the touchscreen, as shown in FIG. 11A. FIG. 11A shows a plurality of specific menus of the settings icon 312, for example, an airplane mode menu, a Wi-Fi menu, a Bluetooth menu, and a notification menu 1101. The user may tap a control element 1102 to enter a specific submenu of the notification menu 1101, as shown in FIG. 11B. FIG. 11B shows submenus of the notification menu 1101, for example, a submenu 1103 used to perform notification setting on a gallery app, a submenu 1104 used to perform notification setting on WeChat, and a submenu 1105 used to perform notification setting on an SMS. After the electronic device detects a touch event (for example, slight touch or press) performed by the user on a touch control element 1106, in response to the touch event, the electronic device displays submenus of an SMS-related notification on the touchscreen, as shown in FIG. 11C. An item 1107 of the submenu indicates whether an SMS-related notification is allowed to appear on the touchscreen. In the GUI in FIG. 11C, a control element 1108 indicates that an SMS-related notification is allowed to appear on the touchscreen. The item 1107 further includes lower-level sub-items, for example, a sub-item 1107-1 and a sub-item 1107-2. In the sub-item 1107-1, a control element 1109 indicates that an SMS-related notification is allowed to appear on the lock screen. In the sub-item 1107-2, a control element 1110 indicates that an SMS-related notification is not allowed to appear in a specified area. However, because the control element 1109 is not touched, the SMS-related notification is still allowed to appear on the lock screen except the specified area. With reference to FIG. 5A to FIG. 5C, specific examples of this embodiment of this application can be better understood. In particular, as shown in FIG. 5B, because the user has set how to display an SMS-related notification (as shown in FIG. 11C), in FIG. 5B, the SMS-related notification 501 is displayed on the lock screen, but is not displayed in the specified area B. A meaning of the specified area herein is similar to or the same as a meaning of the specified area mentioned in the foregoing embodiments.

Figure 11D:
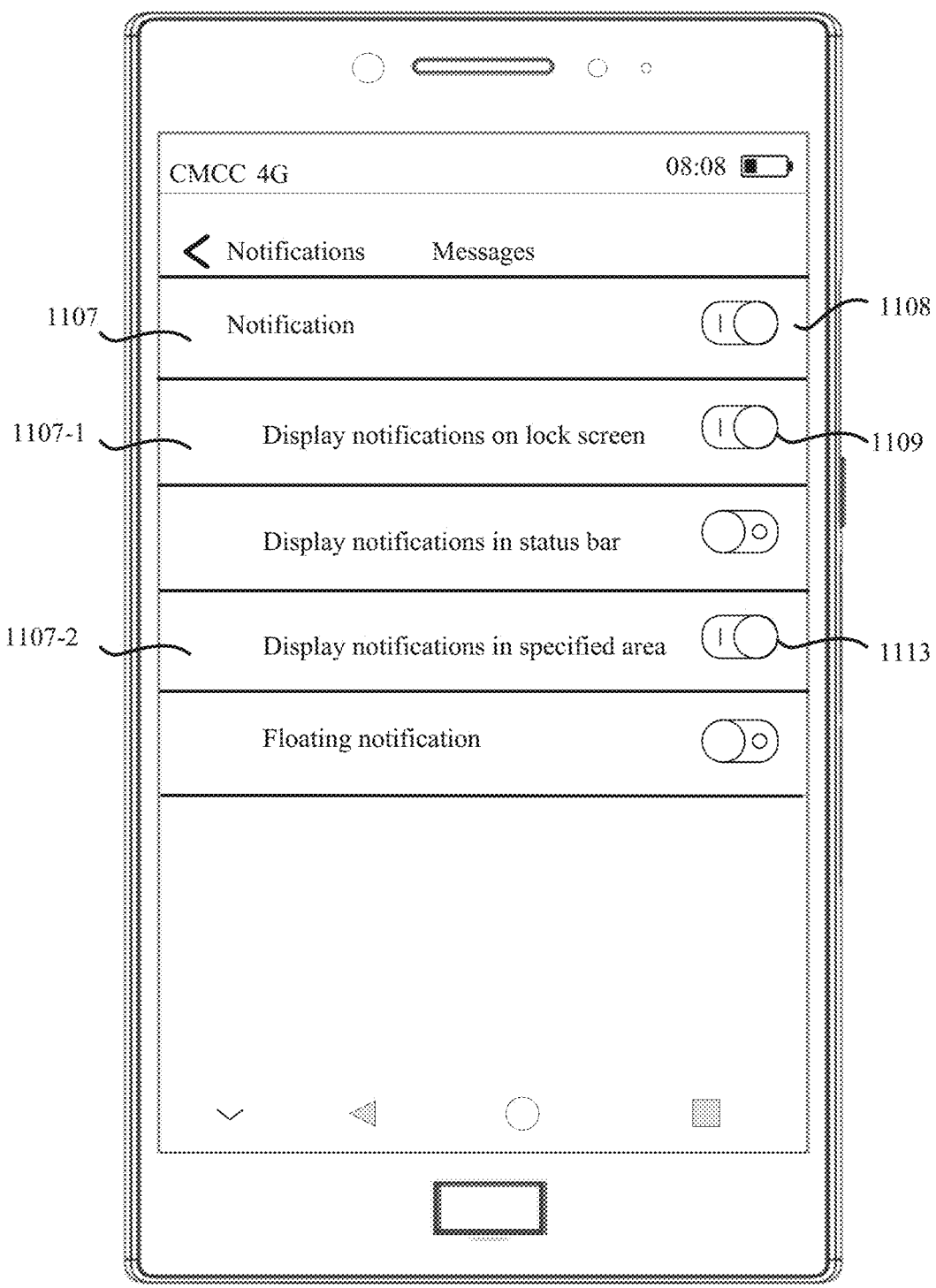
Figure 11E:
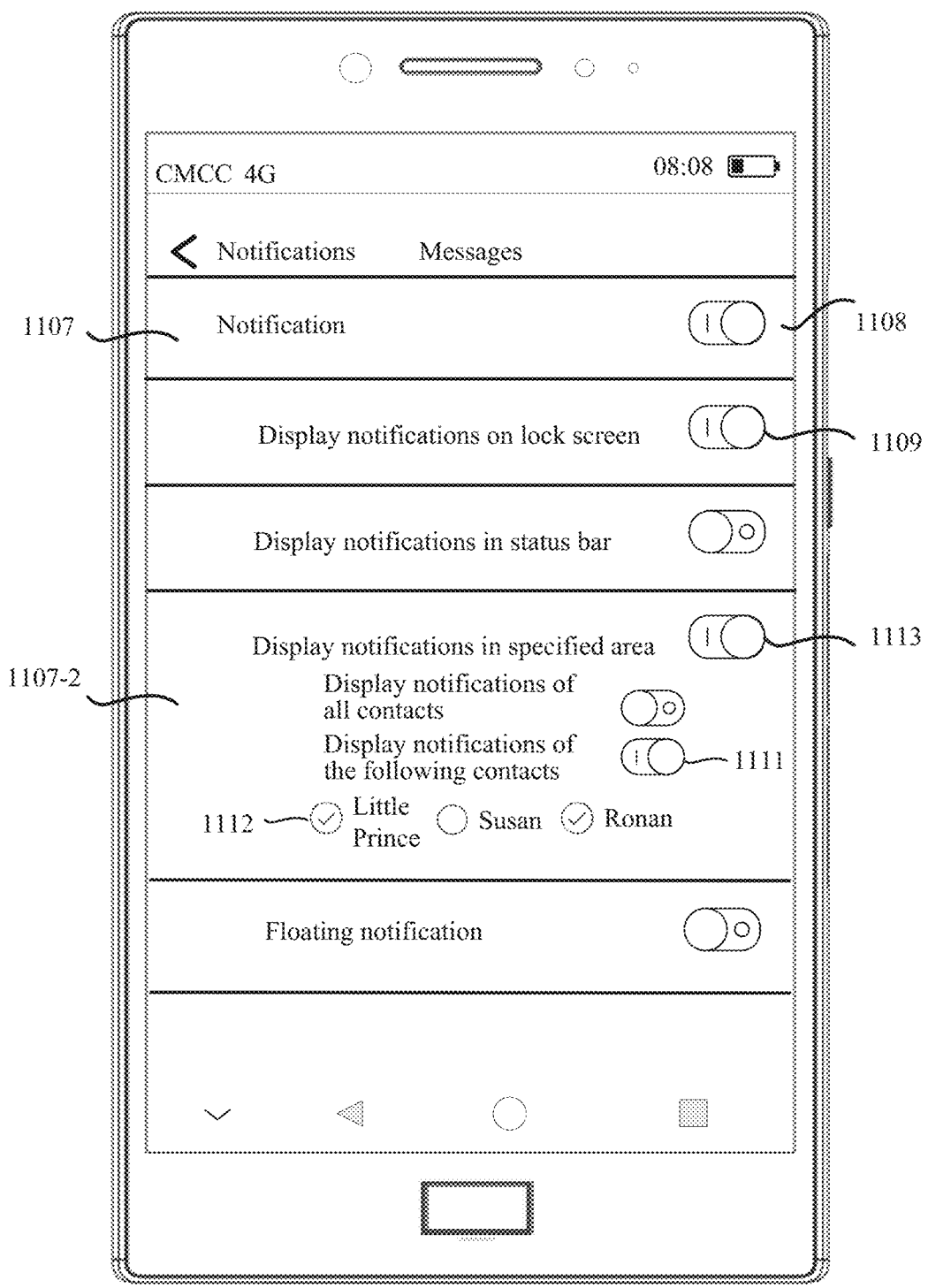

The electronic device responds to the touch event after detecting a touch event performed by the user on the control element 1110. As shown in FIG. 11D, the control element 1110 is displayed as a control element 1113, and the control element 1113 indicates that the electronic device allows an SMS-related notification to be displayed in the specified area. A combination of the control element 1113 and the control element 1109 indicates that an SMS-related notification may be displayed in a specified area on the lock screen.

In other embodiments of this application, when the electronic device allows an SMS-related notification to be displayed in a specified area, more menus of the sub-item 1107-2 may be further displayed on the touchscreen. For example, in FIG. 11C, after detecting a touch event performed by the user on the control element 1110, the electronic device responds to the touch event and displays, on the touchscreen, a GUI shown in FIG. 11E. In the GUI, compared with that in FIG. 11C, the control element 1110 is changed to the control element 1113, and the control element 1113 indicates that the electronic device allows an SMS-related notification to be displayed in a specified area. For example, in FIG. 11E, more menus are displayed in the sub-item 1107-2. These menus may be configured to specifically set a notification sent by which contact in an SMS app can be displayed in a specified area. For example, the control element 1111 indicates that only a notification from a selected contact can be displayed in the specified area, and a notification sent by an unselected contact is not displayed in the specified area. For example, the control element 1112 indicates that a notification for an SMS message sent by contact "Little Prince" is allowed to appear in the specified area. In addition, because the control element 1109 is not touched, a notification for an SMS message from an unselected contact is still allowed to appear on the lock screen except the specified area.

Figure 11F:
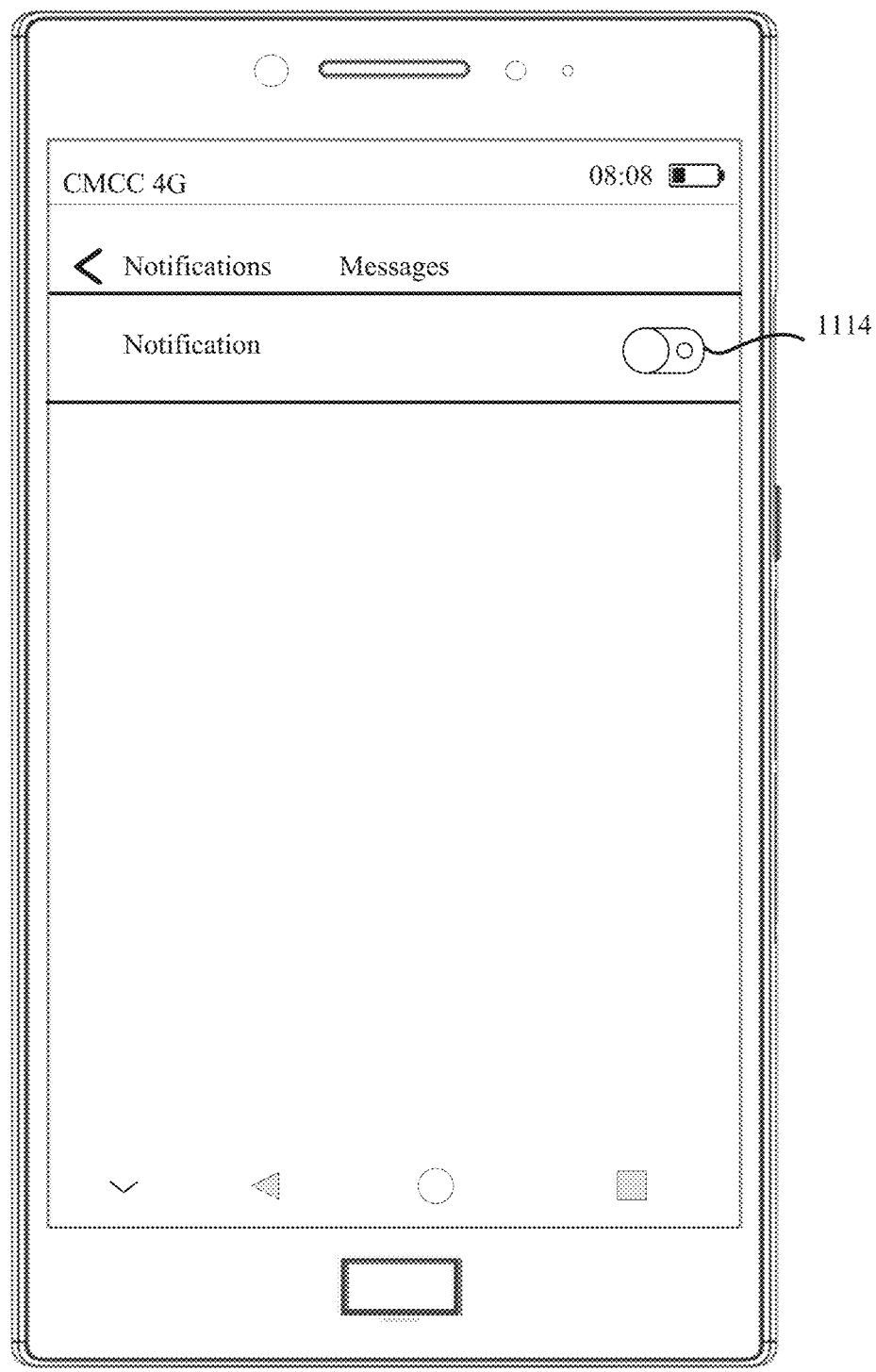

In other embodiments, after the user touches the control element 1108, a GUI shown in FIG. 11F is displayed. The control element 1114 indicates that an SMS-related notification is not allowed to appear on the touchscreen. That is, the electronic device can still receive an SMS message (the user can open a related GUI of an SMS app and view all received SMS messages in the GUI), but cannot prompt the user with related content of the received new SMS message in a form of a notification.

In other embodiments of this application, the electronic device may alternatively determine automatically, according to different notification policies, how to notify various newly received messages. For example, which notifications can be displayed in the specified area is determined based on priorities of the notifications, or which notifications can be displayed in the specified area is determined in chronological order of receiving the notifications. For example, as shown in FIG. 11C, the sub-item 1107-3 is an automatic notification menu. Automatic notification means that the electronic device can automatically notify SMS-related notifications in a different degree based on the foregoing notification policy or an environment in which the electronic device is located. The control element 1115 indicates that automatic notification is not allowed. After the user touches the control element 1115, an automatic notification function is enabled, and the electronic device processes an SMS-related notification based on the foregoing notification policy or an environment in which the electronic device is located.

Figure 6A:
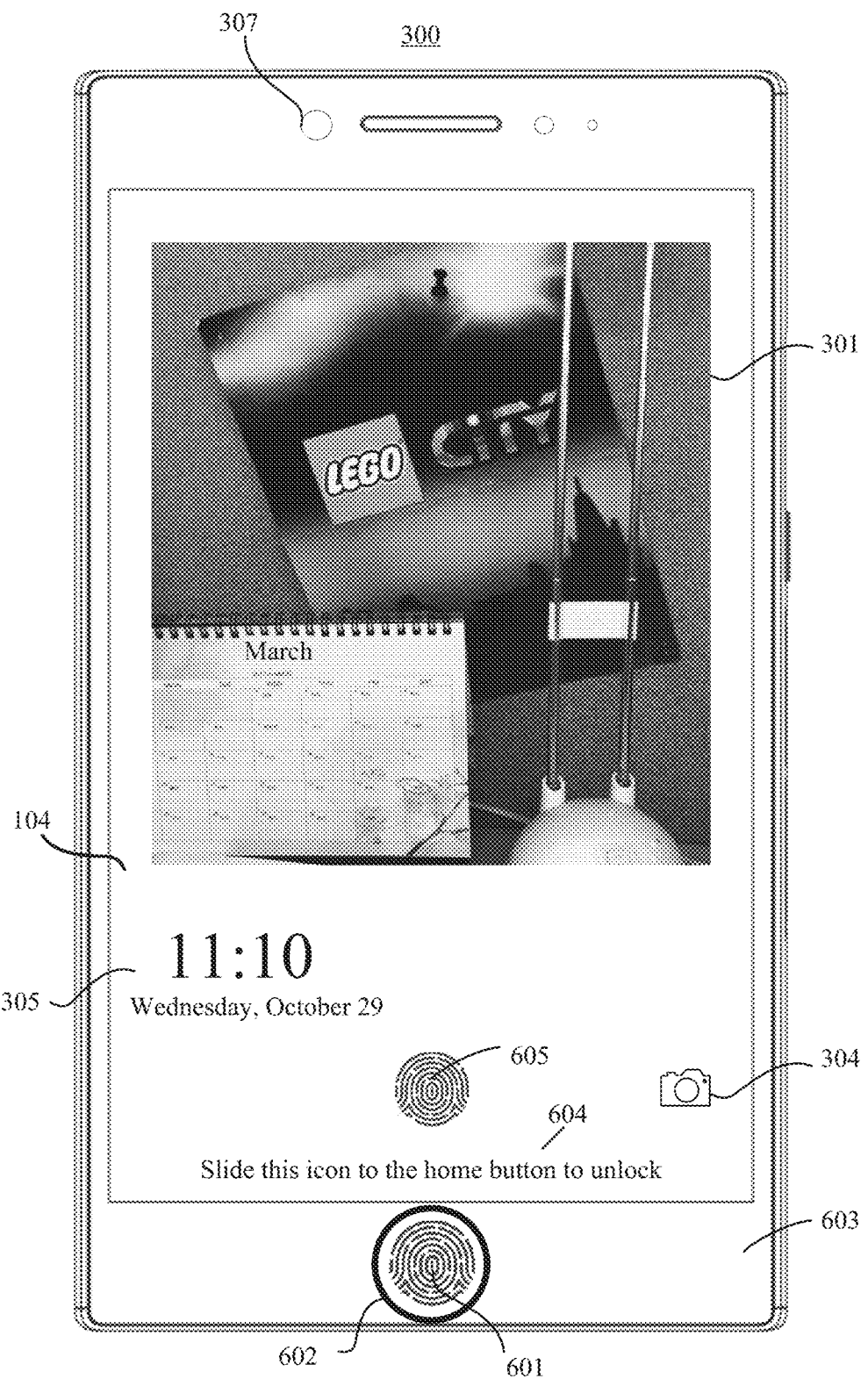
FIG. 6A to FIG. 6F are schematic diagrams of still other graphical user interfaces displayed on an electronic device 300 in still other embodiments.

The foregoing embodiment is implemented on the electronic device 300 with the fingerprint recognizer 112 on the touchscreen. In other embodiments of this application, the fingerprint recognizer 112 may alternatively be disposed in another position of the electronic device 300, as shown in FIG. 6A. In FIG. 6A, a fingerprint recognizer 601 (which has a same or similar function as the fingerprint recognizer 112 in the foregoing embodiments) is disposed in a bezel (bezel) 603 at the bottom of the electronic device 300, and the bezel 603 is adjacent to four sides of the touchscreen 104. The fingerprint recognizer 601 may include a fingerprint sensor, or the like. In other embodiments, a light-emitting device 602, for example, a light-emitting diode, is disposed around the fingerprint recognizer 601, and the light-emitting device 602 may be controlled by the processor 101 of the electronic device 300 to emit light or not to emit light. In some embodiments, the fingerprint recognizer 601 and the light-emitting device 602 may be jointly referred to as a home button (home screen button).

FIG. 6A shows a lock screen. The lock screen may include lock screen wallpaper 301, a time and date 305, a prompt box 604, and a fingerprint unlock icon 605. The fingerprint unlock icon 605 is configured to intuitively remind a user that the electronic device 300 supports fingerprint unlock, so that the user performs a corresponding operation. Prompt information in the prompt box 604 may be "Slide this icon to the home button to unlock", or the like. It can be understood that the prompt box 604 and the fingerprint unlock icon 605 are not necessarily both displayed on the lock screen, and only one of them, for example, the prompt box 604 may be displayed.

Figure 6B:
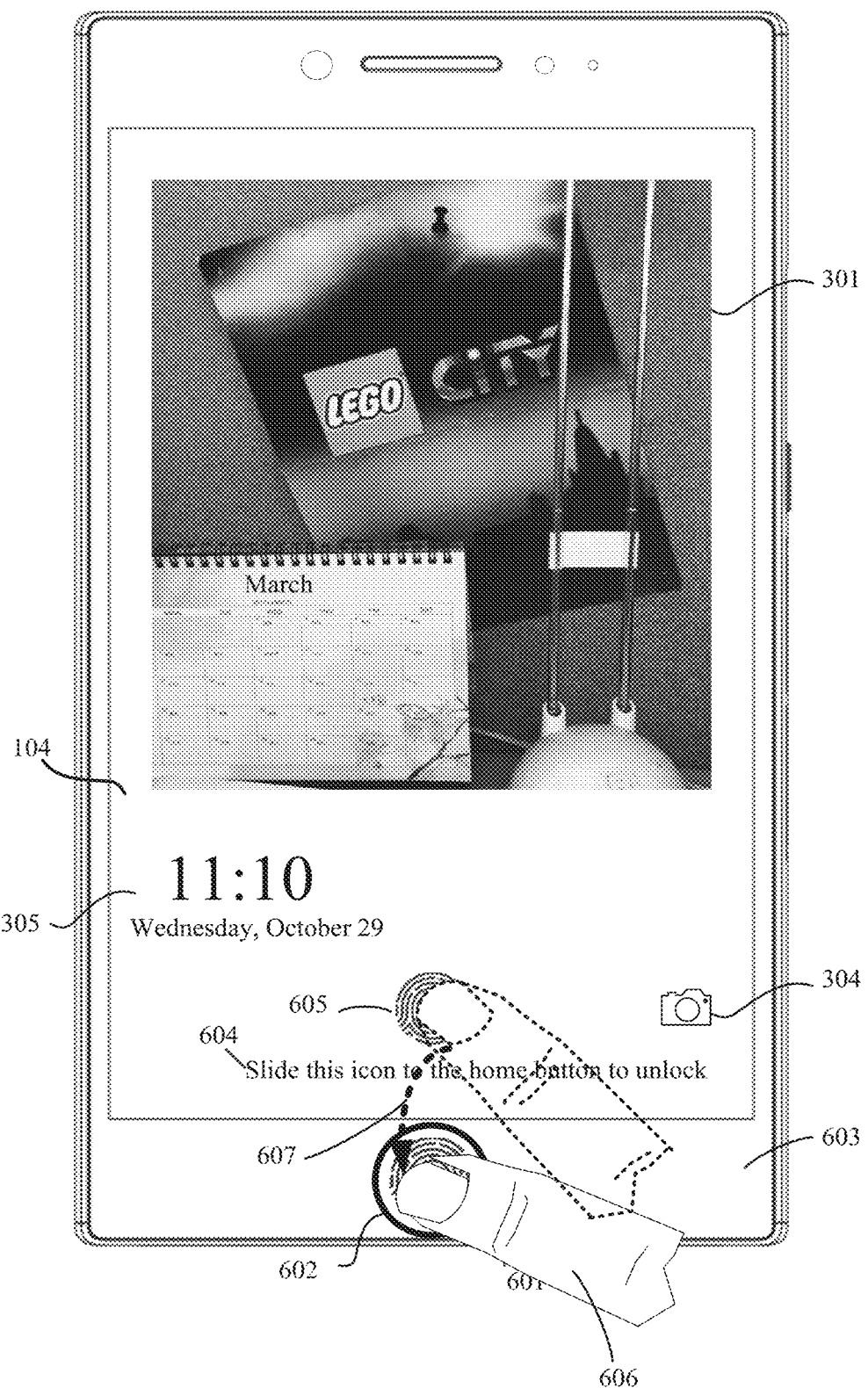

As shown in FIG. 6B, the electronic device 300 detects a slide gesture 607 performed on a fingerprint unlock icon 605 by using a finger 606 of the user; in response to the slide gesture 607, the electronic device 300 determines whether a gathered fingerprint matches a prestored valid fingerprint; and if the gathered fingerprint matches the valid fingerprint, the electronic device 300 unlocks a screen and displays a main screen (for example, the main screen shown in FIG. 3B) on a touchscreen 104. The slide gesture 607 may be a gesture of moving from inside to outside of the touchscreen. Specifically, a start position may be a position of the fingerprint unlock icon 605 on the touchscreen, an end point of the slide gesture 607 is outside the touchscreen 104, and the end position is a position of the fingerprint recognizer 601. In addition, the slide gesture 607 may be slightly touching the touchscreen 104 by using the finger 606 of the user, maintaining contact with the touchscreen 104, and moving to the position of the fingerprint recognizer 601 in the bezel 603. In other embodiments of this application, the fingerprint unlock icon 605 may be moved along with movement of the finger 606 of the user, to display on the touchscreen 104. When the finger 606 of the user slides out of the touchscreen 104, the fingerprint unlock icon 605 returns to an initial displaying position in a form of animation.

Figure 6C:
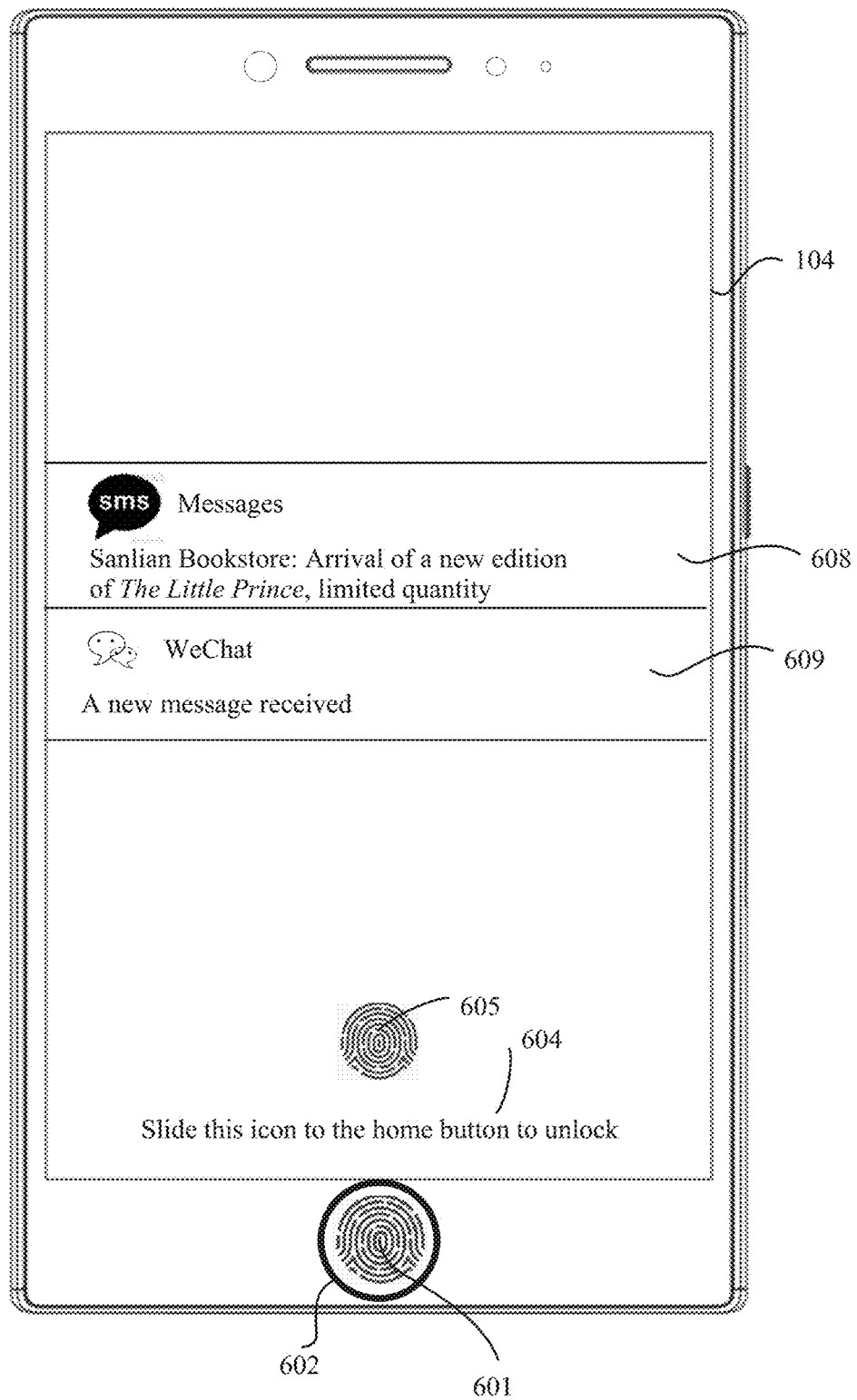

As shown in FIG. 6C, the electronic device 300 in this embodiment receives two notifications: a notification 606 and a notification 607. If the user views the two notifications but does not want to open the notifications to view detailed messages, the user may unlock the screen by performing the slide gesture 607 in FIG. 6B, so that the electronic device 300 displays the unlocked main screen.

Figure 6D:
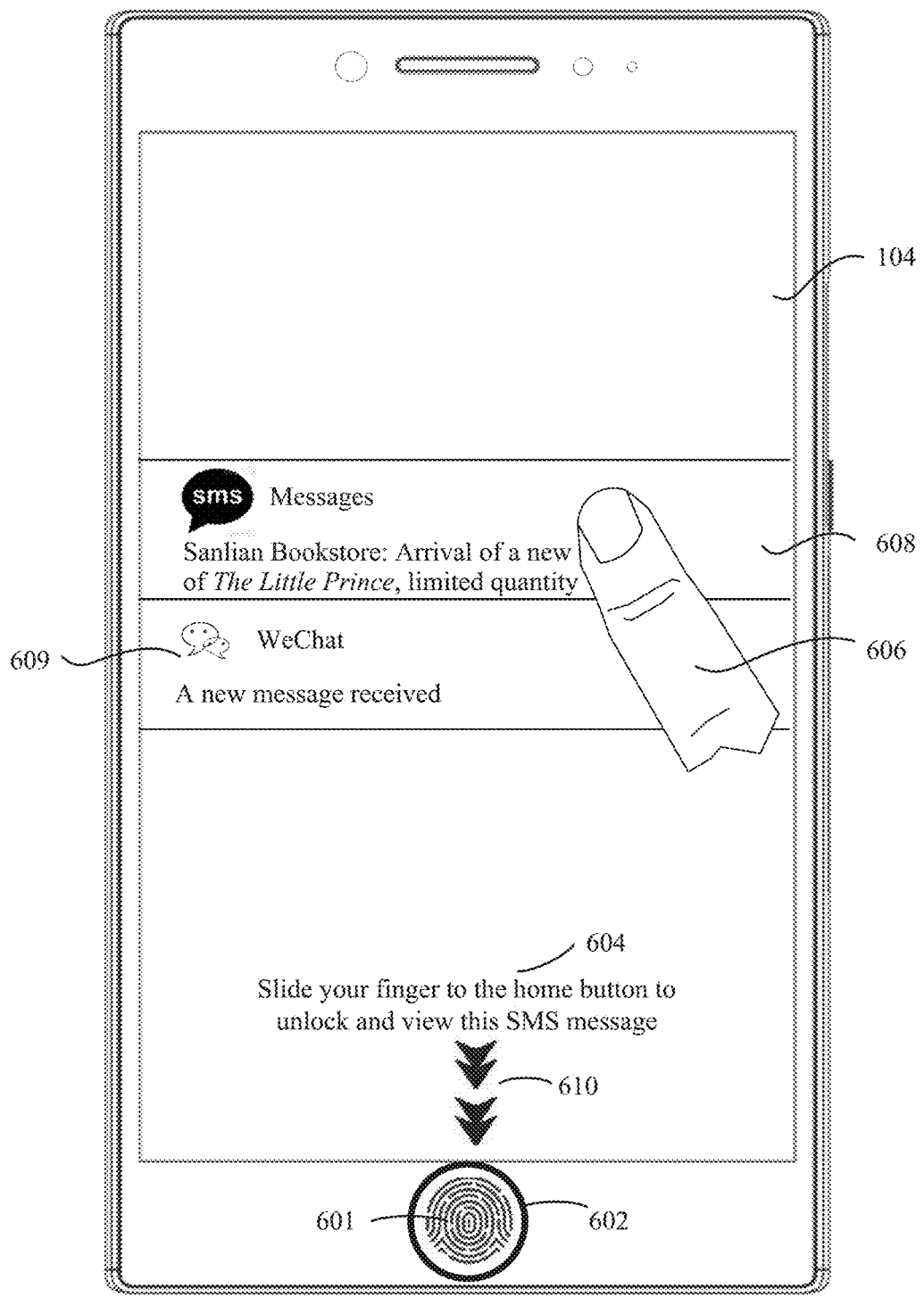

As shown in FIG. 6D, the electronic device 300 detects a first touch event performed on a notification 608 by using a finger 606 of the user; and in response to the first touch event, prompt information in the prompt box 604 may be changed to "Slide your finger to the home button to unlock and view this SMS message", and a prompt arrow 610 is displayed. The prompt arrow 610 and the prompt box 604 are used together to prompt and guide the user to unlock the screen. In other embodiments of this application, as mentioned in the foregoing embodiment, in response to the first touch event, the prompt box 604 may be displayed prominently (for example, being displayed in a zoom-in mode). In this way, the user can better focus on a current operation. In other embodiments of this application, in response to the first touch event, a light-emitting device 602 may emit light, so as to visually prompt the user better. The light-emitting device 602 may emit light of different colors or emit light of different frequencies depending on different types of notifications selected based on the first touch event. When the finger 606 of the user no longer touches the touchscreen 104, the light-emitting device 602 may no longer emit light, or may continue to emit light for a predetermined time. If no user operation is performed within the predetermined time, the light-emitting device 602 no longer emits light.

Figure 6E:
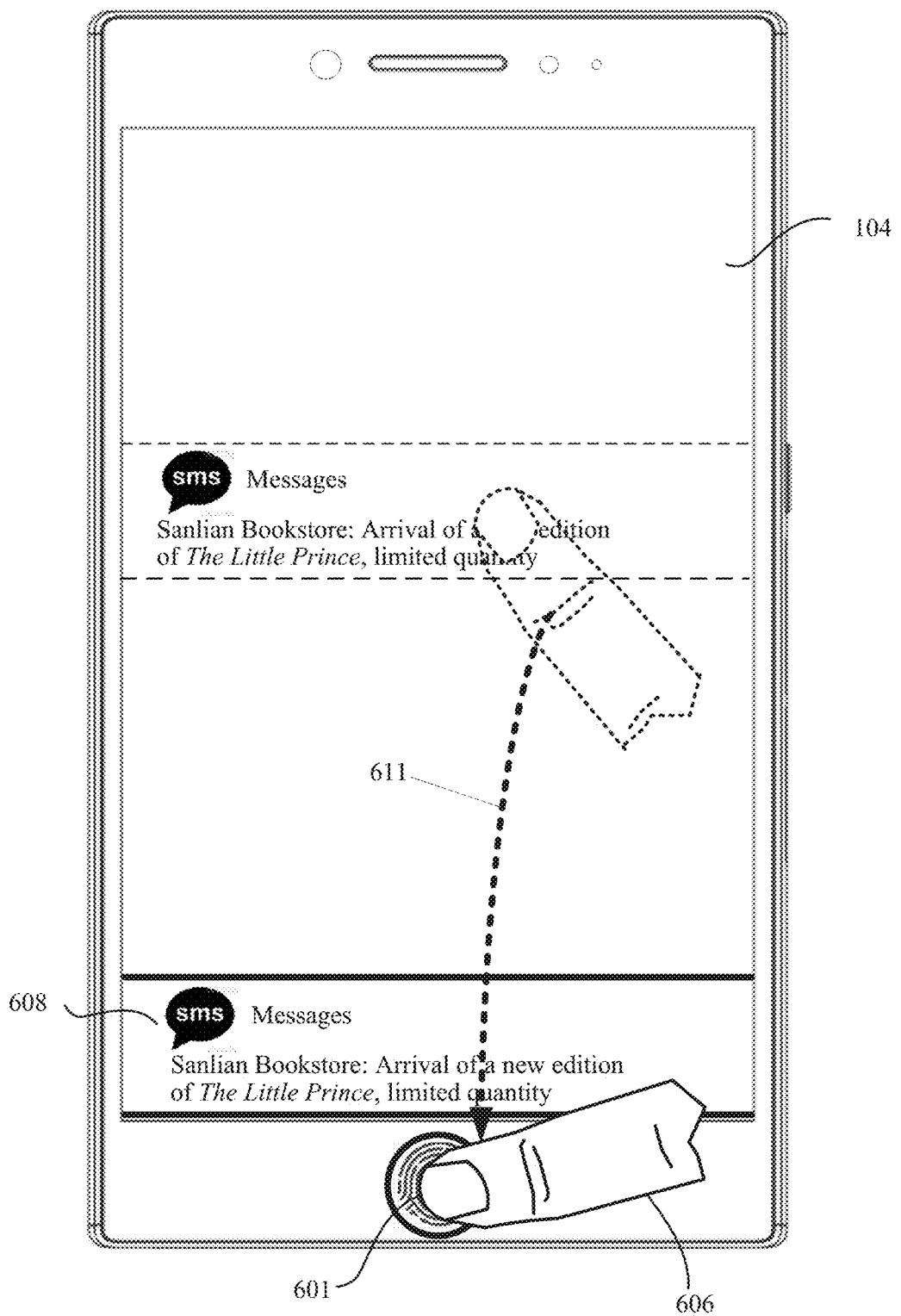

As shown in FIG. 6E, the electronic device 300 detects a second touch event 611 (that is, a slide gesture) performed on a notification 608 by using a finger 606 of the user. A start position of the second touch event 611 may be a display area of the notification 608 on a touchscreen 104. An end position of the second touch event 611 may be a position of a fingerprint recognizer 611, that is, the end position of the slide gesture 611 is outside the touchscreen 104. In response to the second touch event 611, the electronic device 300 may gather a fingerprint by using the fingerprint recognizer 601 and verify the fingerprint (for example, comparing the fingerprint with a prestored valid fingerprint). When the electronic device 300 determines that the gathered fingerprint matches the valid fingerprint, the electronic device 300 unlocks the screen and opens a GUI (for example, an interface shown in FIG. 4G) of an application corresponding to the notification 608, so that the user quickly views specific information in the notification 608. When the electronic device 300 determines that the gathered fingerprint does not match the valid fingerprint, the electronic device 300 provides a prompt that the gathered fingerprint does not match the valid fingerprint.

Figure 6F:
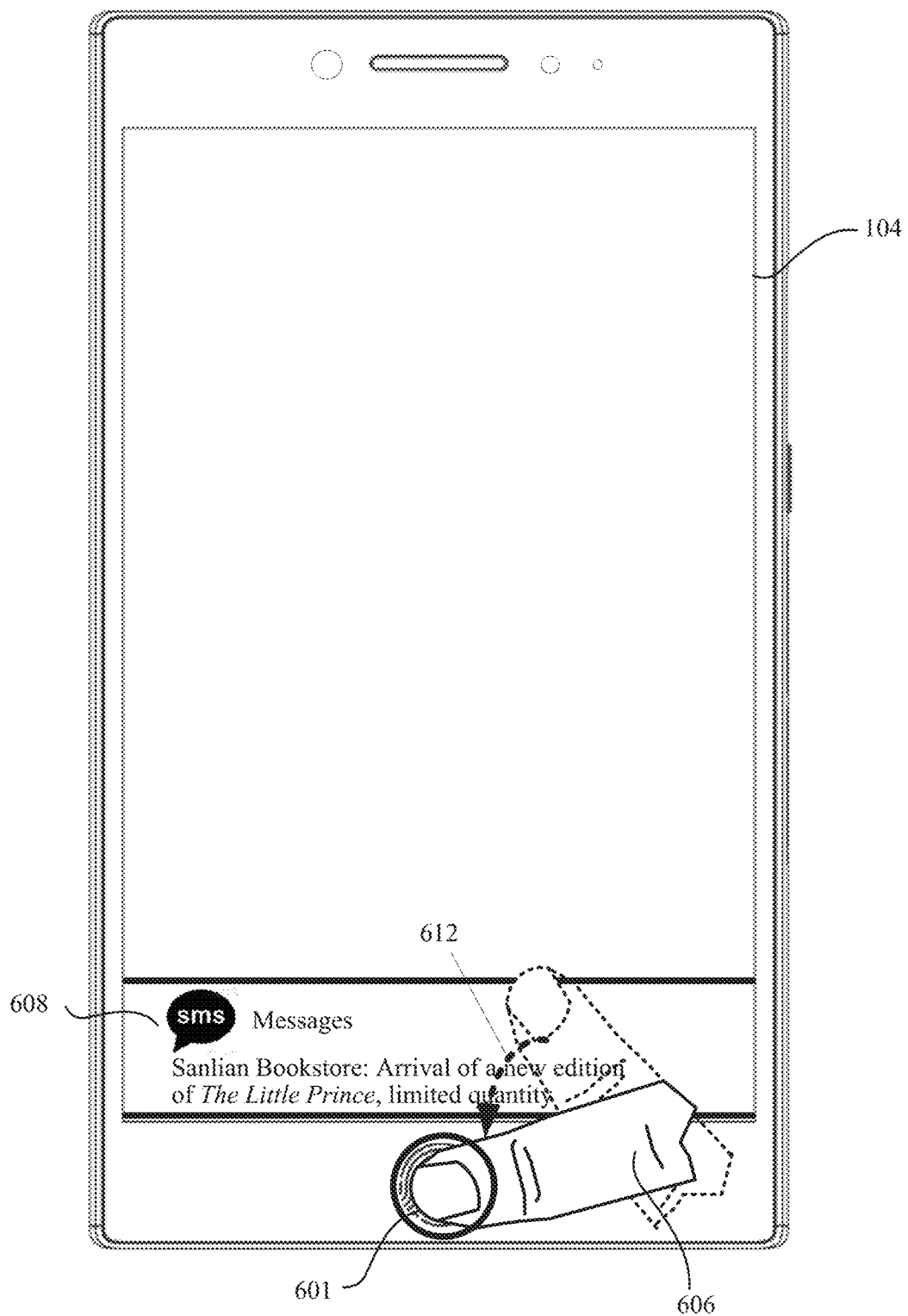

As shown in FIG. 6F, in other embodiments of this application, various notifications may be displayed in a position, near a fingerprint recognizer 601, of the touchscreen. This helps a user to quickly unlock the screen and view the message. In FIG. 6F, a notification 608 is displayed on the touchscreen 104, and a position for displaying the notification 608 is very close to a position of the fingerprint recognizer 601. Provided that a finger 606 of the user performs a slide gesture 612 with a very short distance, the electronic device 300 can gather and verify a fingerprint, and After fingerprint verification succeeds, quickly unlock a screen and display a GUI (shown in FIG. 4G) of an application corresponding to the notification 608.

Figure 7A:
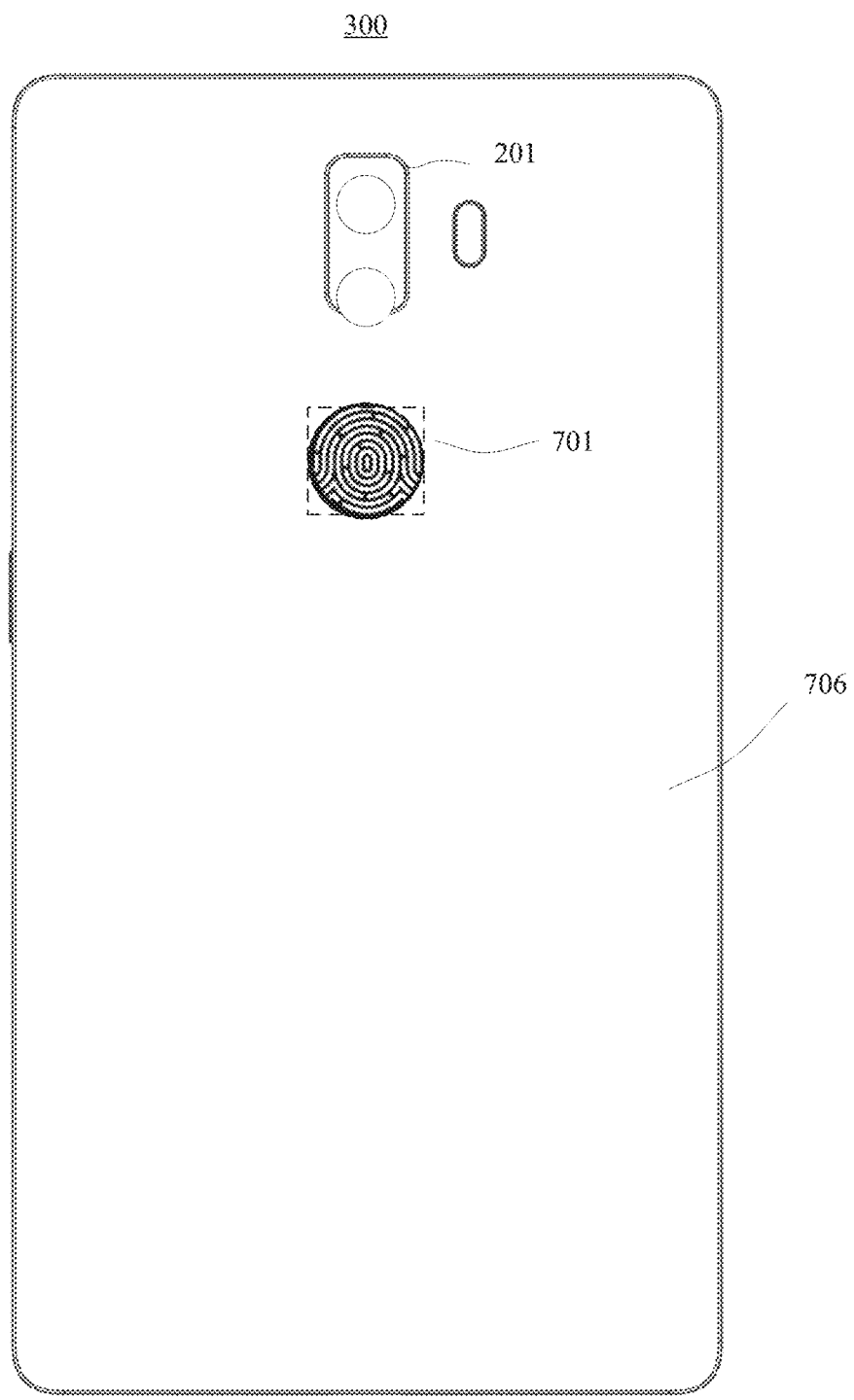
FIG. 7A and FIG. 7B are schematic diagrams of still other graphical user interfaces displayed on an electronic device 300 in still other embodiments.
Figure 7B:
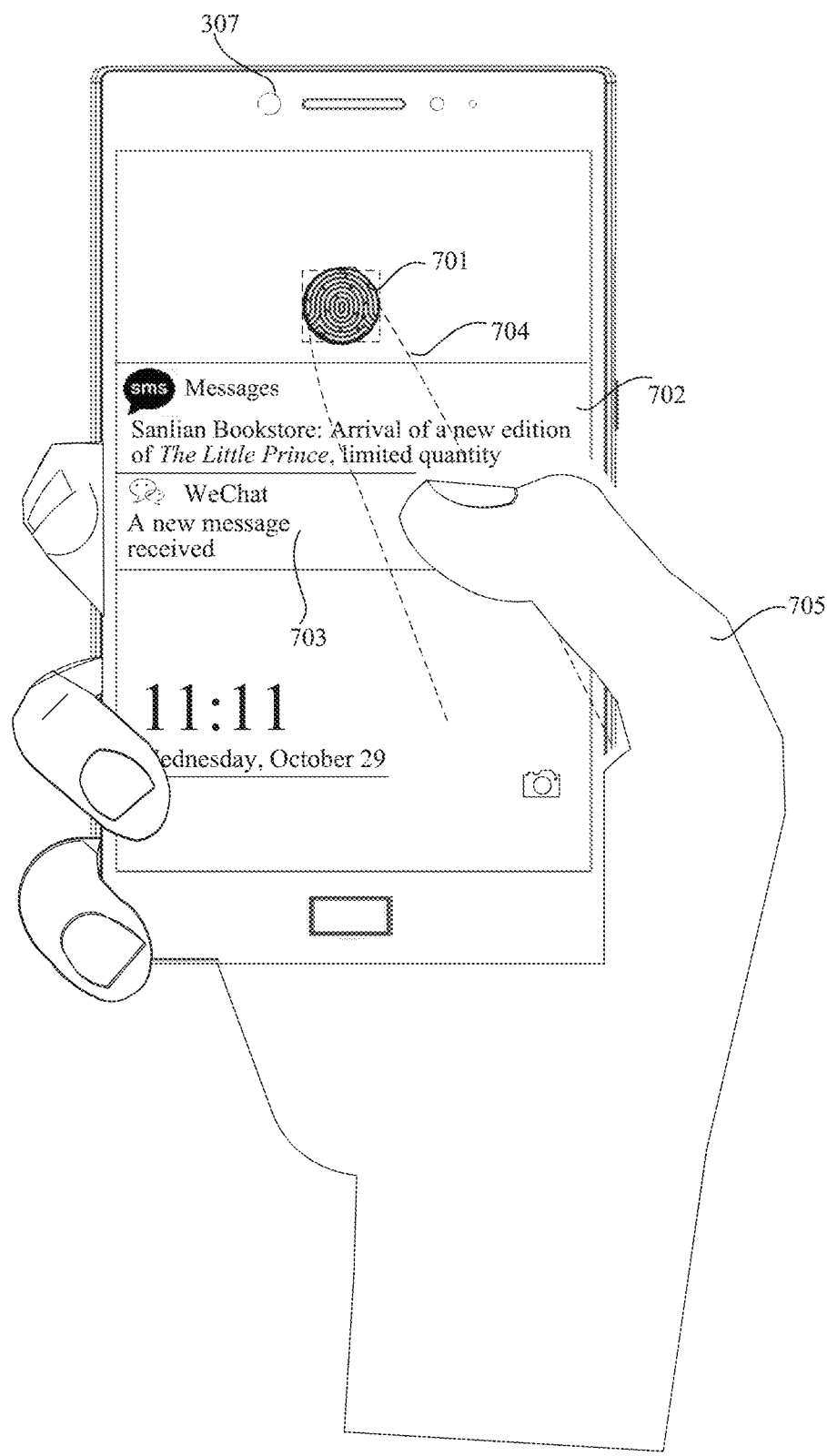

In some embodiments of this application, a fingerprint recognizer may alternatively be disposed on the back of an electronic device 300. As shown in FIG. 7A, two cameras 201 are disposed on a back housing 706 of the electronic device 300, and a fingerprint recognizer 701 is disposed below the cameras 201. As shown in FIG. 7B, two notifications 702 and 703 are displayed on a lock screen of the electronic device 300, and a right hand of a user holds the electronic device 300. A forefinger 704 touches the fingerprint recognizer 701 on the back of the electronic device 300. In addition, a thumb 705 touches the notification 703 displayed on the touchscreen 104. In this scenario, the electronic device 300 may quickly gather a fingerprint by using the fingerprint recognizer 701 on the back and verify the fingerprint (for example, comparing the gathered fingerprint with a prestored valid fingerprint). After fingerprint verification succeeds, a screen is quickly unlocked, and a GUI of an application corresponding to the notification 703 is displayed. According to the technical solution in this embodiment, when the user holds the electronic device in a most natural manner, the electronic device quickly recognizes a fingerprint, unlocks a screen, and opens a GUI of an application. This greatly improves transaction processing efficiency of an electronic device, and further improves user experience.

In other embodiments of this application, to increase a security level, when fingerprint verification is performed in the foregoing embodiments, a front-facing camera 307 may also be used to gather face feature information or iris information. The electronic device 300 may compare the gathered face feature information with prestored valid face feature information, or may compare the gathered iris information with prestored valid iris information. The electronic device 300 unlocks the screen only when both fingerprint verification and face feature information verification succeed, or both fingerprint verification and iris information verification succeed, and displays a GUI of an application corresponding to a notification 703.

Figure 8:
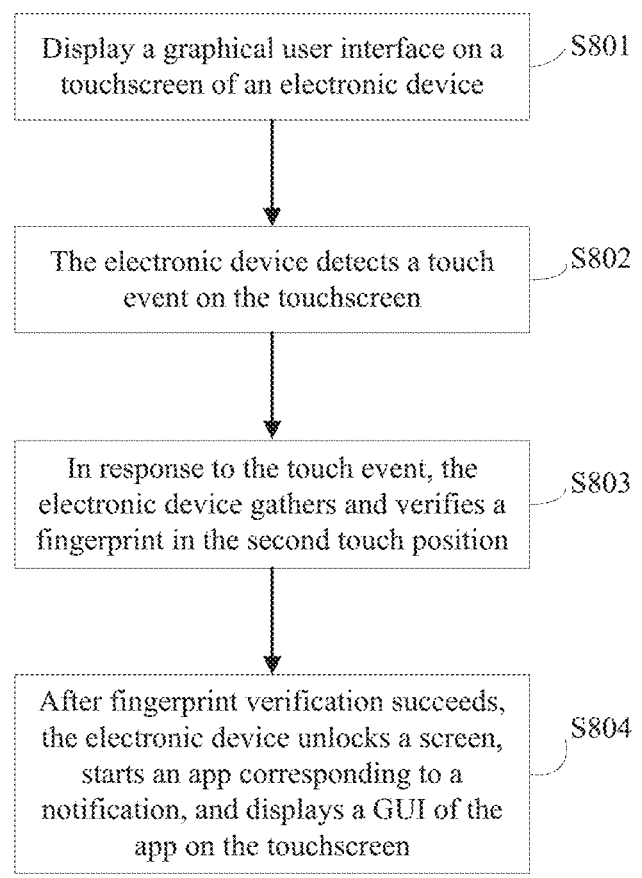
FIG. 8 is a schematic flowchart of a method in some embodiments.

As shown in FIG. 8, an embodiment of this application provides a notification processing method. The method may be implemented by an electronic device (for example, a mobile phone 100) with a touchscreen 104 and a fingerprint recognizer 112. The method may be used to implement a specific solution in the foregoing embodiments. The method may include the following steps.

Step S801. Display a graphical user interface on the touchscreen of the electronic device.

For example, the graphical user interface (GUI) may be displayed on a display screen of the touchscreen. The GUI may be specifically a lock screen. The lock screen may include various interface elements, for example, interface elements displayed in FIG. 3A, FIG. 4A, FIG. 5A to FIG. 5C, FIG. 6A, FIG. 10A, and the like. Specifically, the lock screen may include one or more notifications. The notification may be a new notification received by the electronic device. The notification may be displayed in a first area on the lock screen. The first area is a partial display area on the lock screen. For example, as shown in FIG. 4A, a notification 401 and a notification 402 are displayed in the first area (not shown by using a reference numeral in this figure) on the lock screen. For another example, as shown in FIG. 5B, a notification 501 is displayed in a first area (not shown by using a reference numeral in this figure) on the lock screen. The first area is used to display various interface elements (for example, an icon, a control, and a widget).

In other embodiments of this application, that the notification is displayed in the first area on the lock screen may specifically include the following:

After receiving a new notification, the electronic device determines whether the received notification is a specified notification. The specified notification may be a notification bound to a second area. For a meaning of the specified notification, refer to the record in the foregoing embodiment, and no details are repeated herein.

If determining that the notification is not a specified notification, the electronic device displays the notification in the first area. If determining that the notification is a specified notification, the electronic device displays the notification in the second area. In this scenario, the second area may be considered as the specified area mentioned in the foregoing embodiments. The specified notification may be a notification with a highest priority, or may be a notification of a specified app, or may be a notification of a specified contact in an app. The app may be specifically a phone book, an SMS, an email, instant messaging software (for example, WeChat or Facebook Messenger), or the like.

The lock screen may further include a fingerprint unlock icon. The fingerprint unlock icon is used to visually remind a user that fingerprint verification may be performed in a display area of the icon, to unlock a screen. The fingerprint unlock icon may be an icon 302 shown in FIG. 3A, or may be an icon 502 shown in FIG. 5A, or may be an icon 605 shown in FIG. 6A. The fingerprint unlock icon may be displayed in a second area on the lock screen. The second area is a partial display area on the lock screen. For example, as shown in FIG. 4A, the fingerprint unlock icon 302 is displayed in the second area (not shown by using a reference numeral in this figure) on the lock screen. For another example, as shown in FIG. 5B, the fingerprint unlock icon 502 is displayed in the second area (shown by using a reference numeral B in this figure) on the lock screen. The second area may be corresponding to a position of a fingerprint recognizer on the touchscreen, so as to help unlock the screen when the user touches the touchscreen. The lock screen may further include a prompt box (as shown by an icon 303 in FIG. 3A, an icon 503 in FIG. 5A, or an icon 604 in FIG. 6A). The prompt box is used to display some unlocking-related prompt information on the touchscreen, so as to provide a prompt for a user and facilitate a user operation. The prompt box may be displayed in the second area. Prompt information in the prompt box may be specifically "Verify your fingerprint in this area to unlock the screen", or the like. The prompt information may be various content in the foregoing embodiments. The one or more notifications may be the notification 401, the notification 402, and the like in the foregoing embodiments. Each notification has a corresponding application or widget, or the like. When tapping a notification, the user can open a user interface of an application, and display specific information related to the notification on the user interface. In this embodiment, unless otherwise specified, the notification may be a lock screen notification. Certainly, in other embodiments, the notification may be any one or more of a status bar notification, a floating notification, or a lock screen notification. In other embodiments of this application, the lock screen may alternatively include other interface elements such as lock screen wallpaper 301, a time and date 305, and a quick-start camera icon 304 in FIG. 3A. In this embodiment of this application, the first area and the second area are two different display areas on the lock screen. The first area and the second area may not overlap with each other, or may partially overlap. In other embodiments of this application, the first area and the second area may alternatively be a same display area on the lock screen.

It should be understood that, although the terms such as first and second may be used in the embodiments of this application to describe a display area on the lock screen, the display area shall not be limited to these terms. These terms are merely intended to distinguish between display areas. For example, without departing from the scope of the embodiments of this application, the first area may alternatively be referred to as the second area. Similarly, the second area may alternatively be referred to as the first area.

Step S802. The electronic device detects a touch event on the touchscreen.

For example, the touch event may be touching a touch-sensitive surface (for example, a touch panel) of the touchscreen by the user. The touch event may be specifically slightly touching or pressing the touchscreen by using a finger (which is alternatively a stylus or the like) of the user, and while maintaining contact with the touchscreen, slowly or quickly moving to another position from position in which slight touch or press is performed on the touchscreen.

The touch event may alternatively be slightly touching or pressing the touchscreen by using the finger of the user, keeping stationary for a predetermined time (for example, two seconds), and then while maintaining contact with the touchscreen, slowly or quickly moving to another position from a position in which slight touch or press is performed on the touchscreen. The touch event may alternatively be slightly touching or pressing the touchscreen by using the finger of the user, and then slowly or quickly moving to another position. The touch event may alternatively be slightly touching or pressing the touchscreen by using the finger of the user, keeping stationary for a predetermined time, and then slowly or quickly moving to another position. It can be understood that, in addition to the listed gestures, the touch event may alternatively be another type of gesture. No limitation is imposed on the touch event in this embodiment of this application.

The position that is slightly touched or pressed by the finger of the user on the touchscreen may be referred to as a first touch position, and the another position may be referred to as a second touch position. The first touch position of the touch event may be specifically a position that is touched by the user on the touch-sensitive surface of the touchscreen. According to the descriptions of the foregoing specific embodiments, the first touch position of the touch event may be corresponding to the first area on the lock screen. That is, when the electronic device detects the touch event in the first touch position, in response to the touch event in the first touch position, interface elements (for example, an icon and a control) corresponding to the first touch position in the first area may be changed. The second touch position of the touch event may be corresponding to the second area on the lock screen. That is, when the electronic device detects the touch event in the second touch position, in response to the touch event in the second touch position, interface elements corresponding to the second touch position in the second area may be changed. In still other embodiments of this application, the second touch position may alternatively be outside the touchscreen. For example, as shown in FIG. 4F, the first touch position of the touch event 404 is corresponding to the first area, and the second touch position of the touch event 404 is corresponding to the second area. For another example, as shown in FIG. 6E, the first touch position of the touch event 611 is in the first area on the touchscreen, and the second touch position of the touch event is on a bezel 603 outside the touchscreen.

In addition, in other embodiments of this application, the touch event in step S802 may alternatively be implemented jointly by using the first touch event and the second touch event that are mentioned in the foregoing embodiments. For specific definitions of the first touch event and the second touch event, refer to descriptions of examples in the foregoing embodiments. For example, the first touch event may be slightly touching or pressing the touchscreen by using the finger of the user and keeping stationary for a predetermined time (for example, two seconds). The second touch event may be slightly touching or pressing the touchscreen by using the finger of the user and moving from a position to another position while maintaining contact with the touchscreen.

In some embodiments of this application, the notification displayed in the first area may alternatively be dragged to the second area from the first area based on the touch event, so as to remind the user that an app corresponding to the notification is to be started.

Step S803. In response to the touch event, the electronic device gathers and verifies a fingerprint in the second touch position.

In the foregoing embodiment, the second touch position is corresponding to the second area on the lock screen and a display area in which the second area is located is also corresponding to a position of a fingerprint recognizer on the touchscreen; therefore, the electronic device may gather and verify a fingerprint in the second touch position by using the fingerprint recognizer. In other embodiments of this application, the electronic device may enable a fingerprint recognition function (that is, the fingerprint recognizer is powered on and starts to work, or is woken from a sleep mode) only after detecting the touch event performed by the user (by using the finger, stylus, or another object of the user). In this way, power of the electronic device can be further saved. The electronic device may gather a fingerprint of the user in the second touch position and compare the gathered fingerprint with a prestored valid fingerprint.

Step S804. The electronic device may unlock a screen after fingerprint verification succeeds, start an app corresponding to a notification in a first area, and display a GUI of the app on the touchscreen, where the GUI includes specific content of the notification, and the GUI may further include other content related to the app, as shown in FIG. 4G, FIG. 5F, or FIG. 10D.

According to the method for processing the notification on the lock screen provided in the foregoing embodiment, a capability of human-machine interaction between an electronic device and a user is greatly improved, processing efficiency of the electronic device is also improved, user operation steps are simplified, and user experience is further improved.

In other embodiments of this application, step S803 may specifically include step S8031: In response to the touch event, the electronic device may display the notification prominently in the first area corresponding to the first touch position, for example, displaying the notification in a zoom-in mode. For example, the touch event in the first touch position may be slightly touching or pressing the touchscreen by the user and keeping stationary for a predetermined time. A selected notification is displayed prominently, so as to provide a prompt for the user more distinctly.

Figure 9:
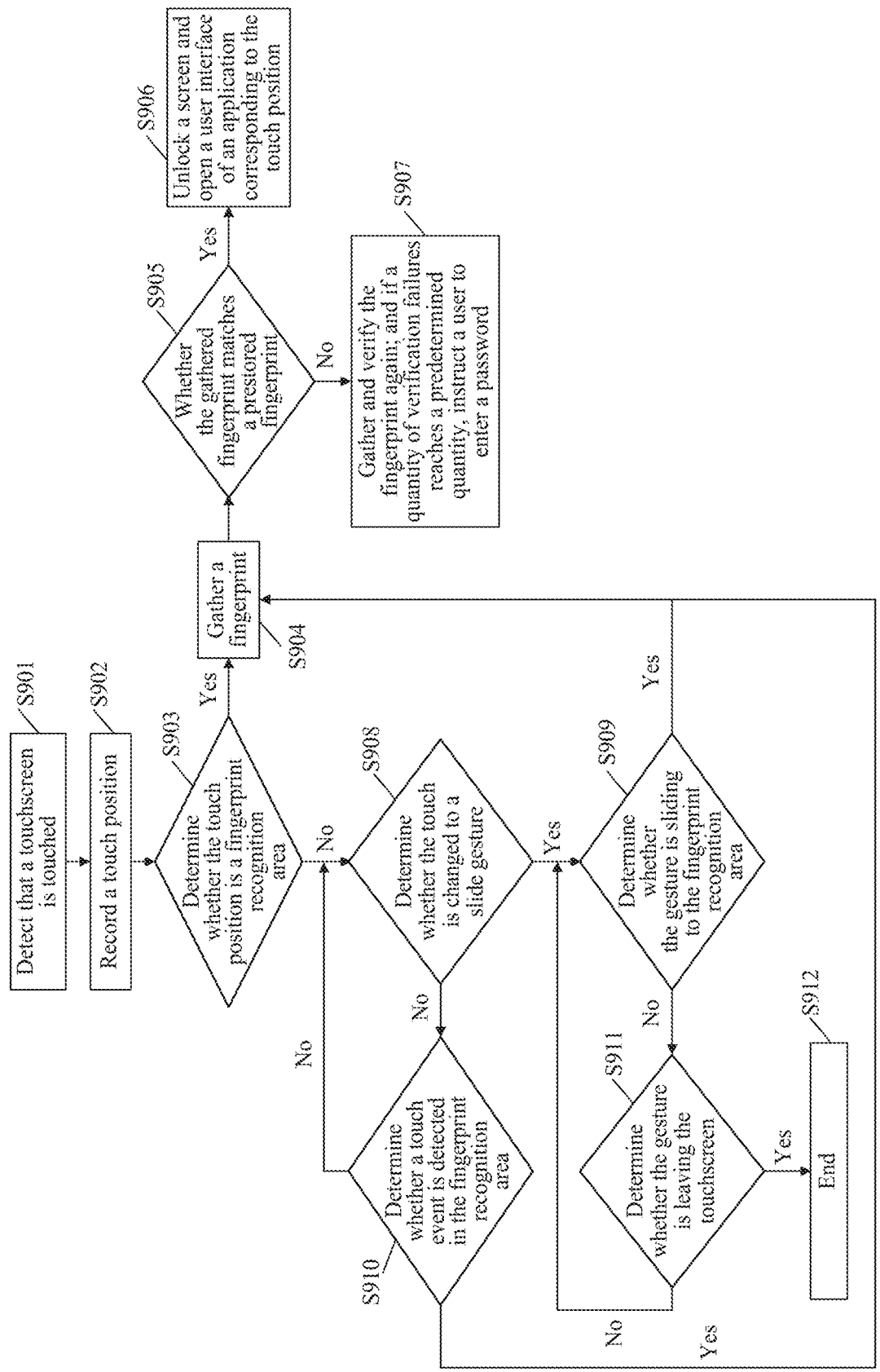
FIG. 9 is a schematic flowchart of a method in other embodiments.

As shown in FIG. 9, an embodiment of this application provides a notification processing method. The method may be implemented by an electronic device 300 (for example, a mobile phone 100) with a touchscreen 104 and a fingerprint recognizer 112. The method may specifically include the following steps:

Step S901. The electronic device detects a touch event on the touchscreen, that is, the touchscreen is touched.

Step S902. In response to the touch event, the electronic device records a position (that is, a touch position) of the touch event.

Step S903. The electronic device determines whether the touch position is a fingerprint recognition area, where the fingerprint recognition area is an area in which the fingerprint recognizer is located, so that a user gathers and verifies a fingerprint, and the like; and if determining that the touch position is a fingerprint recognition area, performs step S904, or if determining that the touch position is not a fingerprint recognition area, performs step S908.

Step S904. Gather a fingerprint.

Step S905. The electronic device determines whether the gathered fingerprint matches a prestored fingerprint; and if determining that the gathered fingerprint matches a prestored fingerprint, performs step S906, or if determining that the gathered fingerprint does not match a prestored fingerprint, performs step S907.

Step S906. The electronic device unlocks a screen, and opens a user interface of an application corresponding to the touch position.

Step S907. Gather and verify the fingerprint again; and if a quantity of verification failures reaches a predetermined quantity, instruct the user to enter a password, where the password is used to unlock a screen.

Step S908. The electronic device determines whether the touch event is changed to a slide gesture; and if the touch event is changed to a slide gesture, performs step S909, or if the touch event is not changed to a slide gesture, performs step S910.

Step S909. The electronic device determines whether the gesture is sliding to the fingerprint recognition area; and if determining that the gesture is sliding to the fingerprint recognition area, the electronic device performs step S904, or if determining that the gesture is not sliding to the fingerprint recognition area, the electronic device performs step S911.

Step S910. The electronic device determines whether a touch event is detected in the fingerprint recognition area; and if determining that a touch event is detected in the fingerprint recognition area, the electronic device performs step S904, or if determining that no touch event is detected in the fingerprint recognition area, the electronic device performs step S908.

Step S911. The electronic device determines whether the gesture is leaving the touchscreen; and if determining that the gesture is leaving the touchscreen, the electronic device performs step S912, or if determining that the gesture is not leaving the touchscreen, the electronic device performs step S909.

Step S912. End a current operation procedure.

Touch events on the touchscreen are identified continuously in the foregoing embodiment of this application, so that the electronic device can accurately identify a user operation, thereby improving transaction processing efficiency of the electronic device.

Figure 12:
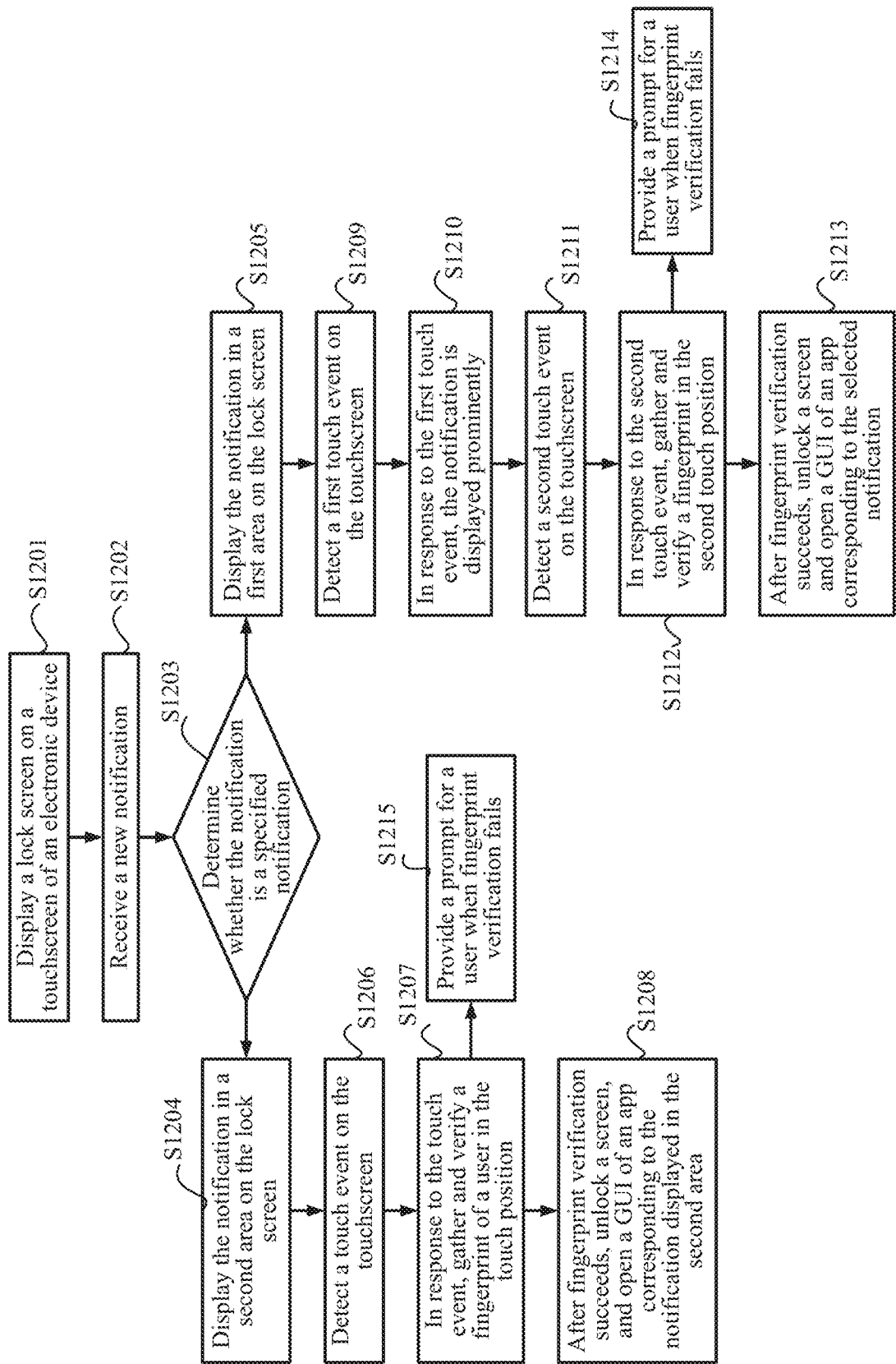
FIG. 12 is a schematic flowchart of a method in still other embodiments.

In the prior art, when receiving a new notification, an electronic device displays the notification on a lock screen, or if receiving a plurality of notifications are received, the electronic device displays the plurality of notifications on the lock screen in chronological order of reception. However, a user of the electronic device may be interested only in some types of notifications, or may be interested in specified content. The notifications are displayed on the lock screen disorderly. Consequently, a human-machine interaction capability of the electronic device is greatly reduced, and use efficiency of the electronic device is also reduced. To resolve the technical problem, as shown in FIG. 12, an embodiment of this application provides a notification processing method. The method may be implemented by an electronic device (for example, a mobile phone 100) with a touchscreen 104 and a fingerprint recognizer 112. The method may include the following steps:

Step S1201. Display a lock screen on the touchscreen of the electronic device, where a specific meaning and an included interface element that are of the lock screen may be the same as or similar to those of the lock screen in the foregoing embodiments.

Step S1202. The electronic device receives a new notification, where a specific meaning of the notification herein may be the same as or similar to a meaning of the notification in the foregoing embodiments.

Step S1203. The electronic device determines whether the notification is a specified notification, where the specified notification is a notification bound to a second area of the lock screen, only the specified notification can be displayed in the second area, and a meaning of the specified notification may be specific interpretation of the specified notification in the foregoing embodiments; and if determining that the notification is a specified notification, the electronic device performs step S1204, or if determining that the notification is not a specified notification, the electronic device performs step S1205.

Step S1204. Display the notification in a second area on the lock screen.

Step S1205. Display the notification in a first area on the lock screen.

In the foregoing embodiment, different notifications received may be displayed in different display areas on the lock screen. This facilitates a user operation. In addition, the specified notification is displayed in a specified area, so that a user focuses on the specified area, thereby helping the user quickly process an important notification or an interested notification. This also improves a human-machine interaction capability of the electronic device and improves user experience.

The first area and the second area may be two different display areas on the lock screen and are used to display various interface elements (for example, an icon, a control, and a widget).

In addition, the second area (that is, the specified area) may be a display area in the middle of the lock screen. In this way, all important notifications or all notifications in which the user is interested can be displayed in a display area that can be easily perceived by the user.

In addition, an unlock icon may be further displayed in the second area and is configured to prompt the user with some information related to screen unlocking. For example, as shown in FIG. 5C, a fingerprint unlock icon 502 is displayed in a second area B, and a prompt box 503 may be further displayed in the second area B. Because a WeChat-related notification is a specified notification, a WeChat-related notification 504 is displayed in the specified area (that is, the second area B).

In other embodiments of this application, in a case of step S1204 (that is, the notification is displayed in the second area on the lock screen), the method may further include the following steps.

Step S1206. The electronic device detects a touch event on the touchscreen, where the touch event may be a gesture such as slightly touching or pressing the touchscreen by using a finger of a user, a touch position of the touch event on the touchscreen is a position of a fingerprint recognizer on the touchscreen, and the position of the touch event on the touchscreen may be corresponding to the second area on the lock screen. For example, as shown in FIG. 5E, a finger 507 of the user touches the touchscreen, and a touch position is a position of the fingerprint recognizer on the touchscreen.

Step S1207. In response to the touch event, the electronic device gathers and verifies a fingerprint of the user in the touch position. For example, as shown in FIG. 5E, after the user touches the touchscreen, the fingerprint of the user is gathered in the touch position.

Step S1208. After fingerprint verification succeeds, the electronic device unlocks a screen and opens a GUI of an app corresponding to the notification displayed in the second area, where the GUI includes specific content of the notification, and the GUI may further include other content related to the app, as shown in FIG. 4G, FIG. 5F, or FIG. 10D. In other embodiments, the method may alternatively include step S1215: The electronic device provides a prompt for the user when fingerprint verification fails.

According to the method in this embodiment of this application, a capability of human-machine interaction between an electronic device and a user is greatly improved, processing efficiency of the electronic device is also improved, user operation steps are simplified, and user experience is further improved.

In still other embodiments of this application, in a case of step S1205 (that is, the notification is displayed in the first area on the lock screen), the method may further include the following steps.

Step S1209. The electronic device detects a first touch event on the touchscreen, where the first touch event may be a gesture such as slightly touching or pressing the touchscreen by using a finger of a user, and a touch position of the first touch event on the touchscreen is corresponding to the first area on the lock screen. That is, the first touch event is specific to the notification displayed in the first area. For example, as shown in FIG. 4E, a finger 403 of a user touches the touchscreen, and a touch position is corresponding to a notification 401 in the first area on the lock screen from a perspective of vision of the user.

Step S1210. In response to the first touch event, the notification is displayed prominently, for example, being displayed in a zoom-in mode, so that the user is prompted that the notification has been selected. For example, as shown in FIG. 4D and FIG. 4E, after the finger 403 of the user touches the touchscreen, the selected notification 401 is displayed in a zoom-in mode.

Step S1211. The electronic device detects a second touch event on the touchscreen, where the second touch event includes a first touch position and a second touch position on the touchscreen, the first touch position is corresponding to the first area, and the second touch position is corresponding to the second area. For example, as shown in FIG. 4F, the second touch event may be a slide gesture 404, where the slide gesture 404 slides from a position to another position on the touchscreen; correspondingly, it can be understood as that the first touch position of the second touch event on the touchscreen is corresponding to the first area on the lock screen (that is, a display area of the notification 401), and the second touch position of the second touch event on the touchscreen is corresponding to the second area on the lock screen (that is, a display area of the fingerprint unlock icon 302).

Step S1212. In response to the second touch event, the electronic device gathers and verifies a fingerprint in the second touch position.

In addition, in response to the second touch event, from a perspective of a display effect, the notification 401 may be further dragged from the first area to the second area, and be displayed in the second area. The dragged notification is displayed, so that the user can intuitively view which notification is to be displayed in the second area. In this case, the user performs a further operation, thereby improving user experience.

Step S1213. After fingerprint verification succeeds, the electronic device unlocks a screen and opens a GUI of an app corresponding to the selected notification, where the GUI includes specific content of the notification, and the GUI may further include other content related to the app, as shown in FIG. 4G FIG. 5F, or FIG. 10D.

Optionally, the method may further include step S1214: The electronic device may provide a prompt for a user when fingerprint verification fails.

In this embodiment of this application, the notification in step S1205 is not a specified notification and is not displayed in the second area. However, the notification may be dragged to the second area by performing a simple operation of the user, to unlock the screen and start the app corresponding to the notification. This improves user experience.

Figure 14:
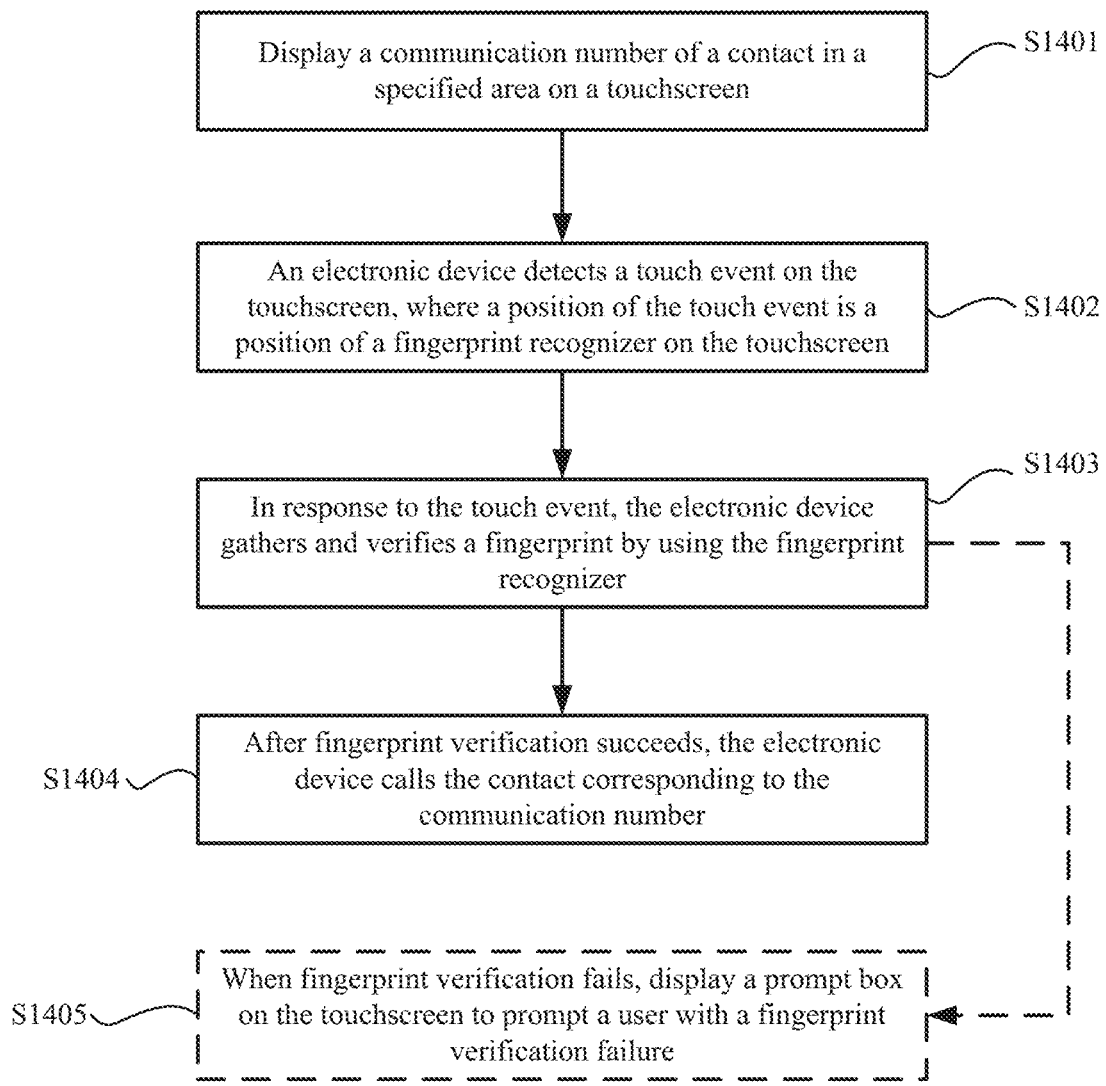
FIG. 14 is a schematic flowchart of a calling method in some embodiments.

In the prior art, when a user needs to make a call, the user can directly perform an operation on a mobile phone. For example, the user opens a phone book, selects a contact from a displayed contact list, then taps a phone number on a contact detail screen, and dials the phone number. However, in a process of implementing this embodiment, the inventor finds that in the prior art, a mobile phone cannot determine whether a user currently dialing a phone number is an authorized user. Consequently, an unauthorized user dials arbitrarily, and privacy may be disclosed. To resolve the foregoing technical problems, an embodiment of this application provides a calling method. The method may be implemented on an electronic device with a touchscreen and a fingerprint recognizer. As shown in FIG. 14, the method may include the following steps.

Step S1401. Display a communication number of a contact in a specified area on the touchscreen, where the communication number may be a phone number, or may be an instant messaging number, for example, a WeChat ID or a Facebook messenger ID; and a display position of the specified area is corresponding to a position of a fingerprint recognizer on the touchscreen.

Step S1402. The electronic device detects a touch event on the touchscreen, where a position of the touch event is a position of the fingerprint recognizer on the touchscreen.

Step S1403. In response to the touch event, the electronic device gathers and verifies a fingerprint by using the fingerprint recognizer.

Step S1404. After fingerprint verification succeeds, the electronic device calls the contact corresponding to the communication number.

Optionally, the method may alternatively include step S1405: When fingerprint verification fails, a prompt box is displayed on the touchscreen. The prompt box is used to prompt the user with the following information: Due to a failure in fingerprint verification, the electronic device does not call a contact corresponding to the communication number. Specifically, information in the prompt box may be "Fingerprint verification failed, and unable to call", or the like.

According to the method in this embodiment of this application, the electronic device can dial a corresponding phone number after fingerprint verification succeeds. This protects user privacy security.

Figure 15:
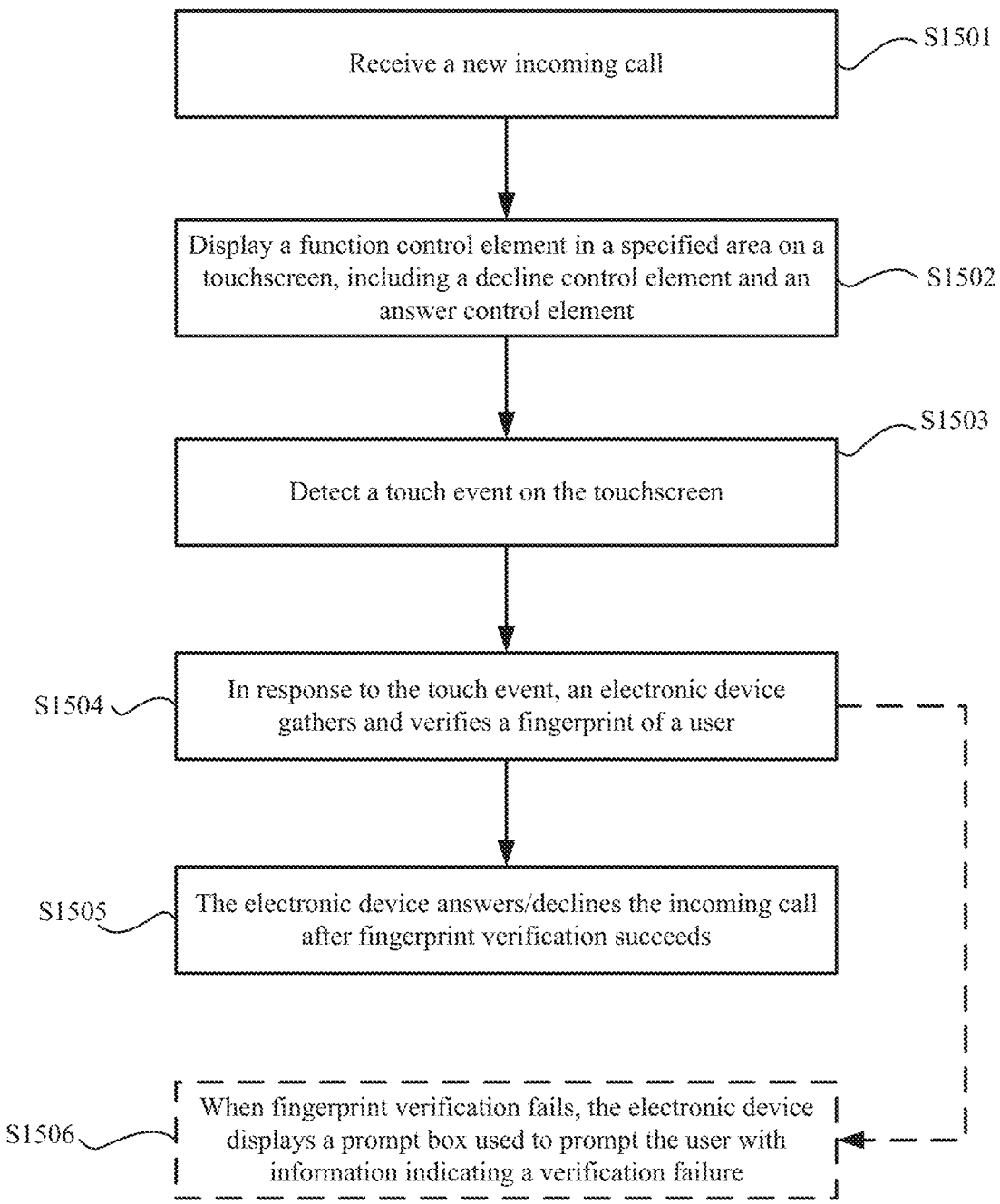
FIG. 15 is a schematic flowchart of a method for answering/declining an incoming call in some embodiments.

In the prior art, when an electronic device (for example, a mobile phone or a tablet computer) receives an incoming call, an operation may be directly performed on the electronic device, for example, touching a virtual button on the touchscreen to answer/decline the incoming call. However, in a process of implementing this embodiment, the inventor finds that in the prior art, the electronic device cannot determine whether a user currently performing an answer operation is an authorized user; consequently, an incoming call is answered arbitrarily by an unauthorized user, and privacy may be disclosed. To resolve the foregoing technical problem, as shown in FIG. 15, an embodiment of this application provides a method for answering/declining an incoming call. The method may be implemented on an electronic device with a touchscreen and a fingerprint recognizer. The method may include the following steps:

Step S1501. Receive a new incoming call.

Step S1502. Display a function control element in a specified area on the touchscreen, including a decline control element and an answer control element, where the fingerprint recognizer is disposed in the specified area.

Step S1503. Detect a touch event on the touchscreen, where the touch event may be a slide gesture that moves from a position to another position on the touchscreen.

Step S1504. In response to the touch event, the electronic device gathers and verifies a fingerprint of a user.

Step S1505. The electronic device answers/declines the incoming call after fingerprint verification succeeds.

Optionally, the method may further include step S1506: When fingerprint verification fails, the electronic device displays a prompt box used to prompt the user with information indicating a verification failure. For example, the information may be "Fingerprint verification failed, and answering/declining an incoming call is forbidden", or the like.

According to the method in this embodiment of this application, the electronic device can answer/decline a corresponding incoming call after fingerprint verification succeeds. This protects user privacy security.

Figure 16A:
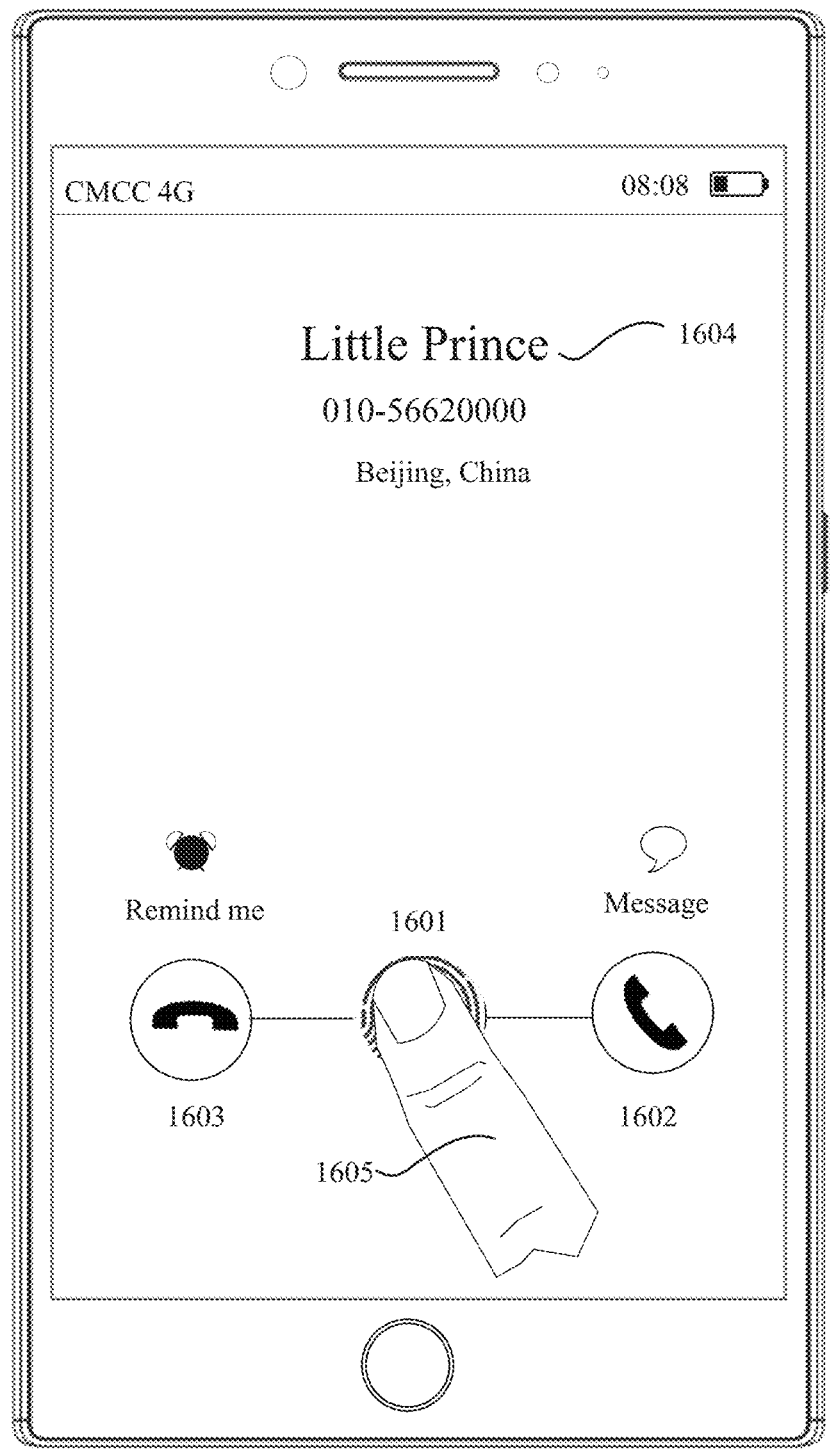
FIG. 16A to FIG. 16C are schematic diagrams of some graphical user interfaces displayed on an electronic device in other embodiments.
Figure 16B:
Figure 16C:
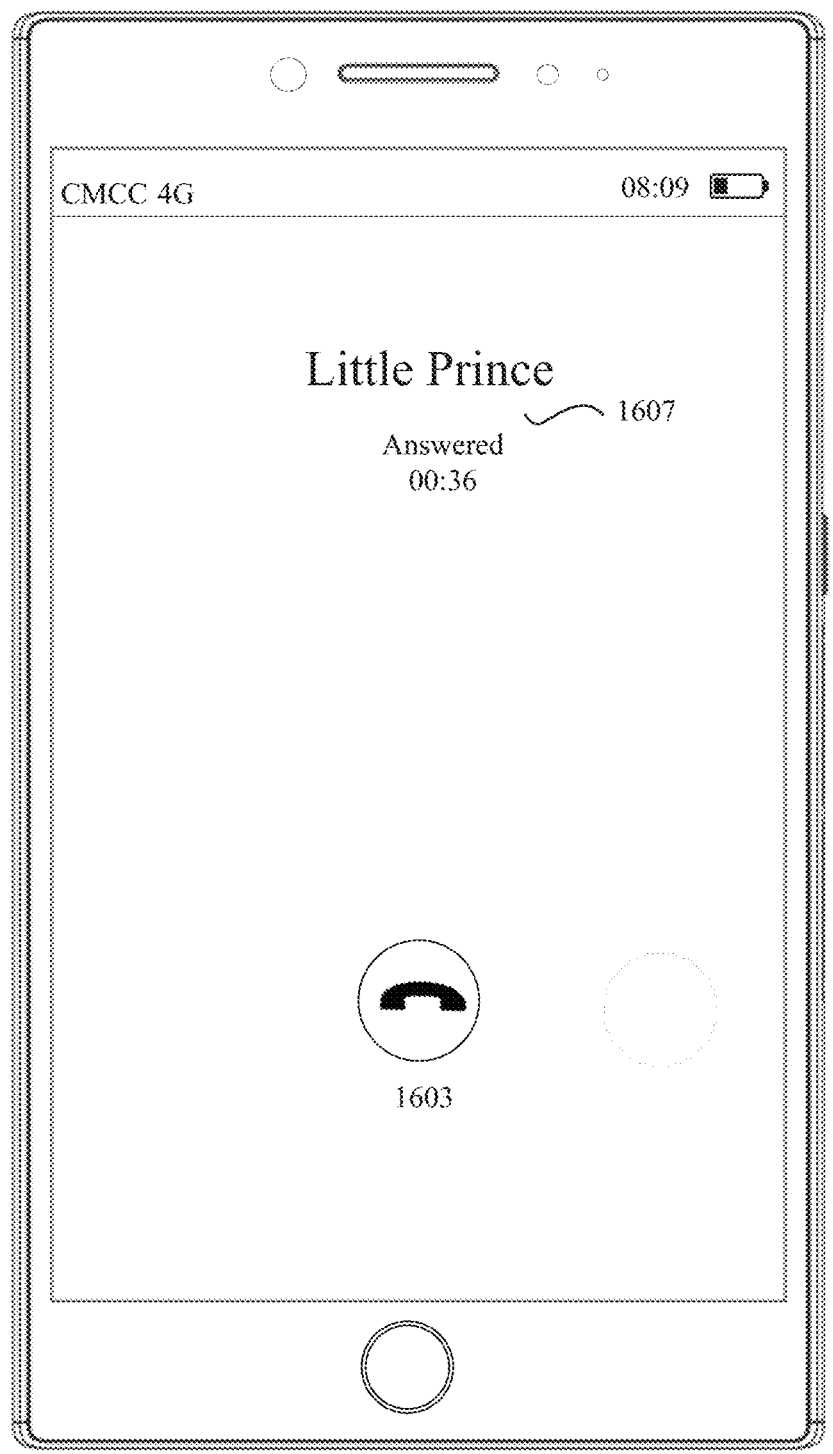

For example, FIG. 16A to FIG. 16C show GUIs related to answering of an incoming call in this embodiment of this application. In FIG. 16A, the electronic device receives an incoming call from a contact 1604 (Little Prince), and then an incoming call GUI is displayed on the touchscreen. The GUI includes a decline control element 1603 and an answer control element 1602. The control element 1601 indicates that a finger 1605 of a user may touch the control element 1601, and while maintaining contact with the touchscreen, move to a position of the control element 1602 or the control element 1603 to answer or decline the incoming call. As shown in FIG. 16B, a slide gesture 1606 performed by the user on the touchscreen makes the control element 1601 move to the position of the control element 1602. In this case, in response to the touch event (that is, the slide gesture 1606), the electronic device gathers and verifies a fingerprint of the user by using the fingerprint recognizer on the touchscreen. The electronic device receives the incoming call from the contact after fingerprint verification succeeds, and displays a GUI shown in FIG. 16C. In the GUI, a contact state 1607 indicates that the incoming call from the contact is being answered currently. The control element 1603 indicates that the user may hang up the answered call.

Figure 13:
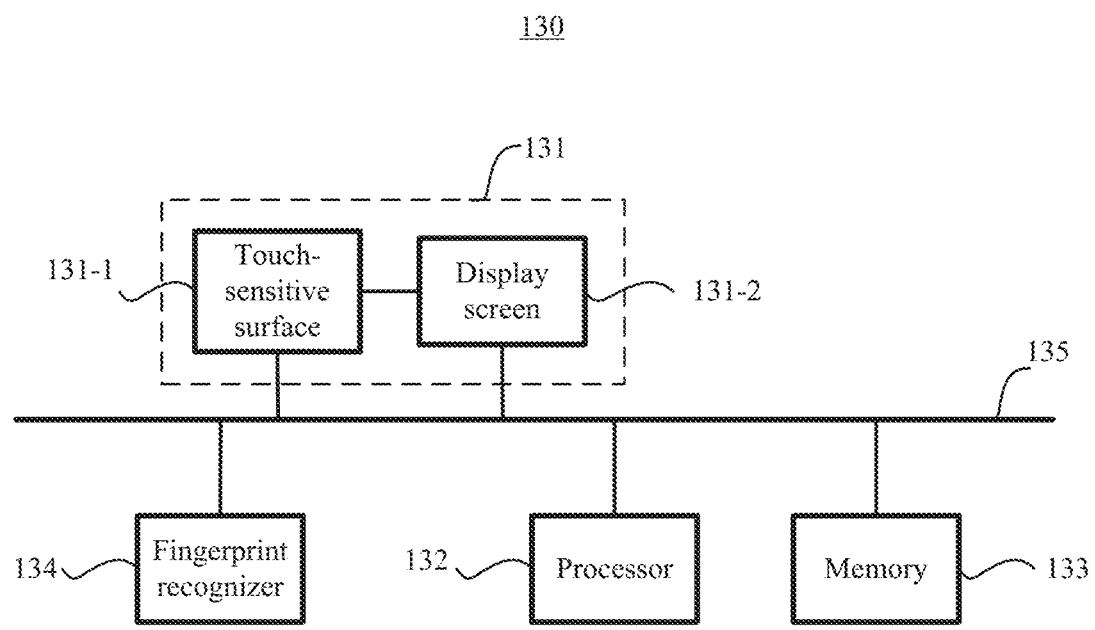
FIG. 13 is a schematic structural diagram of an electronic device in some embodiments.

As shown in FIG. 13, in some embodiments of this application, an electronic device 130 is disclosed. The electronic device 130 may include a touchscreen 131 (which may specifically include a touch-sensitive surface 131-1 and a display screen 131-2), a processor 132, a memory 133, and a fingerprint recognizer 134, and further include one or more communications buses 135 connected to the foregoing components. The electronic device 130 in this embodiment of this application may be configured to execute an implementation solution of the methods and accompanying drawings in the foregoing embodiments.

In other embodiments of this application, an electronic device is disclosed. The electronic device may include a touchscreen, one or more processors, a memory, a plurality of applications, and one or more programs. The touchscreen includes a touch-sensitive surface (for example, a touch panel) and a display, the one or more programs are stored in the memory and configured to be executed by the one or more processors, the one or more programs include an instruction, and the instruction may be used to perform the steps in the foregoing embodiments.

The first touch event in the foregoing embodiments may be different gestures. For example, the first touch event may be slightly touching the touchscreen by using a finger of a user, and keeping stationary for a predetermined time; or the first touch event may be pressing the touchscreen by using the finger of the user, and keeping stationary for a predetermined time; or the first touch event may be slightly touching the touchscreen by using the finger of the user, and then pressing the touchscreen within a predetermined time; or the first touch event may be slightly touching the touchscreen by using the finger of the user, and then leaving the touchscreen immediately. It can be understood that, in addition to the foregoing listed gestures, the first touch event may alternatively be another type of gesture. No limitation is imposed on the first touch event in the embodiments of this application.

For example, the second touch event (for example, the gestures 404, 607, 611, and 612) in the foregoing embodiments may be different types of slide gestures. For example, the second touch event may be slightly touching the touchscreen by using one finger of the user, quickly sliding, and then quickly leaving the touchscreen; or the second touch event may alternatively be slightly touching the touchscreen by using one finger of the user, and then moving while maintaining contact; or the second touch event may alternatively be touching the touchscreen by using a plurality of fingers of the user, and then moving while maintaining contact; or the second touch event may alternatively be slightly touching the touchscreen by using one finger of the user, and then slowly moving while maintaining contact with the touchscreen; or the second touch event may alternatively be performing kneading on the touchscreen by two fingers (usually a thumb and an index finger) of the user. It can be understood that, in addition to the listed gestures, the second touch event may alternatively be another type of gesture. No limitation is imposed on the type of the second touch event in the embodiments of this application.

It can be understood that in other embodiments of this application, the first touch event and the second touch event in the foregoing embodiments may alternatively be implemented by using one gesture. That is, the gesture (the first touch event and the second touch event) may be slightly touching or pressing the touchscreen by using a finger of the user, and slowly or quickly from a slightly touching or pressing position on the touchscreen to another position while maintaining contact with the touchscreen; or the gesture may alternatively be slightly touching or pressing the touchscreen by using the finger of the user, keeping stationary for a predetermined time (for example, two seconds), and then slowly or quickly from a slightly touching or pressing position on the touchscreen to another position while maintaining contact with the touchscreen; or the gesture may alternatively be slightly touching or pressing, by using a finger of a user, the touchscreen, and then slowly or quickly from a slightly touching or pressing position on the touchscreen to another position; or the gesture may alternatively be slightly touching or pressing the touchscreen by using the finger of the user, keeping stationary for a predetermined time, and then slowly or quickly moving from a slightly touching or pressing position on the touchscreen to another position. It can be understood that, in addition to the listed gestures, the gesture may alternatively be another type of gesture. No limitation is imposed on the type of the gesture in the embodiments of this application.

According to the context, for example, the term "when" used in foregoing embodiments may be interpreted as a meaning of "if" or "after" or "in response to determining" or "in response to detecting". Similarly, depending on the context, phrases "when determining" or "if detecting (a stated condition or event)" may be explained as "if determining", "in response to determining", "when detecting (the stated condition or event)", or "in response to detecting (the stated condition or event)".

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, all or some of the procedures or functions according to the embodiments of this application are generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are provided with reference to the specific embodiments. However, the foregoing example discussion is not intended to be detailed, and is not intended to limit this application to a disclosed precise form. Based on the foregoing teaching content, many modification forms and variation forms are possible. The embodiments are selected and described to fully illustrate the principles of this application and practical application of the principles, so that other persons skilled in the art can make full use of this application and various embodiments that have various modifications applicable to conceived specific usage.

What is claimed is:

1. An electronic device, comprising:
   a touchscreen comprising a first area and a second area;
   a processor coupled to the touchscreen; and
   a memory coupled to the processor and configured to store instructions which, when executed by the processor, cause the electronic device to:
   set a binding relationship between a first notification and a specified contact in an application, wherein the binding relationship is configured to be applied to the first notification;
   display, based on the binding relationship, a lock screen on the touchscreen, wherein the lock screen comprises the first notification received from the specified contact and corresponding to the application in the first area that indicates a presence of an unread message from the specified contact, a fingerprint unlock icon in the second area, and a first user instruction in the second area, and wherein the first user instruction indicates to a user to verify a fingerprint of the user in the second area to unlock the touchscreen;

detect, in accordance with the first user instruction, a slide gesture on the lock screen, wherein the slide gesture starts from the first area and goes to the second area, and wherein the slide gesture comprises a first touch position in the first area and a second touch position in the second area;

display a second user instruction and not display the first user instruction in the second area in response to detecting the first touch position of the slide gesture, wherein the second user instruction indicates that the user can drag the first notification to the second area to unlock the touchscreen and view details of the first notification;

gather the fingerprint of the user in response to detecting the second touch position of the slide gesture in the second area;

verify the fingerprint of the user by comparing the fingerprint with a prestored valid fingerprint; and unlock the touchscreen and display a graphical user interface of the application corresponding to the first notification on the touchscreen when the fingerprint of the user is verified successfully.

2. The electronic device of claim 1, wherein the instructions further cause the electronic device to prominently display the first notification in the first area in response to detecting the first touch position of the slide gesture.

3. The electronic device of claim 1, wherein the instructions further cause the electronic device to display the first notification in the second area in response to detecting the second touch position.

4. The electronic device of claim 1, wherein the first area and the second area are different areas of the lock screen.

5. The electronic device of claim 1, wherein the touchscreen comprises a fingerprint recognizer configured to gather the fingerprint of the user.

6. The electronic device of claim 1, wherein the touchscreen further comprises a third area, wherein the lock screen further comprises a second notification corresponding to a second application in the third area, and wherein the instructions further cause the electronic device to unlock the touchscreen and display a second graphical user interface of the second application corresponding to the second notification on the touchscreen.

7. A computer program product comprising instructions stored on a non-transitory computer-readable medium that, when executed by a processor, cause an electronic device to:

set a binding relationship between a first notification and a specified contact in an application, wherein the binding relationship is configured to be applied to the first notification;

display, based on the binding relationship, a lock screen on a touchscreen, wherein the lock screen comprises the first notification received from the specified contact and corresponding to the application in a first area that indicates a presence of an unread message from the specified contact, a fingerprint unlock icon in a second area, and a first user instruction in the second area, and wherein the first user instruction indicates to a user to verify a fingerprint of the user in the second area to unlock the touchscreen;

detect, in accordance with the first user instruction, a slide gesture on the lock screen, wherein the slide gesture starts from the first area and goes to the second area, and wherein the slide gesture comprises a first touch position in the first area and a second touch position in the second area;

display a second user instruction and not display the first user instruction in the second area in response to detecting the first touch position of the slide gesture, wherein the second user instruction indicates that the user can drag the first notification to the second area to unlock the touchscreen and view details of the first notification;

gather the fingerprint of the user in response to detecting the second touch position of the slide gesture in the second area;

verify the fingerprint of the user by comparing the fingerprint with a prestored valid fingerprint; and unlock the touchscreen and display a graphical user interface of the application corresponding to the first notification on the touchscreen when the fingerprint of the user is verified successfully.

8. The computer program product of claim 7, wherein the instructions further cause the electronic device to prominently display the first notification in the first area in response to detecting the first touch position of the slide gesture.

9. The computer program product of claim 7, wherein the instructions further cause the electronic device to display the first notification in the second area in response to detecting the second touch position.

10. The computer program product of claim 7, wherein the first area and the second area are different areas of the lock screen.

11. The computer program product of claim 7, wherein the touchscreen comprises a fingerprint recognizer configured to gather the fingerprint of the user.

12. The computer program product of claim 7, wherein the touchscreen further comprises a third area, wherein the lock screen further comprises a second notification corresponding to a second application in the third area, and wherein the instructions further cause the electronic device to unlock the touchscreen and display a second graphical user interface of the second application corresponding to the second notification on the touchscreen.

13. A method implemented by an electronic device, comprising:

setting a binding relationship between a first notification and a specified contact in an application, wherein the binding relationship is configured to be applied to the first notification;

displaying, based on the binding relationship, a lock screen on a touchscreen, wherein the lock screen comprises the first notification received from the specified contact and corresponding to the application in a first area that indicates a presence of an unread message from the specified contact, a fingerprint unlock icon in a second area, and a first user instruction in the second area, and wherein the first user instruction indicates to a user to verify a fingerprint of the user in the second area to unlock the touchscreen;

detecting, in accordance with the first user instruction, a slide gesture on the lock screen, wherein the slide gesture starts from the first area and goes to the second area, and wherein the slide gesture comprises a first touch position in the first area and a second touch position in the second area;

displaying a second user instruction and not display the first user instruction in the second area in response to detecting the first touch position of the slide gesture, wherein the second user instruction indicates that the user can drag the first notification to the second area to unlock the touchscreen and view details of the first notification;

gathering the fingerprint of the user in response to detecting the second touch position of the slide gesture in the second area;

verifying the fingerprint of the user by comparing the fingerprint with a prestored valid fingerprint; and unlocking the touchscreen and displaying a graphical user interface of the application corresponding to the first notification on the touchscreen when the fingerprint of the user is verified successfully.

14. The method of claim 13, further comprising prominently displaying the first notification in the first area in response to detecting the first touch position of the slide gesture.

15. The method of claim 13, further comprising displaying the first notification in the second area in response to detecting the second touch position.

16. The method of claim 13, wherein the first area and the second area are different areas of the lock screen.

17. The method of claim 13, wherein the touchscreen comprises a fingerprint recognizer configured to gather the fingerprint of the user.

18. The method of claim 13, wherein the touchscreen further comprises a third area, wherein the lock screen further comprises a second notification corresponding to a second application in the third area, and wherein the method further comprises unlocking the touchscreen and displaying a second graphical user interface of the second application corresponding to the second notification on the touchscreen.

\* \* \* \* \*